US010387101B2

(12) United States Patent
Kim et al.

(10) Patent No.: US 10,387,101 B2
(45) Date of Patent: Aug. 20, 2019

(54) ELECTRONIC DEVICE FOR PROVIDING CONTENT AND CONTROL METHOD THEREFOR

(71) Applicant: Samsung Electronics Co., Ltd., Gyeonggi-do (KR)

(72) Inventors: Byeong-Jun Kim, Gyeonggi-do (KR); Jae-Hyun Kim, Gyeonggi-do (KR); Jun-Soo Lee, Gyeonggi-do (KR); Ho-Chul Hwang, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 16/072,010

(22) PCT Filed: Dec. 6, 2016

(86) PCT No.: PCT/KR2016/014246
§ 371 (c)(1),
(2) Date: Jul. 23, 2018

(87) PCT Pub. No.: WO2017/135559
PCT Pub. Date: Aug. 10, 2017

(65) Prior Publication Data

US 2019/0034156 A1 Jan. 31, 2019

(30) Foreign Application Priority Data

Feb. 1, 2016 (KR) ........................ 10-2016-0012259

(51) Int. Cl.
*G06F 3/01* (2006.01)
*G06F 3/16* (2006.01)
(Continued)

(52) U.S. Cl.
CPC ............... *G06F 3/16* (2013.01); *G06Q 50/10* (2013.01); *G11B 20/10* (2013.01); *H04M 1/725* (2013.01);
(Continued)

(58) Field of Classification Search
CPC .................................... G06F 3/16; H04R 3/04
See application file for complete search history.

(56) References Cited

U.S. PATENT DOCUMENTS 9,154,895 B2 * 10/2015 Son ......................... H04S 3/008
2009/0216526 A1 8/2009 Schmidt et al.
(Continued)

FOREIGN PATENT DOCUMENTS

JP 2005-341204 A 12/2005
JP 2009-278175 A 11/2009
(Continued)

OTHER PUBLICATIONS

Kuromoto, Translation of JP2005341204A, “Sound field correction method and sound field compensation apparatus”, Dec. 8, 2005.*
Lee, Translation of KR1020090085887, “Method for decoding audio signal”, Aug. 10, 2009.*
European Search Report dated Dec. 19, 2018.

*Primary Examiner* — Regina N Holder
(74) *Attorney, Agent, or Firm* — Cha & Reiter, LLC

(57) ABSTRACT

Disclosed is a control method for an electronic device. An electronic device according to an embodiment comprises: at least one speaker; and a processor. The processor may be configured to: obtain sound source data; obtain first sound source data, corresponding to a first designated frequency band, from the sound source data by using a filter; generate second sound source data by applying sound effect to at least a portion of sound source data corresponding to a second designated frequency band among the sound source data; generate synthesized sound source data corresponding to the sound source data by synthesizing the first sound source data
(Continued)

and the second sound source data; and output the synthesized sound source data through the at least one speaker. Other embodiments may also be possible.

18 Claims, 34 Drawing Sheets

(51) Int. Cl.

| | |
|---|---|
| ***G11B 20/10*** | (2006.01) |
| ***G06Q 50/10*** | (2012.01) |
| ***H04M 1/725*** | (2006.01) |
| ***H04R 3/04*** | (2006.01) |

(52) U.S. Cl.
CPC ................ *H04R 3/04* (2013.01); *Y02D 70/10* (2018.01); *Y02D 70/20* (2018.01)

(56) References Cited

U.S. PATENT DOCUMENTS

| | | | | |
|---|---|---|---|---|
| 2011/0058686 | A1 | 3/2011 | Toraichi | |
| 2011/0106547 | A1 | 5/2011 | Toraichi et al. | |
| 2013/0064374 | A1 | 3/2013 | Lee et al. | |
| 2013/0343550 | A1 * | 12/2013 | Araki | H04S 3/00 381/17 |

FOREIGN PATENT DOCUMENTS

| | | | |
|---|---|---|---|
| KR | 10-2009-0085887 | A | 8/2009 |
| KR | 10-2013-0028365 | A | 3/2013 |
| KR | 10-2014-0003112 | A | 1/2014 |

* cited by examiner

ELECTRONIC DEVICE FOR PROVIDING CONTENT AND CONTROL METHOD THEREFOR

CROSS-REFERENCE TO RELATED APPLICATION(S)

This application is a National Phase Entry of PCT International Application No. PCT/KR2016/014246, which was filed on Dec. 6, 2016, and claims priority to Korean Patent Application No. 10-2016-0012259, which was filed on Feb. 1, 2016, the contents of which are incorporated herein by reference.

BACKGROUND

1. Field

Various embodiments of the present disclosure relate to an electronic device for providing content and a method for controlling the electronic device, and more particularly, to a method for applying a sound effect to a sound source.

2. Description of the Related Art

With the recent technological development, various types of electronic devices (e.g., smart phones, music players, etc.) have provided a function of outputting various types of sound sources through a sound output device (e.g., a speaker, an earphone, etc.). For example, an electronic device may output super-high-quality sound source.

The super-high-quality sound source may include sound source data having a sampling rate of 96 kHz or 192 kHz or higher. The super-high-quality sound may be a mastering quality sound (MQS) source, a mastering high definition (HD) sound source, a highest quality sound (HQS) sound source, a high-resolution audio (HRA) sound source, and an ultra-high quality (UHQ) sound source.

The electronic device provides a function of applying various sound effects to a sound source based on user's selection.

SUMMARY

When a sound effect is applied to a super-high-quality sound source in an electronic device, the electronic device may apply a selected sound effect to the sound source after down-sampling sound source data to a sampling rate corresponding to limited capabilities of the electronic device and/or the sound effect due to the limited capabilities of the electronic device (e.g., a computational capability of a processor included in the electronic device, a speed of processing with respect to the sound source, an available memory, the remaining capacity of a battery of the electronic device, etc.) and the limited capabilities of the sound effect applied to the sound source (e.g., a problem in which a frequency band supported by the sound effect does not include a super high-quality sound band, etc.).

For example, for the existing sampling rate of the sound source data of 96 kHz, when a sound effect is applied to the sound source after the sound source data is down-sampled to 48 kHz (a sampling rate corresponding to the limited capabilities of the sound effect), a time for processing application of the sound effect in the electronic device may be reduced to a half.

However, when down-sampling is applied to the sound source data, a signal of high-frequency band data of the sound source data is lost inevitably.

The present disclosure provides an electronic device capable of preventing a loss of a high-frequency band signal with a method for applying a sound effect to reproduce a sound source in the electronic device.

According to various embodiments of the present disclosure, an electronic device includes at least one speaker and a processor, in which the processor is configured to obtain sound source data, to obtain first sound source data corresponding to a first designated frequency band from the sound source data by using a filter, to generate second sound source data by applying a sound effect to at least partial data corresponding to a second designated frequency band in the sound source data, to generate synthesized sound source data corresponding to the sound source data by synthesizing the first sound source data with the second sound source data, and to output the synthesized sound source data through the at least one speaker.

According to various embodiments of the present disclosure, a method for controlling an electronic device includes obtaining sound source data, obtaining first sound source data corresponding to a first designated frequency band from the sound source data by using a filter, generating second sound source data by applying a sound effect to at least partial data corresponding to a second designated frequency band in the sound source data, generating synthesized sound source data corresponding to the sound source data by synthesizing the first sound source data with the second sound source data, and outputting the synthesized sound source data.

With an electronic device that provides content and a method for controlling the electronic device according to various embodiments of the present disclosure, for example, when the electronic device reproduces a sound source, the electronic device may perform frequency division and reconstruction to effectively apply a sound effect, allowing a user to listen to the sound source without a loss of a particular frequency band in spite of several constraints.

In addition, according to various embodiments of the present disclosure, when the sound effect is applied to the sound source, the amount of computation and processing speed of the electronic device may be reduced, thus reducing the power consumption of a battery.

DETAILED DESCRIPTION

Figure 1:
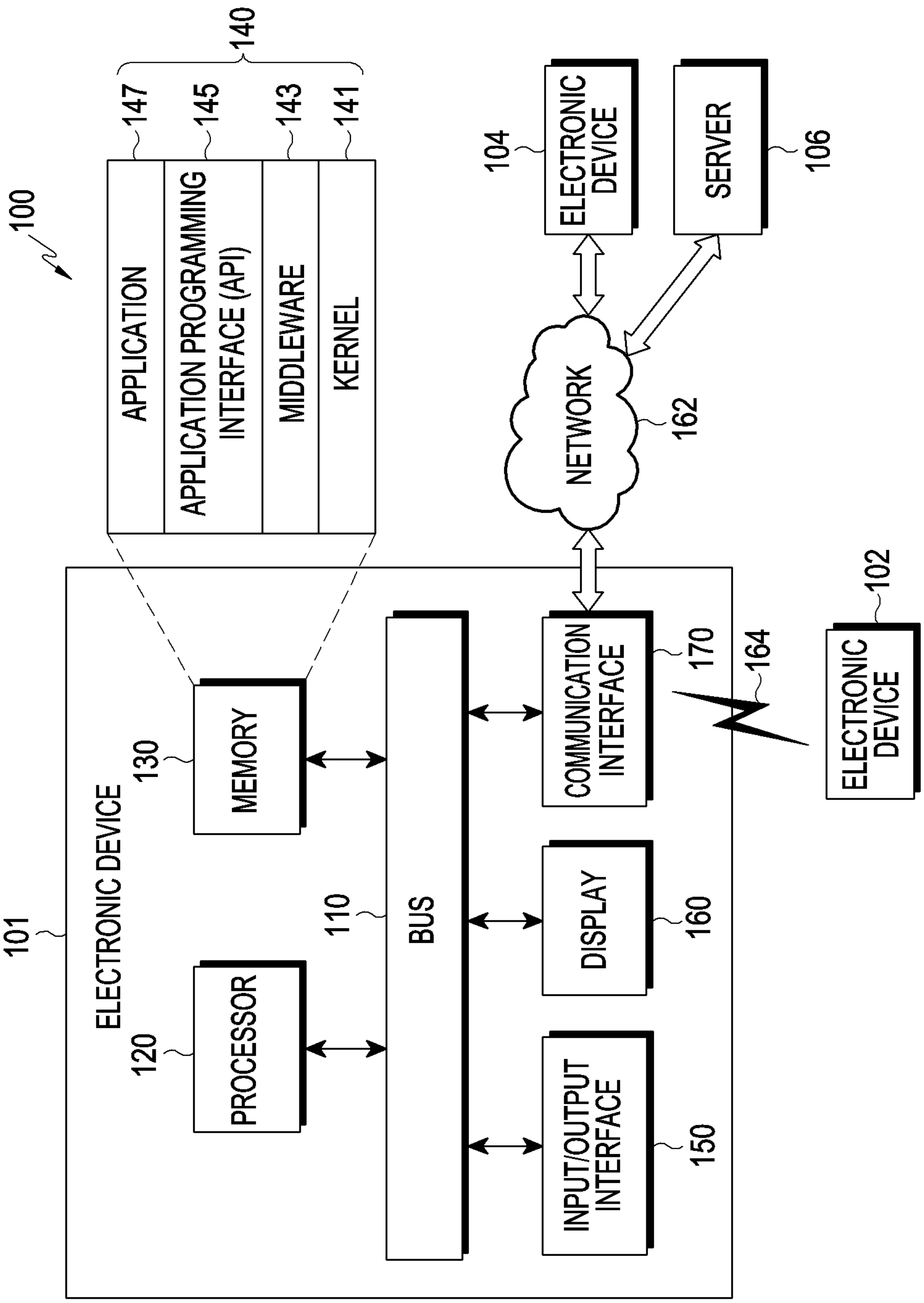
FIG. 1 is a block diagram of an electronic device and a network according to various embodiments of the present disclosure.

Hereinafter, various embodiments of the present disclosure will be disclosed with reference to the accompanying drawings. However, it should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements.

In the present disclosure, an expression such as “having,” “may have,” “comprising,” or “may comprise” indicates existence of a corresponding characteristic (e.g., a numerical value, a function, an operation, or an element like a part) and does not exclude existence of additional characteristic.

As used herein, each of such phrases as “A or B,” “at least one of A or/and B,” “at least one or more of A or/and B,” and so forth may include all possible combinations of the items enumerated together in a corresponding one of the phrases. For example, “A or B,” “at least one of A and B,” or “one or more of A or B” may indicate the entire of (1) including at least one A, (2) including at least one B, or (3) including both at least one A and at least one B.

As used herein, such terms as “1st” and “2nd,” or “first” and “second” may be used to define various components regardless of importance or order, and simply distinguish a corresponding component from another without limiting the components. For example, a first user device and a second user device may represent different user devices regardless of order or importance. For example, a first element may be named as a second element without departing from the right scope of the various exemplary embodiments of the present disclosure, and similarly, a second element may be named as a first element.

When it is described that an element (such as a first element) is “operatively or communicatively coupled with/to” or “connected” to another element (such as a second element), the element can be directly connected to the other element or can be connected to the other element through another element (e.g., a third element). However, when it is described that an element (e.g., a first element) is “directly connected” or “directly coupled” to another element (e.g., a second element), it means that there is no intermediate element (e.g., a third element) between the element and the other element.

An expression "configured to (or set)" used in the present disclosure may be replaced with, for example, "suitable for," "having the capacity to," "designed to," "adapted to," "made to," or "capable of" according to a situation. A term "configured to (or set)" does not always mean only "specifically designed to" by hardware. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor) that can perform a corresponding operation by executing at least one software program stored at a memory device. A term "configured to (or set)" does not always mean only "specifically designed to" by hardware.

Terms defined in the present disclosure are used for only describing a specific exemplary embodiment and may not have an intention to limit the scope of other exemplary embodiments. The singular forms are intended to include the plural forms as well, unless the context clearly indicates otherwise. All of the terms used herein including technical or scientific terms have the same meanings as those generally understood by an ordinary skilled person in the related art. The terms defined in a generally used dictionary should be interpreted as having meanings that are the same as or similar with the contextual meanings of the relevant technology and should not be interpreted as having ideal or exaggerated meanings unless they are clearly defined in the various exemplary embodiments. In some case, terms defined in the present disclosure cannot be analyzed to exclude the present exemplary embodiments.

An electronic device according to various embodiments of the present disclosure may include at least one of, for example, a smartphone, a tablet personal computer (PC), a mobile phone, a video phone, an electronic-book (e-book) reader, a desktop PC, a laptop PC, a netbook computer, a workstation, a server, a personal digital assistant (PDA), a portable multimedia player (PMP), an MP3 player, a mobile medical equipment, a camera, and a wearable device. According to various embodiments, examples of the wearable device may include at least one of an accessory type (e.g., a watch, a ring, a bracelet, an anklet, a necklace, glasses, contact lenses, head-mounted device (HMD), etc.), a fabric or cloth-integrated type (e.g., electronic clothing, etc.), a body-attached type (e.g., a skin pad, a tattoo, etc.), a body implanted type (e.g., an implantable circuit, etc.), and so forth.

In some embodiments, the electronic device may be a home appliance. The home appliance may include, for example, a television (TV), a digital video disk (DVD) player, audio equipment, a refrigerator, an air conditioner, a vacuum cleaner, an oven, a microwave oven, a laundry machine, an air cleaner, a set-top box, a home automation control panel, a security control panel, a TV box (e.g., Samsung HomeSync™, Apple TV™, or Google TV™), a game console (e.g., Xbox™, Play Station™, etc.), an electronic dictionary, an electronic key, a camcorder, and an electronic frame.

In other embodiments, the electronic device may include at least one of various medical equipment (for example, various portable medical measurement devices (a blood glucose monitoring device, a heart rate monitoring device, a blood pressure measuring device, a body temperature measuring device, etc.), a magnetic resonance angiography (MRA), magnetic resonance imaging (MRI), computed tomography (CT), an imaging device, an ultrasonic device, etc.), a navigation system, a global navigation satellite system (GNSS), an event data recorder (EDR), a flight data recorder (FDR), a vehicle infotainment device, electronic equipment for ships (e.g., a navigation system and gyro compass for ships), avionics, a security device, a vehicle head unit, an industrial or home robot, an automatic teller's machine (ATM), a point of sales (POS), Internet of things (e.g., electric bulbs, various sensors, electricity or gas meters, sprinkler devices, fire alarm devices, thermostats, streetlights, toasters, exercise machines, hot-water tanks, heaters, boilers, or the like).

According to some embodiments, the electronic device may include a part of a furniture or building/structure, an electronic board, an electronic signature receiving device, a projector, and various measuring instruments (e.g., water, electricity, gas, electric wave measuring devices, etc.). In various embodiments, the electronic device may be one of the above-listed devices or a combination thereof. In some embodiments, the electronic device may be a flexible electronic device. The electronic device according to various embodiments is not limited to the above-listed devices and may include new electronic devices according to technical development.

Hereinafter, an electronic device according to various embodiments of the present disclosure will be described with reference to the accompanying drawings. Herein, the term "user" may refer to a person who uses the electronic device or a device using the electronic device (e.g., an artificial intelligent (AI) electronic device).

FIG. 1 illustrates a network environment including an electronic device according to various embodiments of the present disclosure.

Referring to FIG. 1, an electronic device 101 in a network environment 100 according to various embodiments is disclosed. The electronic device 101 may include a bus 110, a processor 120, a memory 130, an input/output (I/O) interface 150, a display 160, and a communication interface 170. In some embodiments, the electronic device 101 may not include at least one of the foregoing elements or may further include other elements.

The bus 110 may include a circuit for connecting, e.g., the elements 110 to 170 and delivering communication (e.g., a control message and/or data) between the elements 110 to 170.

The processor 120 may include one or more of a central processing unit (CPU), an application processor (AP), and a communication processor (CP). The processor 120 performs operations or data processing for control and/or communication of, for example, at least one other elements of the electronic device 101.

The memory 130 may include a volatile and/or nonvolatile memory. The memory 130 may store, for example, commands or data associated with at least one other elements of the electronic device 101. According to an embodiment, the memory 130 may store software and/or a program 140. The program 140 may include at least one of, for example, a kernel 141, middleware 143, an application programming interface (API) 145, and/or an application program (or "application") 147, and the like. At least some of the kernel 141, the middleware 143, and the API 145 may be referred to as an operating system (OS).

The kernel 141 may control or manage, for example, system resources (e.g., the bus 110, the processor 120, the memory 130, etc.) used to execute operations or functions implemented in other programs (e.g., the middleware 143, the API 145, or the application program 147). The kernel 141 provides an interface through which the middleware 143, the API 145, or the application program 147 accesses separate components of the electronic device 101 to control or manage the system resources.

The middleware 143 may work as an intermediary for allowing, for example, the API 145 or the application program 147 to exchange data in communication with the kernel 141.

In addition, the middleware 143 may process one or more task requests received from the application program 147 based on priorities. For example, the middleware 143 may give a priority for using a system resource (e.g., the bus 110, the processor 120, the memory 130, etc.) of the electronic device 101 to at least one of the application programs 147. For example, the middleware 143 may perform scheduling or load balancing with respect to the one or more task requests by processing the one or more task requests based on the priority given to the at least one of the application programs 147.

The API 145 is an interface used for the application 147 to control a function provided by the kernel 141 or the middleware 143, and may include, for example, at least one interface or function (e.g., a command) for file control, window control, image processing or character control.

The I/O interface 150 serves as an interface for delivering, for example, a command or data input from a user or another external device to other component(s) of the electronic device 101. The I/O interface 150 may also output a command or data received from other component(s) of the electronic device 101 to a user or another external device.

The display 160 may include, for example, a liquid crystal display (LCD), a light emitting diode (LED) display, an organic light emitting diode (OLED) display, a microelectromechanical system (MEMS) display, or an electronic paper display. The display 160 may, for example, display various contents (e.g., a text, an image, video, an icon, a symbol, etc.) to users. The display 160 may include a touch screen, and receives a touch, a gesture, proximity, or a hovering input, for example, by using an electronic pen or a part of a body of a user.

The communication interface 170 establishes communication between the electronic device 101 and an external device (e.g., a first external electronic device 102, a second external electronic device 104, or a server 106). For example, the communication interface 170 may be connected to a network 462 through wireless communication or wired communication to communicate with an external device (e.g., the second external electronic device 104 or the server 106).

The wireless communication may use, as a cellular communication protocol, for example, at least one of Long Term Evolution (LTE), LTE-Advanced (LTE-A), Code Division Multiple Access (CDMA), Wideband CDMA (WCDMA), a Universal Mobile Telecommunication System (UNITS), Wireless Broadband (WiBro), or Global System for Mobile Communications (GSM). The wired communication may include, for example, short-range communication 164. The short-range communication 164 may include, for example, at least one of WiFi, Bluetooth, NFC, and GNSS. Depending on a usage area or bandwidth, the GNSS may include, for example, at least one of a global positioning system (GPS), a global navigation satellite system (Glonass), a Beidou navigation satellite system ("Beidou"), and Galileo, the European global satellite-based navigation system. Hereinbelow, "GPS" may be used interchangeably with "GNSS". The wired communication may include, for example, at least one of USB, HDMI, RS-232, and POTS. The network 162 may include a telecommunications network, for example, at least one of a computer network (e.g., a local area network (LAN) or a wide area network (WAN)), Internet, and a telephone network.

Each of the first external electronic device 102 and the second external electronic device 104 may be a device of the same type as or a different type than the electronic device 101. For example, the first electronic device 101 may be a smart phone, and the first external electronic device 102 may be a speaker or a tablet PC. According to an embodiment, the server 106 may include a group of one or more servers. According to various embodiments, some or all of operations performed by the electronic device 101 may be performed in another electronic device or a plurality of other electronic devices (e.g., the electronic device 102 or 104, or the server 106). For example, the first electronic device 101 may reproduce a part (e.g., a first channel sound source) of sound source data, and the first external electronic device 102 may reproduce another part (e.g., a second channel sound source) of the sound source data. According to an embodiment, when the electronic device 101 has to perform a function or a service automatically or at a request, the electronic device 101 may request another device (e.g., the electronic device 102 or 104 or the server 106) to perform at least some functions associated with the function or the service, instead of or in addition to executing the function or the service. The another electronic device (e.g., the electronic device 102 or 104 or the server 106) may execute the requested function or an additional function and deliver the execution result to the electronic device 101. The electronic device 101 may then process or further process the received result to provide the requested function or service. To that end, a cloud computing, distributed computing, or client-server computing technology may be used, for example.

Figure 2:
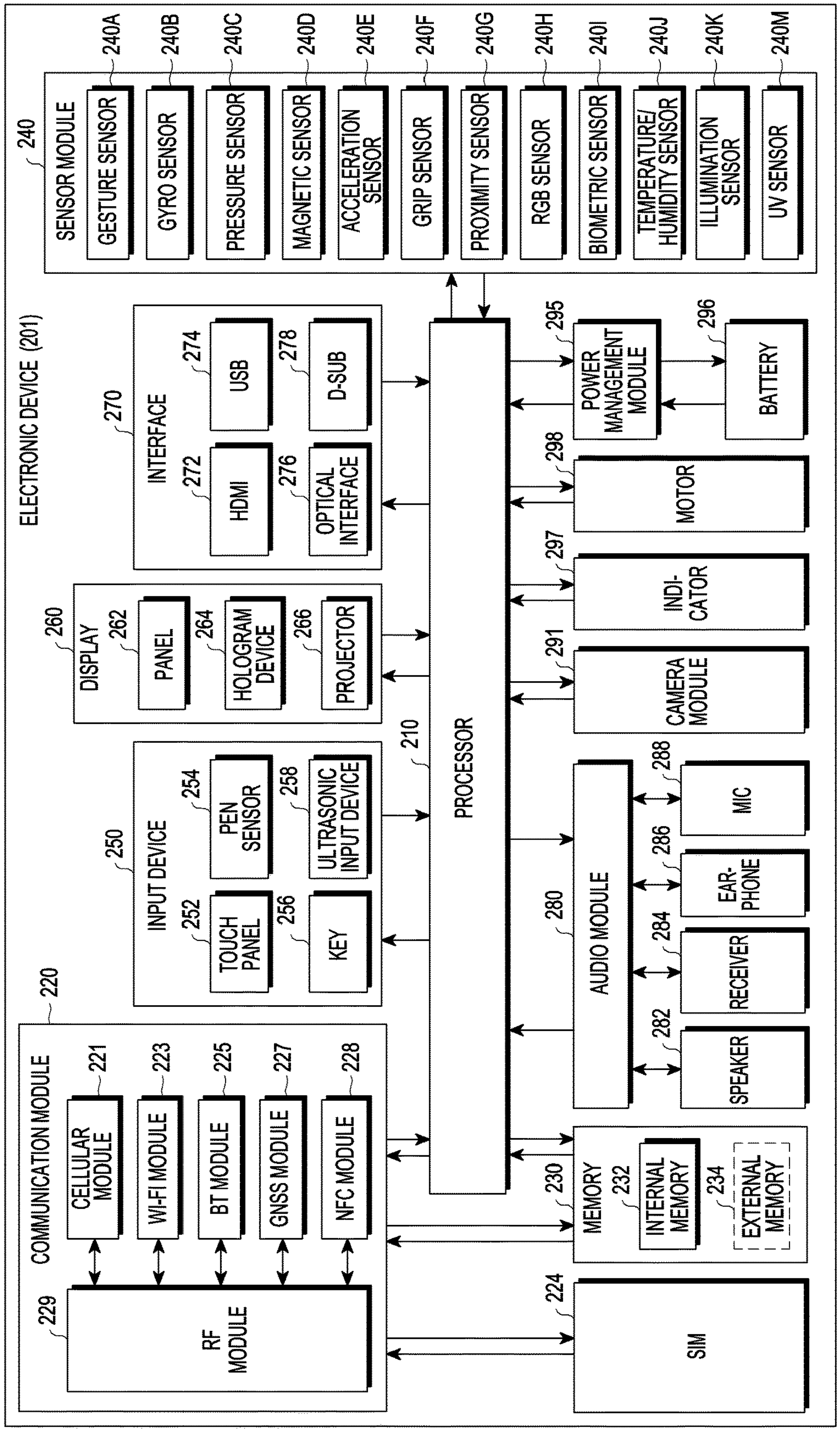
FIG. 2 is a block diagram of an electronic device according to various embodiments.

FIG. 2 is a block diagram of an electronic device 201 according to various embodiments. The electronic device 201 may include the entire electronic device 101 illustrated in FIG. 1 or a part thereof. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 controls multiple hardware or software components connected to the processor 210 by driving an OS or an application program and performs processing and operations with respect to various data. The processor 210 may be implemented with, for example, a system on chip (SoC). According to an embodiment of the present disclosure, the server 210 may include a GPU and/or an image signal processor. The processor 210 may include at least some of the elements illustrated in FIG. 2 (e.g., the cellular module 221). The processor 210 loads a command or data received from at least one of other elements (e.g., a non-volatile memory) into a volatile memory to process the command or data and stores various data in the non-volatile memory.

The communication module 220 may have a configuration that is the same as or similar to the communication interface 170 illustrated in FIG. 1. The communication module 220 may include, for example, at least one of the cellular module 221, a WiFi module 223, a Bluetooth (BT)

module 225, a GNSS module 227 (e.g., a GPS module, a Glonass module, a Beidou module, or a Galileo module), an NFC module 228, and a radio frequency (RF) module 229.

The cellular module 221 may provide, for example, a voice call, a video call, a text service, or an Internet service over a communication network. According to an embodiment, the cellular module 221 identifies and authenticates the electronic device 201 in a communication network by using the SIM 224 (e.g., a SIM card). According to an embodiment, the cellular module 221 performs at least one of functions that may be provided by the processor 210. According to an embodiment, the cellular module 221 may include a communication processor (CP).

Each of the WiFi module 223, the BT module 225, the GNSS module 227, and the NFC module 228 may include, for example, a processor for processing data transmitted and received by a corresponding module. According to an embodiment, at least some (e.g., two or more) of the cellular module 221, the WiFi module 223, the BT module 225, the GNSS module 227, and the NFC module 228 may be included in one integrated chip (IC) or IC package.

The RF module 229 may, for example, transmit and receive a communication signal (e.g., an RF signal). The RF module 229 may include a transceiver, a power amp module (PAM), a frequency filter, a low noise amplifier (LNA), or an antenna. According to another embodiment, at least one of the cellular module 221, the WiFi module 223, the BT module 225, the GNSS module 227, and the NFC module 228 may transmit and receive an RF signal through the separate RF module.

The SIM 224 may include, for example, a card including a SIM and/or an embedded SIM, and may include unique identification information (e.g., an integrated circuit card identifier (ICCID) or subscriber information (e.g., an international mobile subscriber identity (IMSI)).

The memory 230 (e.g., the memory 130) may, for example, include an internal memory 232 and/or an external memory 234. The internal memory 232 may include, for example, at least one of a volatile memory (e.g., a dynamic random-access memory (DRAM), static RAM (SRAM), a synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), etc.), mask ROM, flash ROM, NAND flash memory, NOR flash memory, etc.), and a solid-state drive (SSD).

The external memory 234 may further include flash drive, for example, compact flash (CF), secure digital (SD), micro-SD, mini-SD, extreme Digital (xD), a multi-media card (MMC), or a memory stick. The external memory 234 may be functionally and/or physically connected with the electronic device 201 through various interfaces.

The sensor module 240 may, for example, measure physical quantity or sense an operation state of the electronic device 201 to convert the measured or sensed information into an electric signal. The sensor module 240 may include, for example, at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, an illumination sensor 240K, and a ultraviolet (UV) sensor 240M. Additionally or alternatively, the sensor module 240 may include an E-nose sensor (not shown), an electromyography (EMG) sensor (not shown), an electroencephalogram (EEG) sensor (not shown), an electrocardiogram (ECG) sensor (not shown), an infrared (IR) sensor, an iris sensor, and/or a fingerprint sensor. The sensor module 240 may further include a control circuit for controlling at least one sensor included therein. In an embodiment, the electronic device 201 may further include a processor configured to control the sensor module 240 as part of or separately from the processor 210, to control the sensor module 240 during a sleep state of the processor 210.

The input device 250 may include, for example, a touch panel 252, a (digital) pen sensor 254, a key 256, or an ultrasonic input device 258. The touch panel 252 may use at least one of a capacitive type, a resistive type, an IR type, or an ultrasonic type. The touch panel 252 may further include a control circuit. The touch panel 252 may further include a tactile layer to provide tactile reaction to the user.

The (digital) pen sensor 254 may include a recognition sheet which is a part of the touch panel 252 or a separate recognition sheet. The key 256 may also include a physical button, an optical key, or a keypad. The ultrasonic input device 258 senses ultrasonic waves generated by an input means through a microphone (e.g., the microphone 288) and checks data corresponding to the sensed ultrasonic waves.

The display 260 (e.g., the display 160) may include a panel 262, a hologram device 264, or a projector 266. The panel 262 may have a configuration that is the same as or similar to the display 160 illustrated in FIG. 1. The panel 262 may be implemented to be flexible, transparent, or wearable. The panel 262 may be configured with the touch panel 252 in one module. The hologram device 264 shows a stereoscopic image in the air by using interference of light. The projector 266 displays an image onto a screen through projection of light. The screen may be positioned inside or outside the electronic device 201. According to an embodiment, the display 260 may further include a control circuit for controlling the panel 262, the hologram device 264, or the projector 266.

The interface 270 may include an HDMI 272, a universal serial bus (USB) 274, an optical communication 276, or a D-subminiature 278. The interface 270 may be included in the communication interface 170 illustrated in FIG. 1. Additionally or alternatively, the interface 270 may include, for example, a mobile high-definition link (MHL) interface, an SD card/MMC interface, or an Infrared Data Association (IrDA) standard interface.

The audio module 280 bi-directionally converts sound and an electric signal. At least some element of the audio module 280 may be included, for example, in the I/O interface 150 illustrated in FIG. 1. The audio module 280 processes sound information input or output through the speaker 282, the receiver 284, the earphone 286, or the microphone 288.

The camera module 291 is a device capable of capturing a still image or a moving image, and according to an embodiment, may include one or more image sensors (e.g., a front sensor or a rear sensor), a lens, an image signal processor (ISP), or a flash (e.g., an LED, a xenon lamp, etc.).

The power management module 295 manages power of, for example, the electronic device 201. According to an embodiment, the power management module 295 may include a power management integrated circuit (PMIC), a charger IC, or a battery or fuel gauge. The PMIC may have a wired and/or wireless charging scheme. The wireless charging scheme includes a magnetic-resonance type, a magnetic induction type, and an electromagnetic type, and may further include an additional circuit for wireless charging, for example, a coil loop, a resonance circuit, or a rectifier. The battery gauge measures the remaining capacity of the battery 296 or the voltage, current, or temperature of the battery 296 during charging. The battery 296 may include, for example, a rechargeable battery and/or a solar battery.

The indicator 297 displays a particular state, for example, a booting state, a message state, or a charging state, of the electronic device 201 or a part thereof (e.g., the processor 210). The motor 298 converts an electric signal into mechanical vibration or generates vibration or a haptic effect. Although not shown, the electronic device 201 may include a processing device (e.g., a GPU) for supporting a mobile TV. The processing device for supporting the mobile TV processes media data according to a standard such as digital multimedia broadcasting (DMB), digital video broadcasting (DVB), mediaFlo™, etc.

Each of the foregoing elements described herein may be configured with one or more components, names of which may vary with a type of the electronic device. In various embodiments, the electronic device may include at least one of the foregoing elements, some of which may be omitted or to which other elements may be added. In addition, some of the elements of the electronic device according to various embodiments may be integrated into one entity to perform functions of the corresponding elements in the same manner as before they are integrated.

Figure 3:
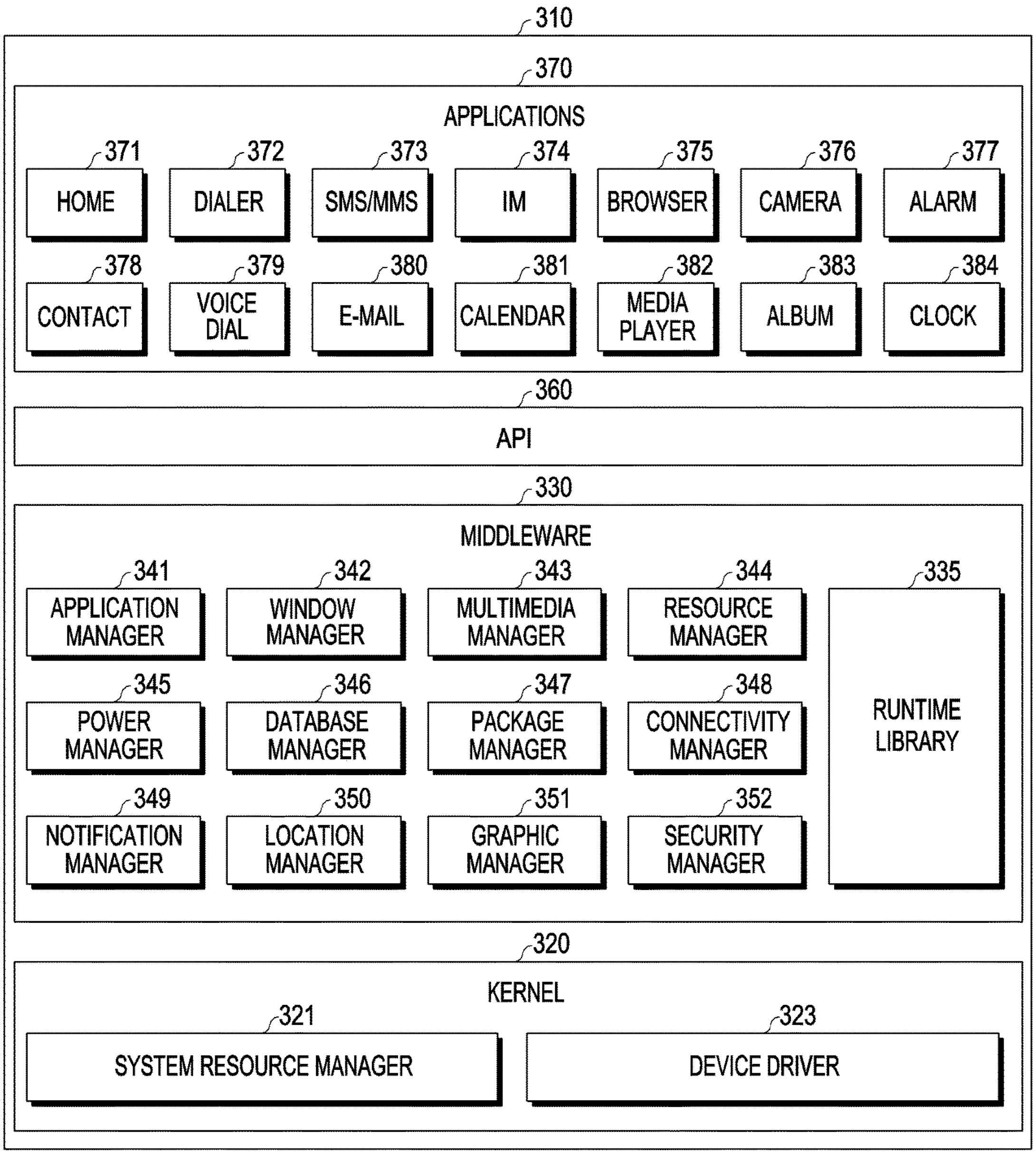
FIG. 3 is a block diagram of a programming module according to various embodiments.

FIG. 3 is a block diagram of a programming module according to various embodiments. According to an embodiment, a programming module 310 (e.g., the program 140) may include an OS for controlling resources associated with an electronic device (e.g., the electronic device 101) and/or various applications (e.g., the application program 147) executed on the OS. The OS may include, for example, Android™, IOS™, Windows™, Symbian™, Tizen™, Bada™, or the like.

The programming module 310 may include, for example, a kernel 320, middleware 330, an application programming interface (API) 360, and/or an application 370. At least a part of the programming module 310 may be preloaded on an electronic device or may be downloaded from an external electronic device (e.g., the electronic device 102 or 104, or the server 106).

The kernel 320 (e.g., the kernel 141) may include, for example, a system resource manager 321 and/or a device driver 323. The system resource manager 321 may perform control, allocation, retrieval of system resources, and so forth. According to an embodiment, the system resource manager 321 may include a process management unit, a memory management unit, a file system management unit, and the like. The device driver 323 may include, for example, a display driver, a camera driver, a Bluetooth driver, a shared memory driver, a USB driver, a keypad driver, a WiFi driver, an audio driver, or an inter-process communication (IPC) driver.

The middleware 330 may provide functions that the applications 370 commonly require or may provide various functions to the application 370 through the API 360 to allow the application 370 to efficiently use a limited system resource in an electronic device. According to an embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses to add a new function through a programming language while the application 370 is executed. The runtime library 335 performs functions related to an input/output, memory management, or calculation operation.

The application manager 341 manages a life cycle of at least one of the applications 370. The window manager 342 manages a GUI resource used on a screen. The multimedia manager 343 recognizes a format necessary for playing various media files and performs encoding or decoding with respect to a media file by using a codec appropriate to a corresponding format. The resource manager 344 manages a resource such as source code, a memory, or a storage space of at least one of the applications 370.

The power manager 345 manages a battery or power, for example, in cooperation with a basic input/output system (BIOS) and provides power information necessary for an operation of the electronic device. The database manager 346 generates, searches or changes a database used for at least one of the applications 370. The package manager 347 manages the installation or update of an application distributed in a package file format.

The connectivity manager 348 manages a wireless connection such as a WiFi or Bluetooth connection. The notification manager 349 displays or notifies events such as arrival messages, appointments, and proximity alerts in a manner that is not disruptive to a user. The location manager 350 manages location information of an electronic device. The graphic manager 351 manages a graphic effect to be provided to a user or a user interface related thereto. The security manager 352 provides a general security function necessary for system security or user authentication. According to an embodiment, when the electronic device (e.g., the electronic device 101) has a phone function, the middleware 330 may further include a telephony manager for managing a voice or video call function of the electronic device.

The middleware 330 may include a middleware module forming a combination of various functions of the above-mentioned elements. The middleware 330 may provide modules specified according to types of an OS so as to provide distinctive functions. The middleware 330 may also delete some of existing elements or add new elements dynamically.

The API 360 (e.g., the API 145) may be provided as a set of API programming functions with a different configuration according to the OS. For example, in Android or iOS, one API set may be provided for each platform, and in Tizen, two or more API sets may be provided for each platform.

The application 370 (e.g., the application program 147) may include one or more applications capable of providing a function, for example, a home application 371, a dialer application 372, a short messaging service/multimedia messaging service (SMS/MMS) application 373, an instant message (IM) application 374, a browser application 375, a camera application 376, an alarm application 377, a contact application 378, a voice dial application 379, an e-mail application 380, a calendar application 381, a media player application 382, an album application 383, a clock application 384, a health care application (e.g., an application for measuring an exercise amount, a blood sugar, etc.), or an environment information providing application (e.g., an application for providing air pressure, humidity, or temperature information or the like).

According to an embodiment, the media player application 382 may be an application for outputting sound source data stored in a memory (e.g., the memory 130) of an electronic device (e.g., the electronic device 101) through an I/O interface (e.g., the I/O interface 150). According to an embodiment, the media player application 382 may be configured to encode the sound source data, apply a sound effect, and convert digital data into analog data. According to an embodiment, the media player application 382 may be configured to apply the sound effect based on a sound effect selection input received through the I/O interface 150.

According to an embodiment, the media player application 382 may be configured to apply at least one of an equalizer effect, a 7.1-channel surround effect, a bass boost effect, a treble boost effect, a three-dimensional (3D) effect, a clarity effect, a reverberation effect, and a vacuum tube amp effect to the sound source data stored in the memory 130.

According to an embodiment, the application 370 may include an application (hereinafter, an "information exchange application" for convenience) supporting information exchange between the electronic device (e.g., the electronic device 101) and an external electronic device (e.g., the electronic device 102 or 104). The information exchange application may include, for example, a notification relay application for transferring specific information to the external electronic device or a device management application for managing the external electronic device.

For example, the notification relay application may include a function for transferring notification information generated in another application (e.g., an SMS/MMS application, an e-mail application, a health care application, or an environment information application) of the electronic device to an external electronic device (e.g., the electronic device 102 or 104). The notification relay application may receive notification information from an external electronic device to provide the same to a user.

The device management application may manage (e.g., install, remove, or update) at least one function (e.g., turn-on/turn-off of an external electronic device itself (or a part thereof) or control of brightness (or resolution) of a display) of an external device (e.g., the electronic device 102 or 104) communicating with the electronic device, an application operating in an external electronic device or a service (e.g., a call service or a message service) provided in the external electronic device.

According to an embodiment, the application 370 may include an application (e.g., device health care application of mobile medical equipment) designated according to an attribute of the external electronic device (e.g., the electronic device 102 or 104). According to an embodiment, the application 370 may include an application received from the external electronic device (e.g., the server 106 or the electronic device 102 or 104). According to an embodiment, the application 370 may include a preloaded application or a third-party application that may be downloaded from the server. Names of elements of the programming module 310 according to the illustrated embodiment may vary depending on a type of an OS.

According to various embodiments, at least a part of the programming module 310 may be implemented by software, firmware, hardware, or a combination of at least two of them. The at least a part of the programming module 310 may be implemented (e.g., executed) by a processor (e.g., the processor 210). At least some of the programming module 310 may include, for example, modules, programs, routines, sets of instructions, or processes for performing one or more functions.

Figure 4:
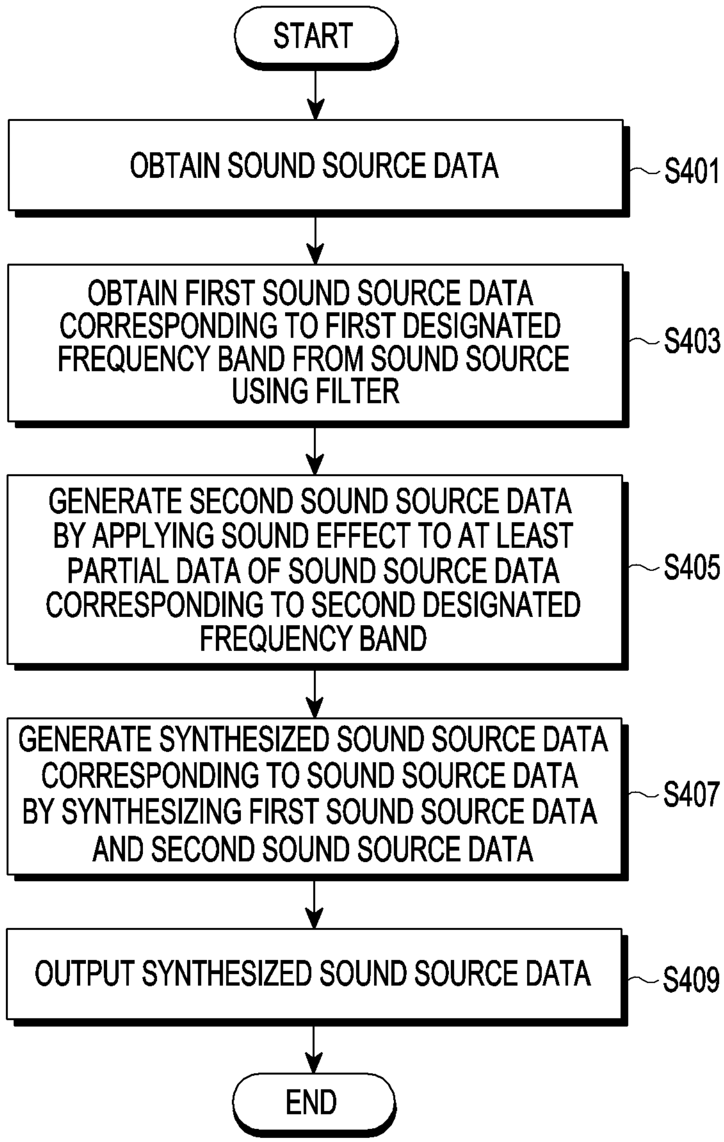
FIG. 4 is a flowchart illustrating a method for controlling an electronic device according to various embodiments of the present disclosure.

FIG. 4 is a flowchart illustrating a method for controlling an electronic device according to various embodiments of the present disclosure.

As illustrated in FIG. 4, according to various embodiments, in operation S401, a processor (e.g., the processor 120) of an electronic device (e.g., the electronic device 101) obtains sound source data stored in a memory (e.g., the memory 130) of the electronic device 101.

According to various embodiments, the processor 120 reproduces (e.g., outputs) the sound source data through at least one sound source output device (e.g., the speaker 282, the earphone 286, a tablet PC, etc.) functionally connected with the processor 120.

According to various embodiments, the processor 120 receives an input for selecting a sound effect and/or an input for applying a sound effect to a sound source to be reproduced, through an input device (e.g., the touch panel 252).

According to various embodiments, upon receiving an input for selecting a sound effect and/or an input for applying a sound effect to a sound source to be reproduced, through the input device 252, the processor 120 may determine whether the reproduction sound source is a super-high-quality sound source.

According to various embodiments, to determine whether the reproduction sound source is a super-high-quality sound source, the processor 120 determines whether sound source data of the reproduction sound source corresponds to a designated attribute (e.g., a sampling rate).

According to various embodiments, once determining that the sound source data does not correspond to the designated attribute, the processor 120 applies the sound effect to the sound source data.

According to various embodiments, when the sound source data corresponds to the designated attribute, the processor 120 determines a first designated frequency band for obtaining first sound source data at least based on the designated attribute.

According to various embodiments, the designated attribute may include a designated sampling rate.

According to various embodiments, when determining that the sampling rate of the sound source data is greater than a designated sampling rate, the processor 120 may determine the sound source data as super-high-quality sound source data, identify a frequency band that is supportable by the sound source data, and determine the first designated frequency band based on the supportable frequency band.

For example, a designated sampling rate that is a criterion for determining whether the sound source is a super-high-quality sound source may be 48 kHz, and for a sampling rate of the sound source of 96 kHz, the processor 120 may determine the reproduction sound source as the super-high-quality sound source.

When the sampling rate of the sound source is 96 kHz, the frequency band supportable by the sound source data may be 48 kHz that is a ½ frequency of the sampling rate of the sound source at 0 kHz. When the sampling rate of the sound source is 96 kHz, the frequency band presented by the sound source data may be a frequency band of 0 kHz to 48 kHz. According to various embodiments, the first designated frequency band may be determined based on a ⅓ frequency of the sampling rate of the sound source, a ¼ frequency of the sampling rate, and/or a 1/N frequency of the sampling rate (e.g., N is a real number) as well as the ½ frequency of the sampling rate.

According to various embodiments, in operation S403, the processor 120 obtains the first sound source data corresponding to the first designated frequency band from the sound source data by using a filter.

According to various embodiments, the filter may be software stored in the memory 130 and/or a hardware filter module functionally connected with the processor 120.

According to various embodiments, the first designated frequency band may be a high-frequency band that is different from a low-frequency band in a frequency band of the sound source data.

According to various embodiments, the first sound source data may be sound source data including data corresponding to the high-frequency band in the frequency band of the sound source data.

According to various embodiments, the processor 120 multiplexes (e.g., copies, separates, or divides) the sound source data into plural sound source data and obtains the first sound source data corresponding to the high-frequency band in a frequency band of partial sound source data by applying a high-pass filter to the partial sound source data of the multiplexed plural sound source data.

According to various embodiments, the processor 120 generates at least partial data by down-sampling the partial sound source data of the multiplexed plural sound source data.

According to various embodiments, in operation S405, the processor 120 generates second sound source data by applying the sound effect to the at least partial data corresponding to a second designated frequency band in the sound source data.

According to various embodiments, the second designated frequency band may be the low-frequency band that is different from the high-frequency band in the frequency band of the sound source data.

According to various embodiments, the at least partial data may be sound source data including data corresponding to the low-frequency band in the frequency band of the sound source data.

According to various embodiments, in operation S407, the processor 120 generates synthesized sound source data corresponding to the sound source data by synthesizing the first sound source data with the second sound source data.

According to various embodiments, in operation S409, the processor 120 reproduces (e.g., outputs) the synthesized sound source data through the at least one speaker 282 functionally connected with the processor 120.

Figure 5:
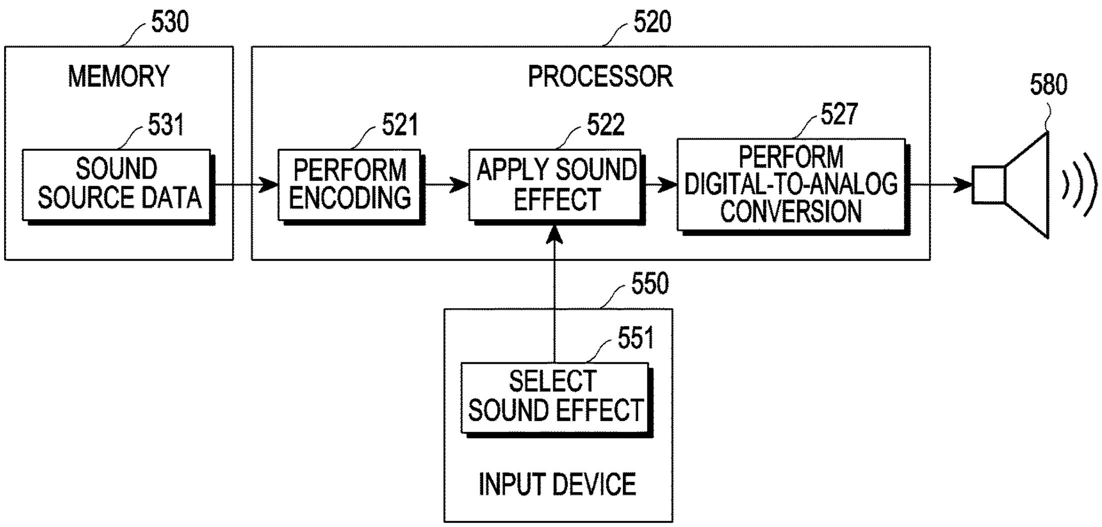
FIG. 5 is a block diagram of an electronic device according to various embodiments of the present disclosure.

FIG. 5 is a block diagram of an electronic device according to various embodiments of the present disclosure.

As shown in FIG. 5, according to various embodiments, an electronic device (e.g., the electronic device 101) may include at least one of a memory 530, a processor 520, a speaker 580, and/or an input device 550.

According to various embodiments, the processor 520 obtains sound source data 531 stored in the memory 530.

According to various embodiments, the processor 520 encodes the obtained sound source data 531 according to a data compression format of the sound source data 531 in operation 521. According to various embodiments, the processor 520 may convert the obtained sound source data 531 into a pulse code modulation (PCM) signal in a signal-processible form by encoding the obtained sound source data 531 according to the data compression format of the sound source data 531 in operation 521.

According to various embodiments, the processor 520 receives a selection with respect to the sound effect to be applied to the encoded sound source data 531 through the input device 550 in operation 551. According to various embodiments, the processor 520 may receive the selection with respect to the sound effect to be applied to the encoded sound source data 531 and/or a sound effect function setting value corresponding to the selected sound effect.

According to various embodiments, the processor 520 applies the selected sound effect to the encoded sound source data 531 according to the received sound effect selection in operation 522.

According to various embodiments, the processor 520 converts the digital sound source data 531 to which the sound effect is applied into analog sound source data that may be output through the speaker 580 and/or an earphone (e.g., the earphone 286) in operation 527 and outputs the analog sound source data through the speaker 580 and/or the earphone 286.

Figure 6:
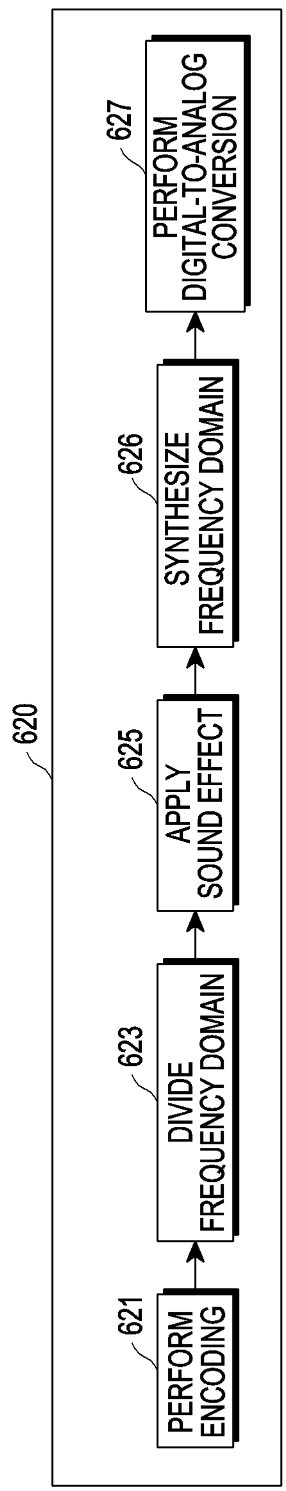
FIG. 6 is a block diagram of an operation process in a processor of an electronic device according to various embodiments of the present disclosure.

FIG. 6 is a block diagram of an operation process in a processor of an electronic device according to various embodiments of the present disclosure.

As shown in FIG. 6, according to various embodiments, a processor 620 encodes obtained sound source data in operation 621.

According to various embodiments, the processor 620 divides a frequency band of the encoded sound source data into a low-frequency band and a high-frequency band based on the first designated frequency band determined based on at least one of a capability of the processor 620, the remaining capacity of the battery (e.g., the battery 296), and a supportable frequency band of a sound effect function in operation 623.

For example, the processor 620 may multiplex the encoded sound source data and obtain the first sound source data corresponding to the high-frequency band by applying the high-pass filter to the partial sound source data of the multiplexed sound source data.

According to various embodiments, after down-sampling the partial sound source data of the multiplexed sound source data, the processor 620 may apply the sound effect to the partial sound source data in operation 625 to generate the second sound source data corresponding to the low-frequency band.

According to various embodiments, the processor 620 may correct the first sound source data based on information about left/right (L/R) balance, time delay, and/or gain characteristics of the second sound source data resulting from the application of the sound effect.

According to various embodiments, the processor 620 synthesizes the obtained first sound source data corresponding to the high-frequency band with the generated second sound source data corresponding to the low-frequency band in operation 626 to generate the synthesized sound source data.

According to various embodiments, the processor 620 converts the synthesized sound source data in a digital form into the synthesized sound source data in an analog form in operation 627.

Figure 7:
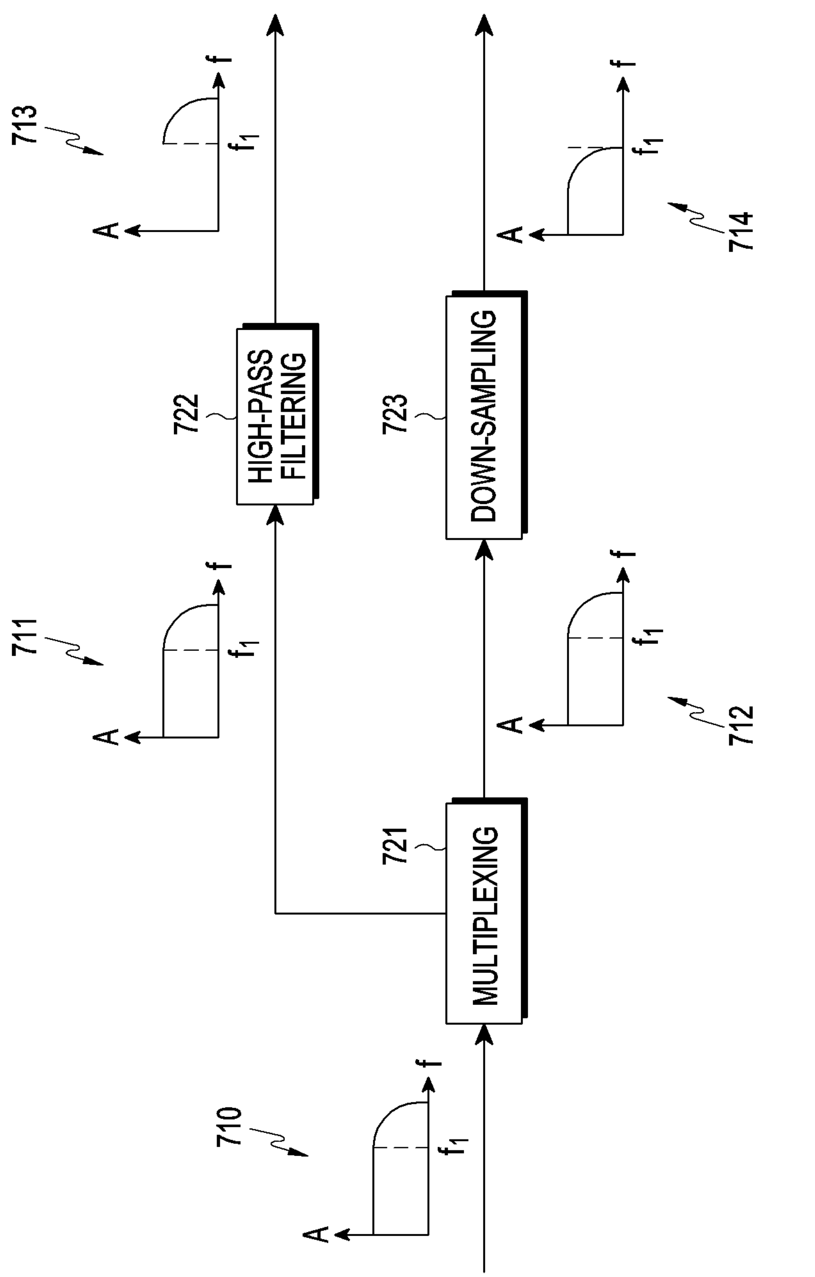
FIG. 7 shows an operation of obtaining first sound source data and generating at least partial data according to various embodiments of the present disclosure.

FIG. 7 shows an operation of obtaining first sound source data and generating at least partial data according to various embodiments of the present disclosure.

As shown in FIG. 7, for example, a processor (e.g., the processor 520) may obtain sound source data 710 from a memory (e.g., the memory 130).

For example, the processor 520 may receive an input for applying a sound effect to the sound source data 710 through an input device (e.g., the input device 550).

The processor 520 may determine a high-frequency band higher than or equal to "$f_1$" kHz as the first designated frequency band to be preserved in a frequency band of the sound source data 710, and a frequency band of 0 kHz to "$f_1$" kHz as the second designated frequency band to which the sound effect is to be applied.

The processor 520 multiplexes the sound source data 710 into partial sound source data 711 and another partial sound source data 712 in operation 721.

The processor 520 performs high-pass filtering with respect to the partial sound source data 711 in operation 722 to preserve the high-frequency band higher than or equal to "$f_1$" kHz, which is the first designated frequency band in the frequency band of the partial sound source data 711 of the multiplexed sound source data. For example, the processor 520 may obtain the first sound source data 713 including the frequency band higher than or equal to "$f_1$" kHz by performing high-pass filtering with respect to the partial sound source data 711 of the multiplexed sound source data in operation 722.

The processor 520 down-samples the partial sound source data 712 in operation 723 to apply the sound effect to the frequency band of 0 kHz to "$f_1$" kHz, which is the second designated frequency band in the frequency band of the partial sound source data 712 of the multiplexed sound source data.

The processor 520 generates at least partial data 714 including the frequency band of 0 kHz to "$f_1$" kHz by down-sampling the partial sound source data 712 of the multiplexed sound source data in operation 723.

Figure 8:
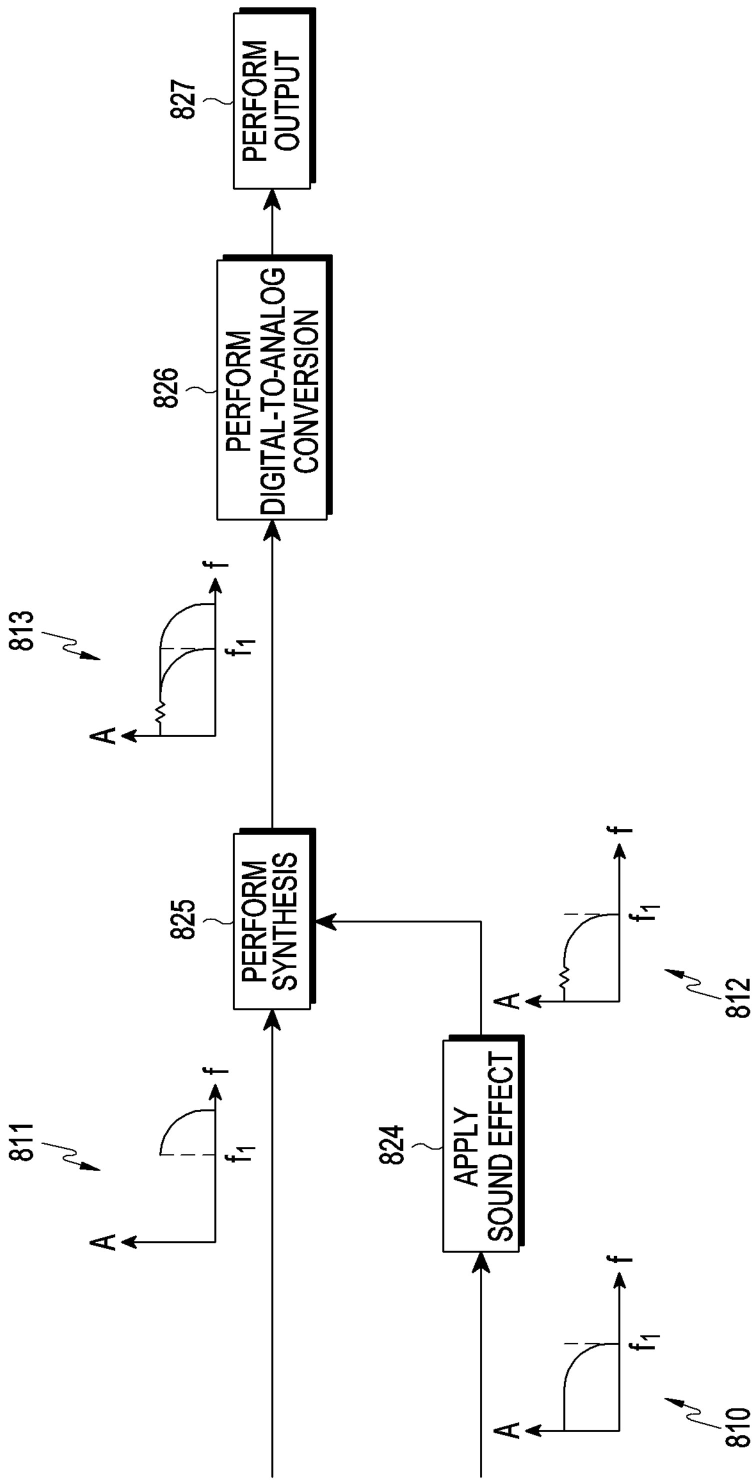
FIG. 8 shows an operation of generating and outputting synthesized sound source data according to various embodiments of the present disclosure.

FIG. 8 shows an operation of generating and outputting synthesized sound source data according to various embodiments of the present disclosure.

For example, first sound source data 811 may be the same as the first sound source data 713 of FIG. 7. The at least partial data 810 may be the same as the at least partial data 714 of FIG. 7.

As shown in FIG. 8, a processor (e.g., the processor 520) applies the sound effect to the at least partial data 810 generated through down-sampling in operation 824. For example, the processor 520 may generate second sound source data 812 by applying the sound effect to the at least partial data 810 in operation 824. The processor 520 may generate the second sound source data 812 including the frequency band of 0 kHz to "$f_1$" kHz by applying the sound effect to the at least partial data 810 including the frequency band of 0 kHz to "$f_1$" kHz in operation 824.

The processor 520 synthesizes the generated first sound source data 811 with the generated second sound source data 812 in operation 825. The processor 520 may synthesize the first sound source data 811 including a frequency band of "$f_1$" kHz or higher and the second sound source data 812 including the frequency band of 0 kHz to "$f_1$" kHz in operation 825. The processor 520 may generate synthesized sound source data 813 including a frequency band of 0 kHz to "$f_1$" kHz or higher by synthesizing the first sound source data 811 including the frequency band of "$f_1$" kHz or higher and the second sound source data 812 including the frequency band of 0 kHz to "$f_1$" kHz in operation 825.

The processor 520 converts the synthesized sound source data 813 in the form of a digital signal into synthesized sound source data in the form of an analog signal in operation 826, and outputs the converted synthesized sound source data in the form of an analog signal through a speaker (e.g., the speaker 580) in operation 827.

Figure 9:
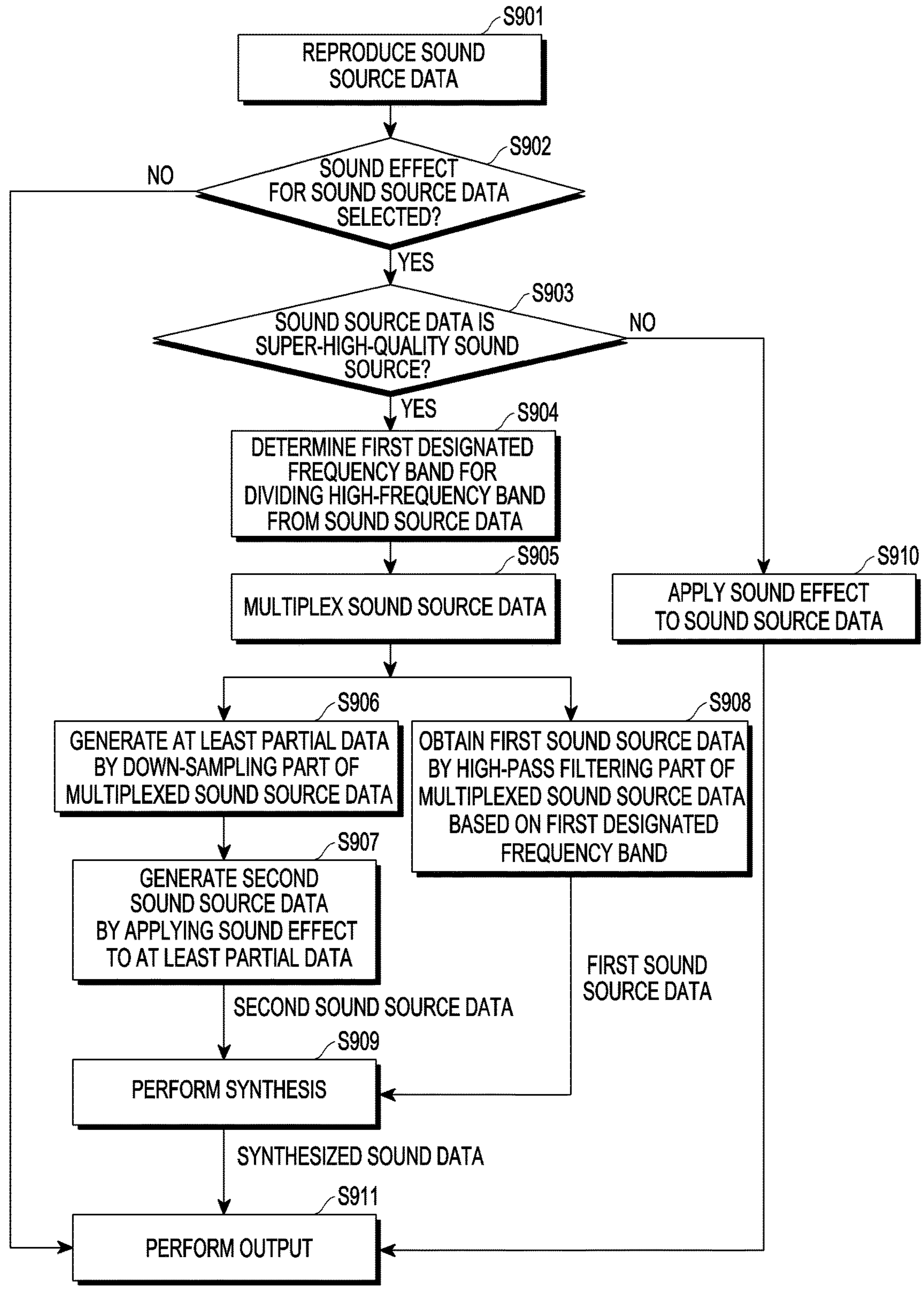
FIG. 9 is a flowchart illustrating a method for controlling an electronic device according to various embodiments of the present disclosure.

FIG. 9 is a flowchart illustrating a method for controlling an electronic device according to various embodiments of the present disclosure.

As shown in FIG. 9, according to various embodiments, in operation S901, the processor (e.g., the processor 520) reproduces (e.g., outputs) sound source data through a speaker (e.g., the speaker 580).

According to various embodiments, in operation S902, the processor 520 determines whether a selection of application of a sound effect to the sound source data is received through an input device (e.g., the input device 550).

According to various embodiments, when determining that the selection of application of the sound effect to the sound source data is not received, the processor 520 outputs the sound source data through a speaker (e.g., the speaker 580) in operation S911. For example, when determining that the selection of application of the sound effect to the sound source data is not received, the processor 520 may output the sound source data without performing operations S903 through S910.

According to various embodiments, when determining that the selection of application of the sound effect to the sound source data is received through the input device 550, the processor 520 determines whether the sound source data is a super-high-quality sound source in operation S903.

According to various embodiments, once determining that the sound source data is not the super-high-quality sound source, the processor 520 applies the sound effect to the sound source data in operation S910. For example, once determining that the sound source data is not the super-high-quality sound source, the processor 520 applies the sound effect to the sound source data in operation S910 without performing operations S904 through S909 with respect to a frequency band of the sound source data.

According to various embodiments, when determining that the sound source data is the super-high-quality sound source, the processor 520 determines a first designated frequency band for separating a high-frequency band from the sound source data in operation S904.

According to various embodiments, in operation S905, the processor 520 multiplexes the sound source data.

According to various embodiments, in operation S906, the processor 520 generates at least partial data by down-sampling partial sound source data of the multiplexed sound source data.

According to various embodiments, in operation S907, the processor 520 generates second sound source data by applying the sound effect to the at least partial data.

According to various embodiments, in operation S908, the processor 520 obtains first sound source data by high-pass filtering the partial sound source data of the multiplexed sound source data on the basis of the first designated frequency band.

According to various embodiments, in operation S909, the processor 520 generates synthesized sound source data corresponding to the sound source data by synthesizing first sound source data with second sound source data.

According to various embodiments, in operation S911, the processor 520 outputs the synthesized sound source data through the speaker 580.

Figure 10:
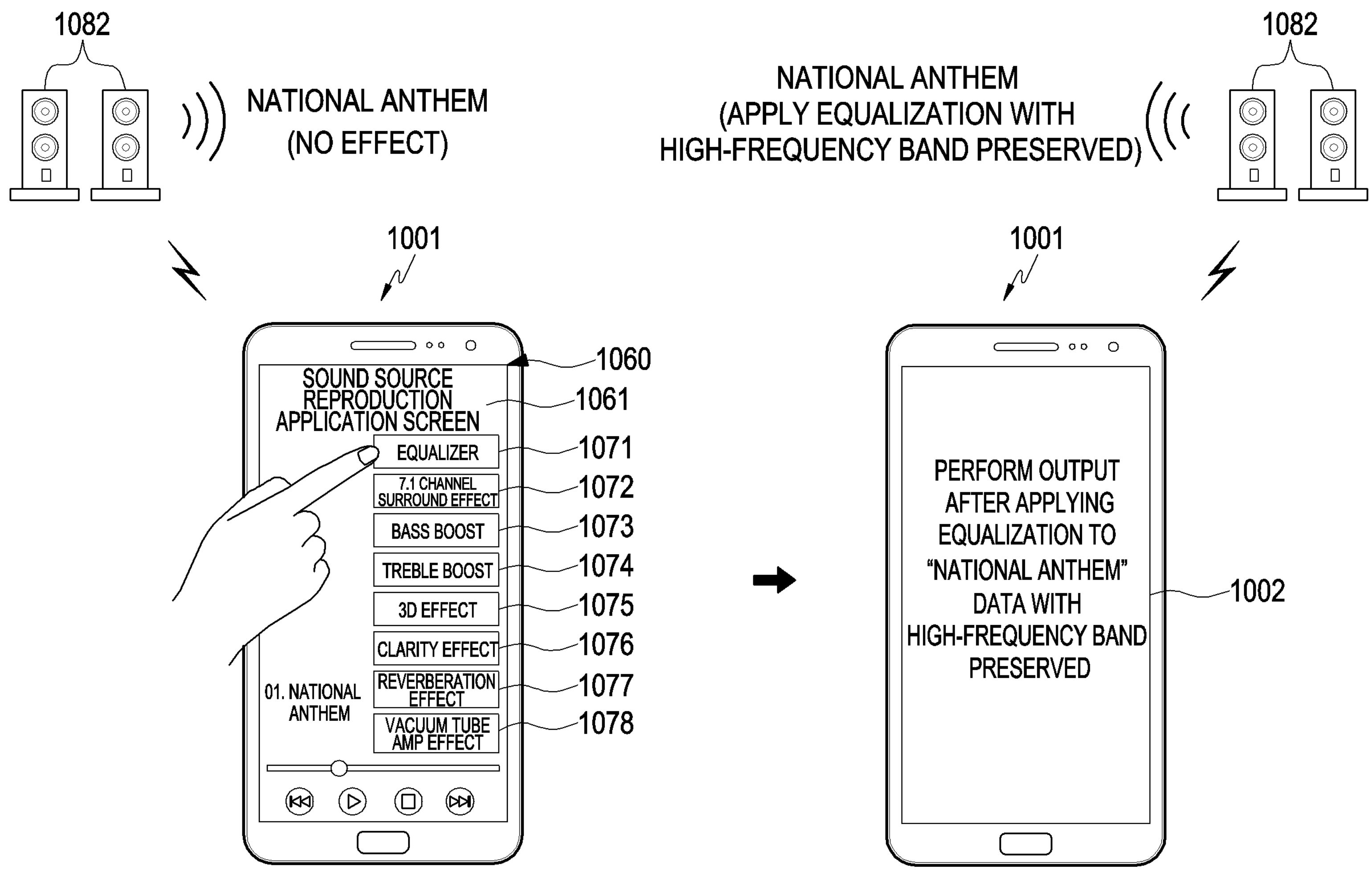
FIG. 10 shows an operation of applying a sound effect and outputting a sound source according to various embodiments of the present disclosure.

FIG. 10 shows an operation of applying a sound effect and outputting a sound source according to various embodiments of the present disclosure.

As shown in FIG. 10, for example, a processor (e.g., the processor 520) included in an electronic device 1001 may output (e.g., reproduce) "national anthem (no effect)" selected through a sound source reproduction application screen 1061 through an external electronic device 102 (e.g., a tablet PC or a speaker 1082) connected using wireless communication or wired communication with the electronic device 1001, while displaying the sound source reproduction application screen 1061 through a display 1060.

For example, the processor 520 may display at least one sound effect items 1071 through 1078 through the display 1061.

The at least one sound effect items may include at least some of an equalizer item 1071, a 7.1-channel surround effect item 1072, a bass boost effect item 1073, a treble boost effect item 1074, a 3D effect item 1075, a clarity effect item 1076, a reverberation effect item 1077, and/or a vacuum tube amp effect item 1078.

Upon receiving a selection of at least one of the sound effect items through the display 1061, the processor 520 determines whether "national anthem" data output through the speaker 1082 is the super-high-quality sound source.

The processor 520 may determine whether a sampling rate of the "national anthem" data is higher than a designated sampling rate.

When determining that the sampling rate of the "national anthem" data is higher than the designated sampling rate, the processor 520 may apply at least some sound effect corresponding to the at least some sound effect item selected from among the equalizer effect, the 7.1-channel surround effect, the bass boost effect, the treble boost effect, the 3D effect, the clarity effect, the reverberation effect, and/or the vacuum tube amp effect to the "national anthem (no effect)" data.

For example, upon receiving a selection of the equalizer item 1071 displayed through the display 1061 through the display 1061, the processor 520 may multiplex the "national anthem" data, obtain first "national anthem" data including a high-frequency band in a frequency band of the "national anthem" data by high-pass filtering partial "national anthem" data of the multiplexed "national anthem" data, and generate second "national anthem" data including a low-frequency band by down-sampling partial "national anthem" data of the multiplexed "national anthem" data and applying the equalizer sound effect thereto. The processor 520 may generate synthesized "national anthem" data having equalization applied thereto with a high-frequency band preserved, by synthesizing the first "national anthem" data and the second "national anthem" data and output the synthesized "national anthem" data through the speaker 1082.

Figure 11:
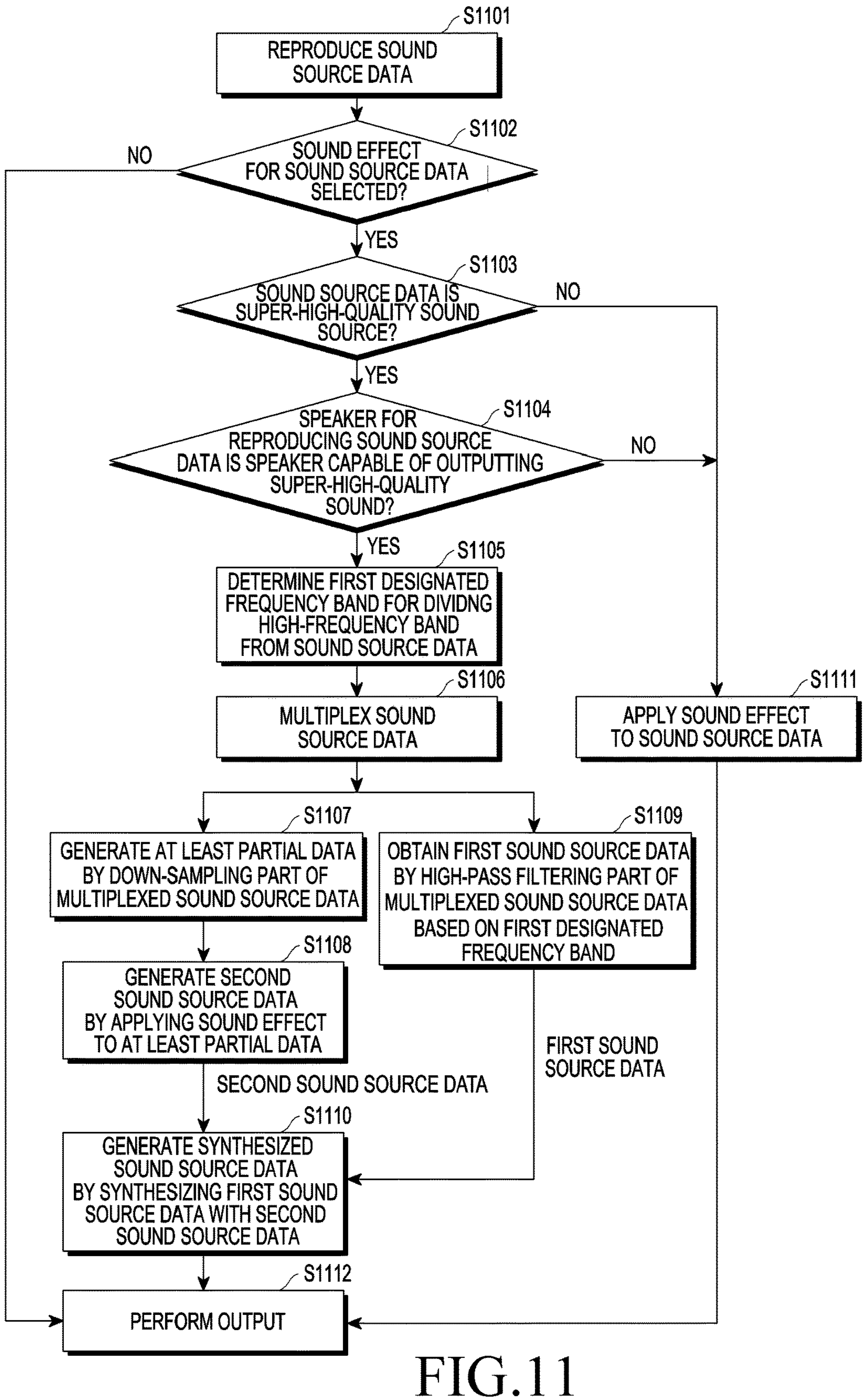
FIG. 11 is a flowchart illustrating a method for controlling an electronic device according to various embodiments of the present disclosure.

FIG. 11 is a flowchart illustrating a method for controlling an electronic device according to various embodiments of the present disclosure.

As shown in FIG. 11, according to various embodiments, in operation S1101, the processor (e.g., the processor 520) reproduces (e.g., outputs) sound source data through a speaker (e.g., the speaker 580).

According to various embodiments, in operation S1102, the processor 520 determines whether a selection of application of a sound effect to the sound source data is received through an input device (e.g., the input device 550).

According to various embodiments, when determining that the selection of application of the sound effect to the sound source data is not received, the processor 520 outputs the sound source data through the speaker 580 in operation S1112. For example, when determining that the selection of application of the sound effect to the sound source data is not received, the processor 520 may output the sound source data without performing operations S1103 through S1111.

According to various embodiments, when determining that the selection of application of the sound effect to the sound source data is received through the input device 550, the processor 520 determines whether the sound source data is a super-high-quality sound source in operation S1103.

According to various embodiments, once determining that the sound source data is not the super-high-quality sound source, the processor 520 applies the sound effect to the sound source data in operation S1111. For example, once determining that the sound source data is not the super-high-quality sound source, the processor 520 applies the sound effect to the sound source data in operation S1111 without performing operations S1104 through S1110 with respect to a frequency band of the sound source data.

According to various embodiments, when determining that the sound source data is the super-high-quality sound source, the processor 520 determines whether the speaker 580 through which the sound source data is reproduced is a speaker capable of outputting the super-high-quality sound source in operation S1104.

According to various embodiments, once determining that the speaker 580 is not the speaker capable of outputting the super-high-quality sound source, the processor 520 applies the sound effect to the sound source data in operation S1111. For example, once determining that the sound source data is not the super-high-quality sound source, the processor 520 applies the sound effect to the sound source data in operation S1111 without performing operations S1105 through S1110 with respect to a frequency band of the sound source data.

According to various embodiments, when determining that the speaker 580 is the speaker capable of outputting the super-high-quality sound source, the processor 520 determines a first designated frequency band for separating a high-frequency band from the sound source data in operation S1105.

According to various embodiments, in operation S1106, the processor 520 multiplexes the sound source data.

According to various embodiments, in operation S1107, the processor 520 generates at least partial data by down-sampling partial sound source data of the multiplexed sound source data.

According to various embodiments, in operation S1108, the processor 520 generates second sound source data by applying the sound effect to the at least partial data.

According to various embodiments, in operation S1109, the processor 520 obtains first sound source data by high-pass filtering the partial sound source data of the multiplexed sound source data on the basis of the first designated frequency band.

According to various embodiments, in operation S1110, the processor 520 generates synthesized sound source data corresponding to the sound source data by synthesizing first sound source data with second sound source data.

According to various embodiments, in operation S1112, the processor 520 outputs the synthesized sound source data through the speaker 580.

Figure 12:
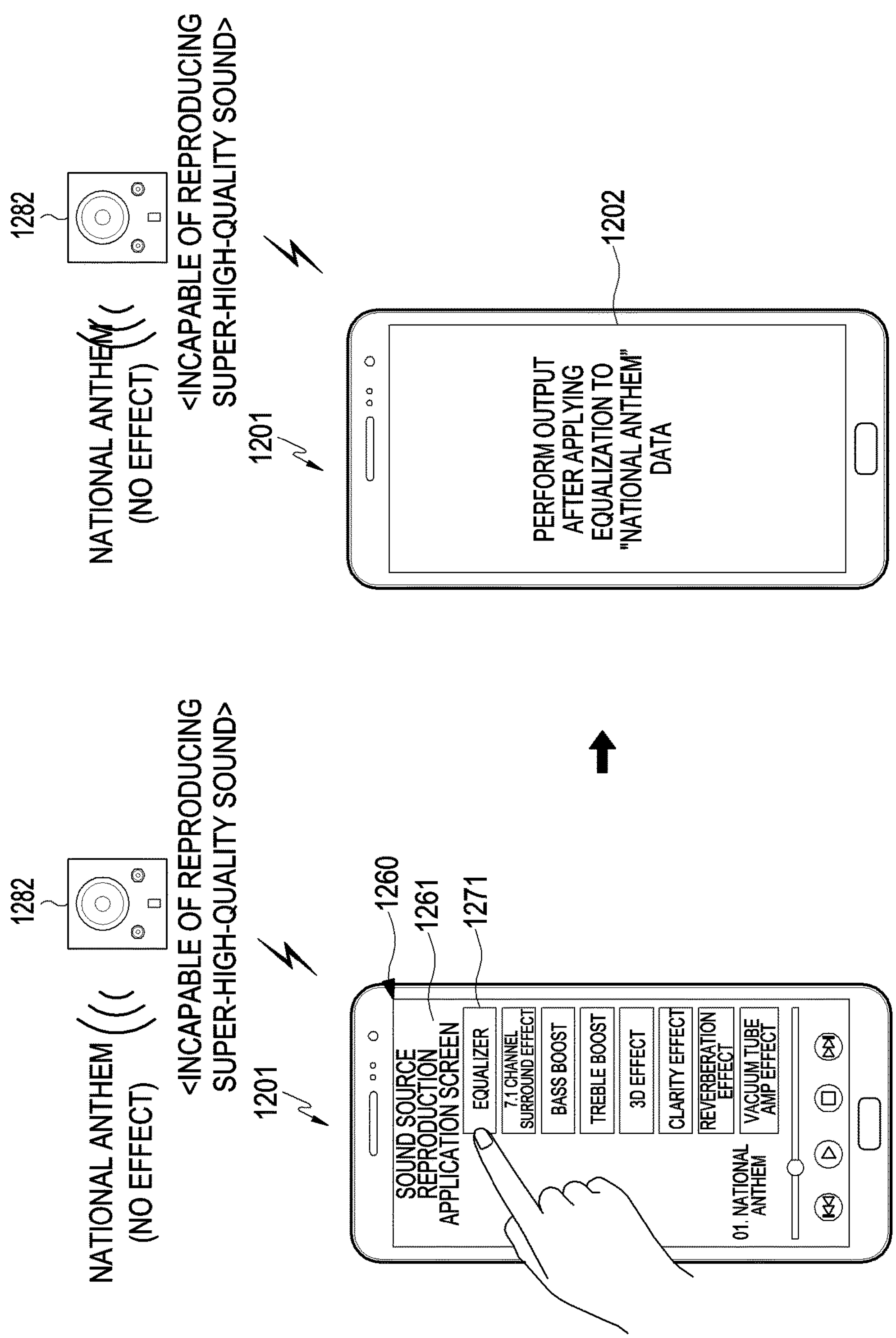
FIG. 12 shows an operation of applying a sound effect and outputting a sound source through a speaker incapable of reproducing super-high-quality sound according to various embodiments of the present disclosure.

FIG. 12 shows an operation of applying a sound effect and outputting a sound source through a speaker incapable of reproducing super-high-quality sound according to various embodiments of the present disclosure.

As shown in FIG. 12, for example, a processor (e.g., the processor 520) included in an electronic device 1201 may output "national anthem (no effect)" selected through a sound source reproduction application screen 1261 through a speaker 1282 incapable of reproducing a super-high-quality sound (e.g., the external electronic device 102 connected using wireless communication or wired communication with the electronic device 1201), while displaying the sound source reproduction application screen 1261 through a display 1260.

For example, the processor 520 may display at least some of the equalizer item 1271, the 7.1-channel surround effect item, the bass boost effect item, the treble boost effect item, the 3D effect item, the clarity effect item, the reverberation effect item, and/or the vacuum tube amp effect item through the display 1261.

Upon receiving a selection of the equalizer item 1271 displayed through the display 1261 through the display 1261, the processor 520 determines whether the speaker 1282 outputting the "national anthem" data is a speaker capable of reproducing a super-high-quality sound.

For example, when determining that the speaker 1282 is a speaker incapable of reproducing a super-high-quality sound, the processor 520 may apply equalization to the "national anthem" data and then output the "national anthem" data having equalization applied thereto through the speaker 1282 incapable of reproducing a super-high-quality sound.

Figure 13:
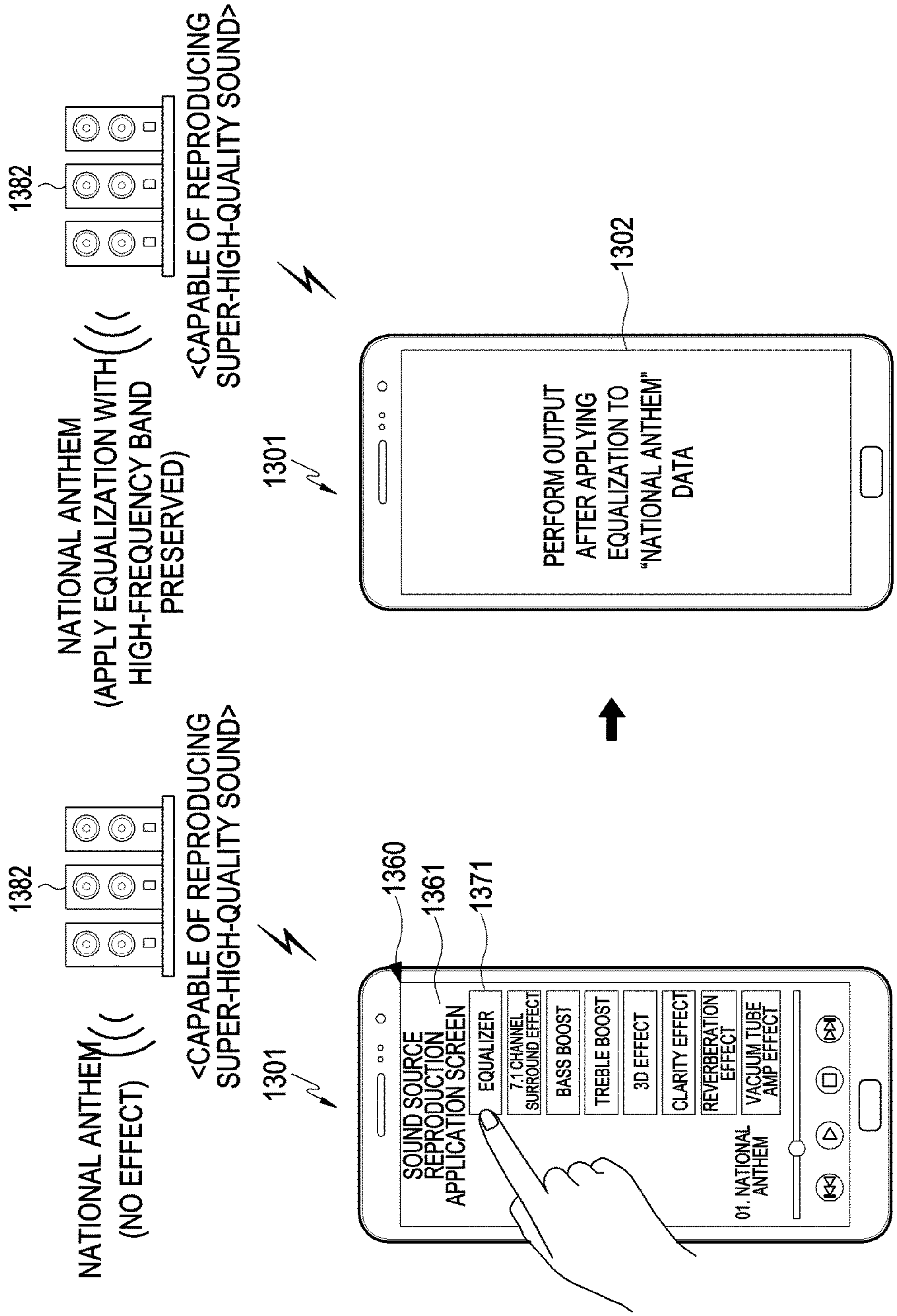
FIG. 13 shows an operation of applying a sound effect and outputting a sound source through a speaker capable of reproducing super-high-quality sound according to various embodiments of the present disclosure.

FIG. 13 shows an operation of applying a sound effect and outputting a sound source through a speaker capable of reproducing super-high-quality sound according to various embodiments of the present disclosure.

As shown in FIG. 13, for example, a processor (e.g., the processor 520) included in an electronic device 1301 may output "national anthem (no effect)" selected through a sound source reproduction application screen 1361 through a speaker 1382 incapable of reproducing a super-high-quality sound (e.g., the external electronic device 102 connected using wireless communication or wired communication with the electronic device 1301), while displaying the sound source reproduction application screen 1361 through a display 1360.

For example, the processor 520 may display at least some of the equalizer item 1371, the 7.1-channel surround effect item, the bass boost effect item, the treble boost effect item, the 3D effect item, the clarity effect item, the reverberation effect item, and/or the vacuum tube amp effect item through the display 1361.

Upon receiving a selection of the equalizer item 1371 displayed through the display 1361 through the display 1361, the processor 520 determines whether the speaker 1382 outputting the "national anthem" data is a speaker capable of reproducing a super-high-quality sound.

For example, when determining that the speaker 1382 is a speaker capable of reproducing a super-high-quality sound, the processor 520 may multiplex the "national anthem" data, obtain first "national anthem" data including a high-frequency band in a frequency band of the "national anthem" data by high-pass filtering partial "national anthem" data of the multiplexed "national anthem" data, and generate second "national anthem" data including a low-frequency band by down-sampling partial "national anthem" data of the multiplexed "national anthem" data and applying the equalizer sound effect thereto. The processor 520 may generate synthesized "national anthem" data having equalization applied thereto with a high-frequency band preserved, by synthesizing the first "national anthem" data and the second "national anthem" data and output the synthesized "national anthem" data through the speaker 1382 incapable of reproducing a super-high-quality sound.

Figure 14:
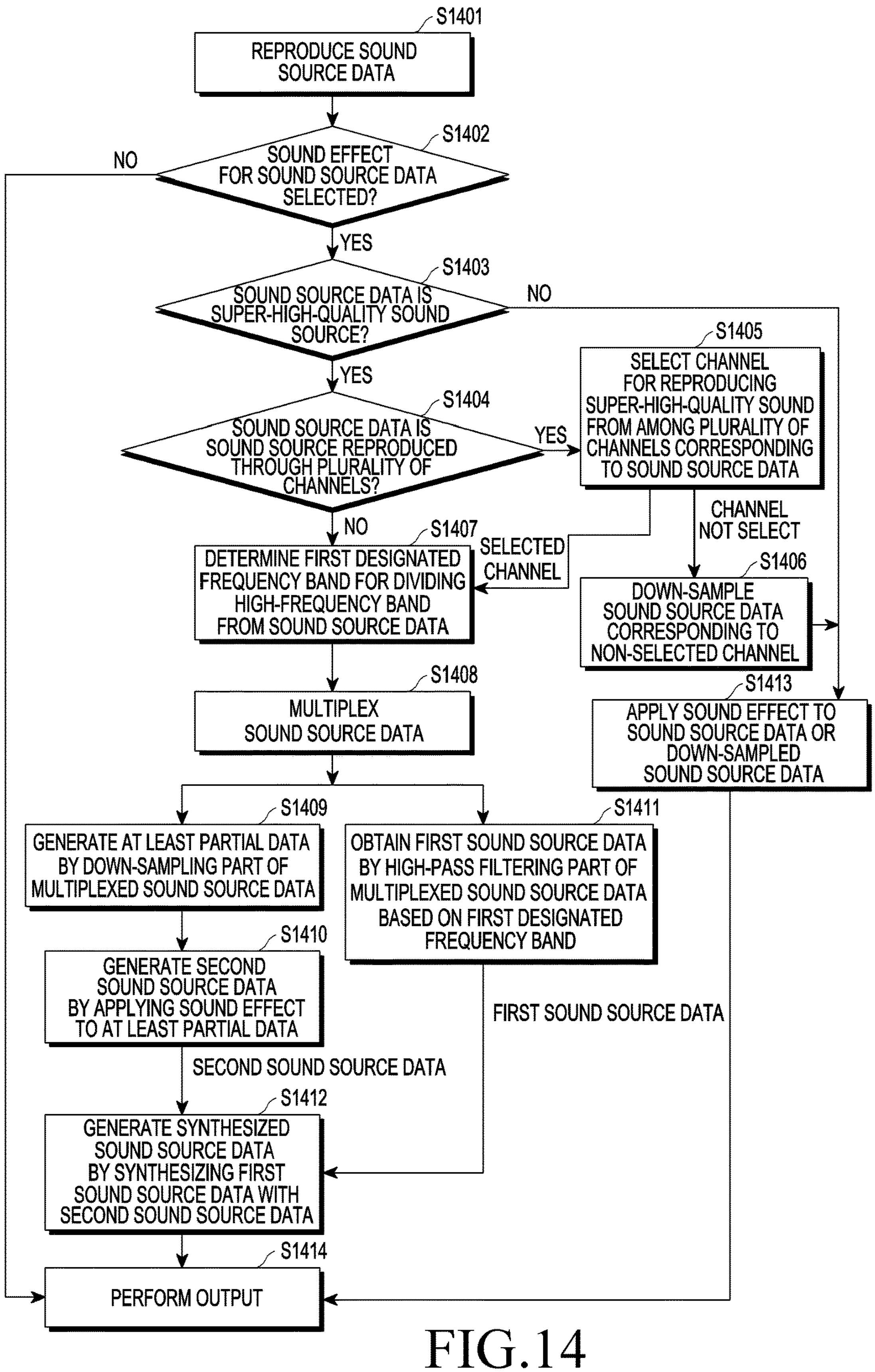
FIG. 14 is a flowchart illustrating a method for controlling an electronic device according to various embodiments of the present disclosure.

FIG. 14 is a flowchart illustrating a method for controlling an electronic device according to various embodiments of the present disclosure.

As shown in FIG. 14, according to various embodiments, in operation S1401, the processor (e.g., the processor 520) reproduces (e.g., outputs) sound source data through a speaker (e.g., the speaker 580).

According to various embodiments, in operation S1402, the processor 520 determines whether a selection of application of a sound effect to the sound source data is received through an input device (e.g., the input device 550).

According to various embodiments, when determining that the selection of application of the sound effect to the sound source data is not received, the processor 520 outputs the sound source data through a speaker (e.g., the speaker 580) in operation S1414.

According to various embodiments, when determining that the selection of application of the sound effect to the sound source data is received through the input device 550, the processor 520 determines whether the sound source data is a super-high-quality sound source in operation S1403.

According to various embodiments, once determining that the sound source data is not the super-high-quality sound source, the processor 520 applies the sound effect to the sound source data in operation S1413. For example, once determining that the sound source data is not the super-high-quality sound source, the processor 520 applies the sound effect to the sound source data in operation S1111 without performing operations S1404 through S1414 with respect to a frequency band of the sound source data.

According to various embodiments, once determining that the sound source data is the super-high-quality sound source, the processor 520 determines whether the sound source data is a sound source reproduced through a plurality of channels in operation S1404. For example, the plurality of channels may include three or more channels. The plurality of channels may include 5.1 channels including a woofer channel.

According to various embodiments, when determining that the sound source data is the sound source reproduced through the plurality of channels, the processor 520 selects a super-high-quality sound reproduction channel for reproducing a super-high-quality sound source from among the plurality of channels corresponding to the sound source data.

For example, the processor 520 may select a channel capable of reproducing a super-high-quality sound from among the plurality of channels corresponding to the sound source data, as the super-high-quality sound reproduction channel for reproducing the super-high-quality sound source, based on whether a plurality of speakers connected with the processor 520 through the plurality of channels, respectively, are capable of outputting a super-high-quality sound. For a channel connecting the woofer speaker with the processor 520 among the plurality of channels, the channel is capable of outputting a sound in a low-frequency band, and thus the processor 520 may select the other channels than at least some channels connected with the woofer speaker capable of outputting the sound in the low-frequency band as super-high-quality sound reproduction channels. The processor 520 may identify information about whether each of the plurality of speakers is capable of outputting a super-high-quality sound, by using information obtained through wired or wireless communication with each speaker or information stored in a memory.

For example, the processor 520 may receive a selection input for the super-high-quality sound reproduction channel from among the plurality of channels corresponding to the sound source data from a user through a display (e.g., the display 160) and select the super-high-quality sound reproduction channel for reproducing the super-high-quality sound based on the received selection input for the super-high-quality sound reproduction channel.

According to various embodiments, in operation S1406, the processor 520 down-samples sound source data corresponding to at least some channels that are not selected as the super-high-quality sound reproduction channel among the plurality of channels. For example, the processor 520 may down-sample sound source data corresponding to the at least some channels that are not selected as the super-high-quality sound reproduction channel among the plurality of channels without performing operations S1407 through S1412 and applies the sound effect to the down-sampled sound source data in operation S1413.

According to various embodiments, when determining that the sound source data is not the super-high-quality sound source, the processor 520 determines a first designated frequency band for separating a high-frequency band from the sound source data in operation S1407.

According to various embodiments, in operation S1408, the processor 520 multiplexes the sound source data.

According to various embodiments, in operation S1409, the processor 520 generates at least partial data by down-sampling partial sound source data of the multiplexed sound source data.

According to various embodiments, in operation S1410, the processor 520 generates second sound source data by applying the sound effect to the at least partial data.

According to various embodiments, in operation S1411, the processor 520 obtains first sound source data by high-pass filtering the partial sound source data of the multiplexed sound source data on the basis of the first designated frequency band.

According to various embodiments, in operation S1412, the processor 520 generates synthesized sound source data corresponding to the sound source data by synthesizing first sound source data with second sound source data.

According to various embodiments, in operation S1414, the processor 520 outputs the synthesized sound source data through the speaker 580.

Figure 15A:
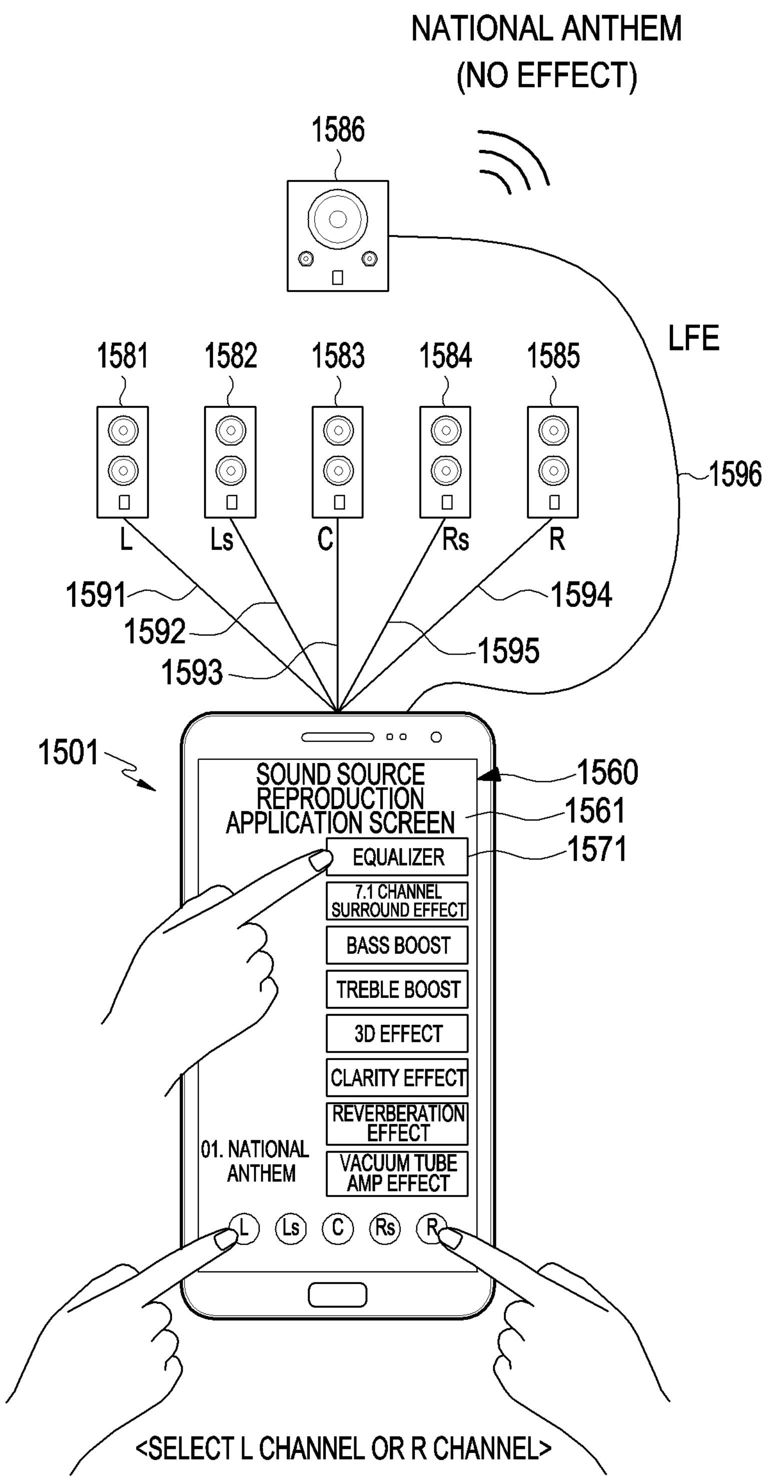
FIGS. 15A and 15B show an operation of applying a sound effect and outputting a sound source through a 5.1-channel speaker connected through a plurality of channels according to various embodiments of the present disclosure.
Figure 15B:
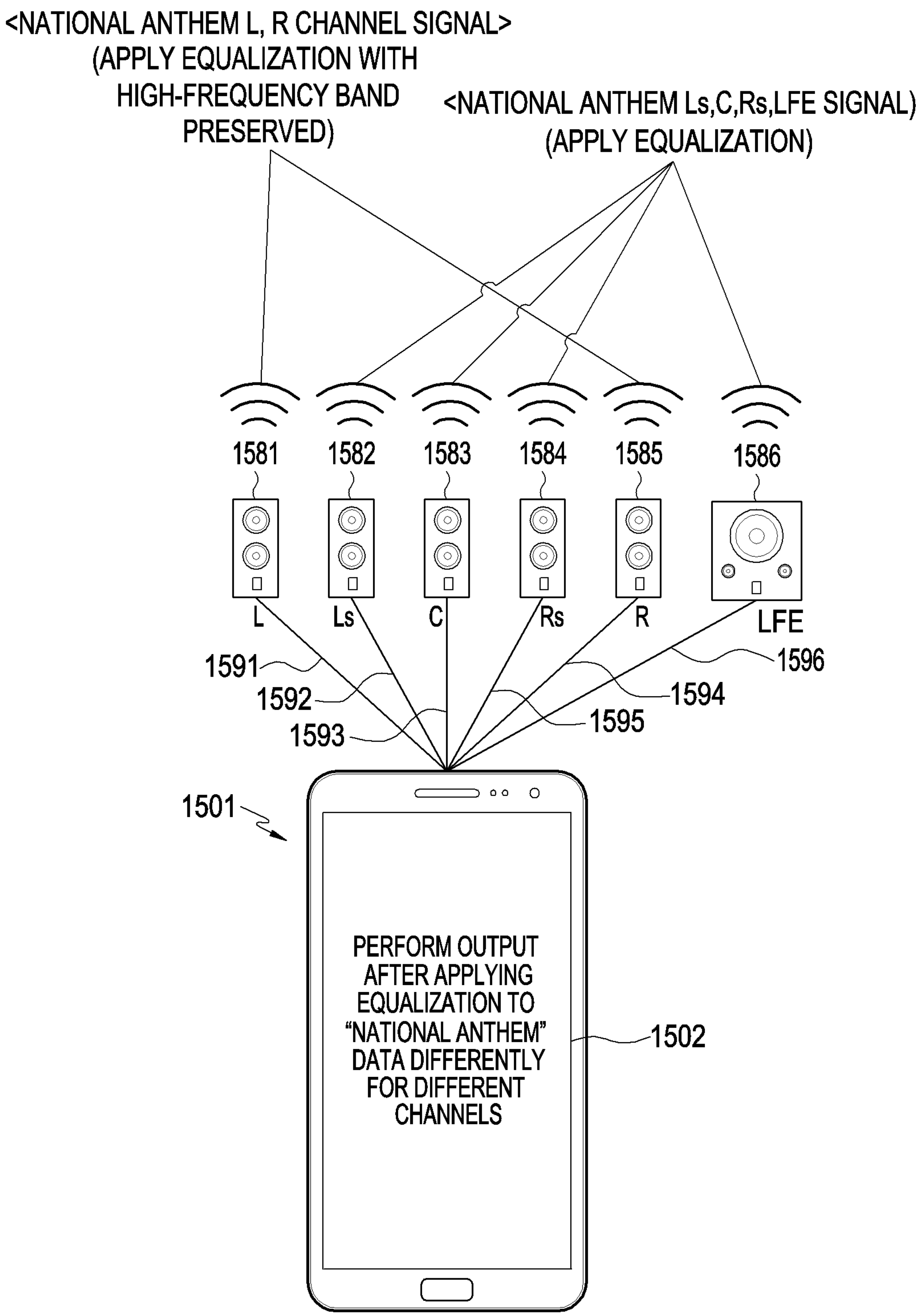

FIGS. 15A and 15B show an operation of applying a sound effect and outputting a sound source through a 5.1-channel speaker connected through a plurality of channels according to various embodiments of the present disclosure.

As shown in FIG. 15A, for example, a processor (e.g., the processor 520) included in an electronic device 1501 may output "national anthem (no effect)" selected through a sound source reproduction application screen 1561 through a plurality of 5.1 channel speakers 1581 through 1586, while displaying the sound source reproduction application screen 1561 through a display 1560.

For example, the processor 520 may display at least some of the equalizer item 1571, the 7.1-channel surround effect item, the bass boost effect item, the treble boost effect item, the 3D effect item, the clarity effect item, the reverberation effect item, and/or the vacuum tube amp effect item through the display 1561.

Upon receiving a selection of the equalizer item 1571 displayed through the display 1561 through the display 1561, the processor 520 selects a super-high-quality reproduction channel from among a plurality of channels 1591 through 1596 connected to the plurality of 5.1 channel speakers 1581 through 1586, respectively, which output the "national anthem" data.

For example, the plurality of channels 1591 through 1596 may include an L channel 1591 that connects the processor 520 with an L speaker 1581 among the plurality of 5.1 channel speakers 1581 through 1586, an Ls channel 1592 that connects the processor 520 with an Ls speaker 1582, a C channel 1593 connecting the processor 520 with a C speaker 1583, an Rs channel 1594 connecting the processor 520 with an Rs speaker 1584, an R channel 1595 connecting the processor 520 with an R speaker 1585, and/or an LFE channel 1596 connecting the processor 520 with a woofer speaker 1586.

For example, when receiving a selection input for the L channel 1591 and the R channel 1595 among the plurality of channels, the L channel 1591, the Ls channel 1592, the C channel 1593, the Rs channel 1594, the R channel 1595, and/or the LFE channel 1596 through the display 1561, the processor 520 selects the L channel 1591 and the R channel 1595 as super-high-quality reproduction channels.

As shown in FIG. 15B, the processor 520 may output a "national anthem" L channel signal and a "national anthem" R channel signal having equalization applied thereto with a high-frequency band preserved, through the L speaker 1581 and the R speaker 1585 through the L channel 1591 and the R channel 1595 selected as the super-high-quality sound reproduction channels.

The processor 520 differently applies equalization to a "national anthem" L channel signal, a "national anthem" Ls channel signal, a "national anthem" C channel signal, a "national anthem" Rs channel signal, a "national anthem" R channel signal, and/or a "national anthem" LFE channel signal that are to be output through a plurality of speakers through a plurality of channels, respectively, in the reproduced "national anthem" data, and then outputs them through the plurality of speakers 1581 through 1586, respectively.

For example, the processor 520 may output the "national anthem" Ls channel signal, the "national anthem" C channel signal, the "national anthem" Rs channel signal, and/or the "national anthem" LFE channel signal having equalization applied thereto without a high-frequency band preserved through the Ls speaker 1582, the C speaker 1583, the Rs speaker 1584, and/or the woofer speaker 1586 through the Ls channel 1592, the C channel 1593, the Rs channel 1594, and/or the LFE channel 1596 that are not selected as the super-high-quality sound reproduction channels.

The processor 520 may down-sample sound source data corresponding to the "national anthem" Ls channel signal, the "national anthem" C channel signal, the "national anthem" Rs channel signal, and/or the "national anthem" LFE channel signal corresponding to the channels that are not selected as the super-high-quality sound reproduction channels, apply equalization to the down-sampled sound source data corresponding to the "national anthem" Ls channel signal, the "national anthem" C channel signal, the "national anthem" Rs channel signal, and/or the "national anthem" LFE channel signal, and output the equalization-applied sound source data corresponding to the "national anthem" Ls channel signal, the "national anthem" C channel signal, the "national anthem" Rs channel signal, and/or the "national anthem" LFE channel signal through the Ls speaker 1582, the C speaker 1583, the Rs speaker 1584, and/or the woofer speaker 1586, respectively.

For example, the processor 520 may multiplex the "national anthem" data corresponding to the "national anthem" L channel signal and the "national anthem" R channel signal corresponding to the channels selected as the super-high-quality reproduction channels, obtain first "national anthem" data including a high-frequency band in a frequency band of the "national anthem" data by high-pass filtering partial "national anthem" data of the multiplexed "national anthem" data, and generate second "national anthem" data including a low-frequency band by down-sampling partial "national anthem" data of the multiplexed "national anthem" data and applying the equalizer sound effect thereto. The processor 520 may generate synthesized "national anthem" data having equalization applied thereto with a high-frequency band preserved, by synthesizing the first "national anthem" data and the second "national anthem" data and output the synthesized "national anthem" data through the L speaker 1581 and the R speaker 1585 among the plurality of 5.1 channel speakers.

Figure 16:
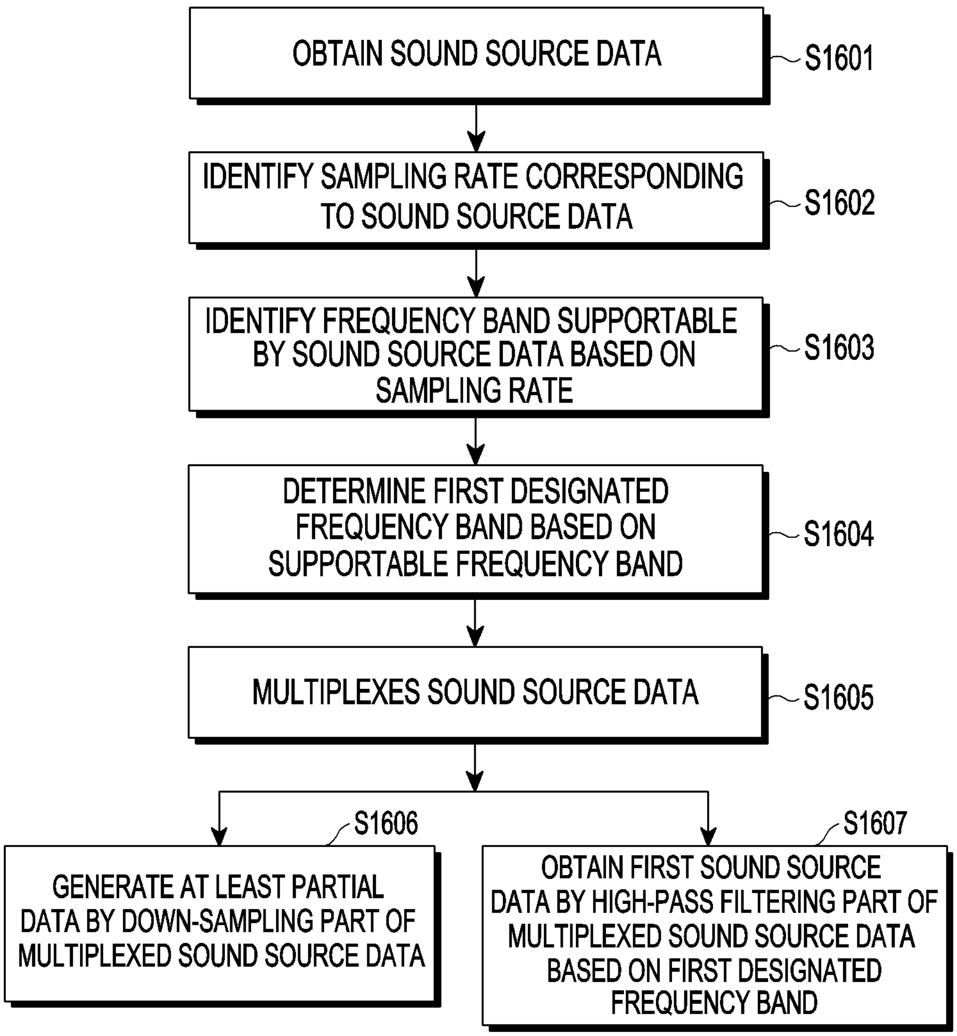
FIG. 16 is a flowchart of a method for determining a first designated frequency band according to various embodiments of the present disclosure.

FIG. 16 is a flowchart of a method for determining a first designated frequency band according to various embodiments of the present disclosure.

As shown in FIG. 16, according to various embodiments, in operation S1601, the processor (e.g., the processor 520) obtains sound source data.

According to various embodiments, in operation S1602, the processor 520 identifies a sampling rate corresponding to the sound source data.

According to various embodiments, in operation S1603, the processor 520 identifies a frequency band supportable by the sound source data on the basis of the sampling rate.

For example, the processor 520 may determine that a frequency band of 0 kHz to "½ kHz of the sampling rate" supportable by the sound source data is a frequency band supportable by the sound source data on the basis of the sampling rate.

According to various embodiments, in operation S1604, the processor 520 determines a first designated frequency band on the basis of the supportable frequency band.

For example, the processor 520 may determine, as the first designated frequency band, a high-frequency band that is different from a low-frequency band in the frequency band of 0 kHz to "½ kHz of the sampling rate".

When the low-frequency band is the frequency band of 0 kHz to "¼ kHz of the sampling rate", the high-frequency band may be a frequency band of "¼ kHz of the sampling rate" to "½ kHz of the sampling rate".

According to various embodiments, in operation S1605, the processor 520 multiplexes the sound source data.

According to various embodiments, in operation S1606, the processor 520 generates at least partial data by down-sampling a part of the multiplexed sound source data on the basis of the first designated frequency band.

For example, the processor 520 may generate at least partial data including the other frequency band of the frequency band of the sound source data except for the first designated frequency band by down-sampling the part of the multiplexed sound source data.

The processor 520 may down-sample the part of the multiplexed sound source data to a sampling rate that is "½ kHz of the sampling rate" to include the frequency band of 0 kHz to "¼ kHz of the sampling rate" except for the high-frequency band of "¼ kHz of the sampling rate" to "½ kHz of the sampling rate".

According to various embodiments, in operation S1607, the processor 520 obtains first sound source data by high-pass filtering the part of the multiplexed sound source data on the basis of the first designated frequency band.

For example, the processor 520 may generate the first sound source data including the first designated frequency band by high-pass filtering the part of the multiplexed sound source data.

The processor 520 may high-pass filter the part of the multiplexed sound source data in which a cut-off frequency of a high-pass filter is "½ kHz of the sampling rate" to include the high-frequency band of "¼ kHz of the sampling rate" to "½ kHz of the sampling rate".

Figure 17:
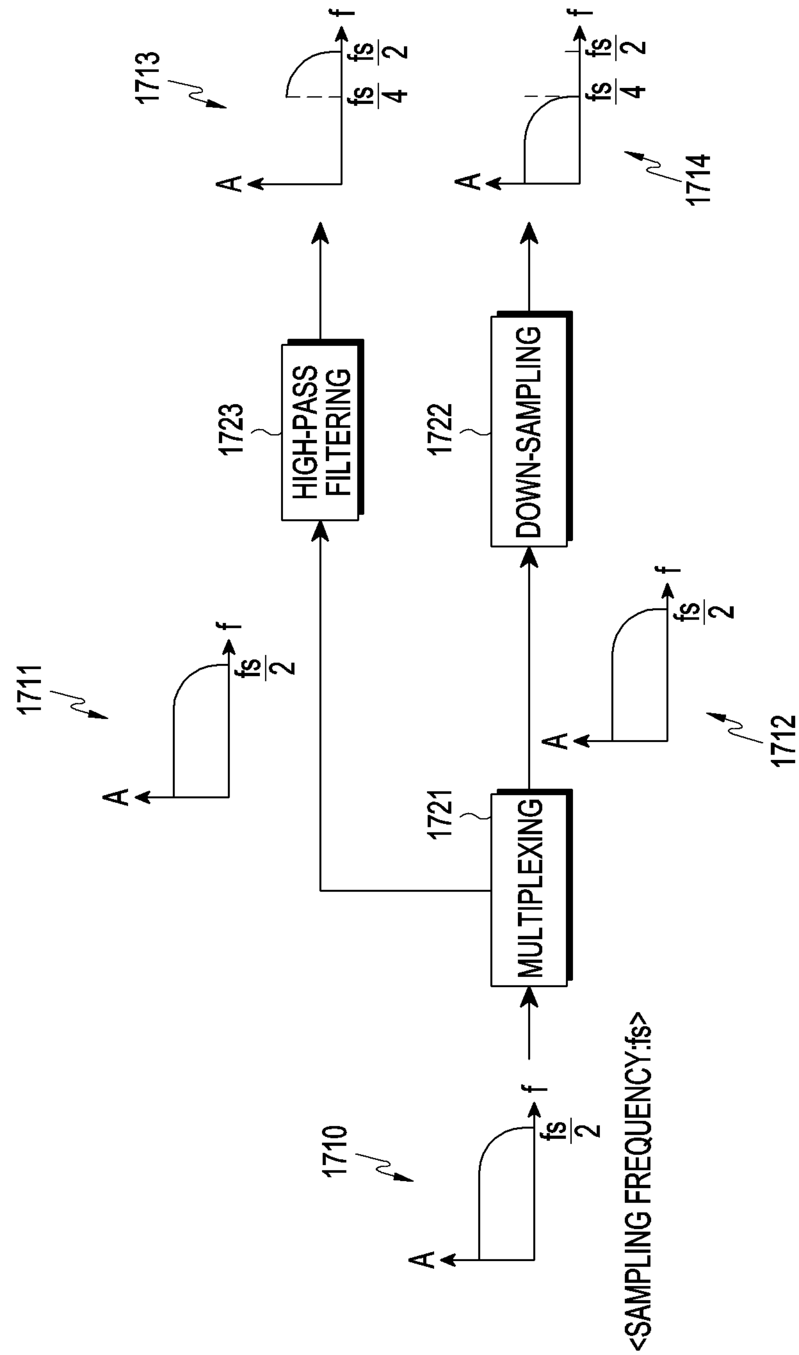
FIG. 17 shows an operation of obtaining first sound source data and generating at least partial data based on a determined first designated frequency band according to various embodiments of the present disclosure.

FIG. 17 shows an operation of obtaining first sound source data and generating at least partial data based on a determined first designated frequency band according to various embodiments of the present disclosure.

As shown in FIG. 17, for example, a processor (e.g., the processor 520) may obtain sound source data 1710 including a frequency band of 0 kHz to "fs/2" kHz from a memory (e.g., the memory 130).

For example, the processor 520 may receive an input for applying a sound effect to the sound source data 1710 including the frequency band of 0 kHz to "fs/2" kHz through an input device (e.g., the input device 550).

The processor 520 determines that the sampling rate of the sound source data 1710 including the frequency band of 0 kHz to "fs/2" kHz is "fs" kHz.

The processor 520 may determine that the sampling rate of the sound source data 1710 including the frequency band of 0 kHz to "fs/2" kHz is "fs" kHz and determine based on the determined sampling rate of "fs" kHz that the frequency band supportable by the sound source data, which includes the frequency band of 0 kHz to "fs/2" kHz, is the frequency band of 0 kHz to "fs/2" kHz.

For example, the processor 520 may determine the first designated frequency band that is a frequency band to be preserved as the frequency band of "fs/4" kHz to "fs/2" kHz on the basis of the supportable frequency band of 0 kHz to "fs/2" kHz.

The processor 520 may multiplex sound source data 1710 including the frequency band of 0 kHz to "fs/2" kHz into partial sound source data 1711 including the frequency band of 0 kHz to "fs/2" kHz and partial sound source data 1712 including the frequency band of 0 kHz to "fs/2" kHz in operation 1721.

For example, the processor 520 may perform high-pass filtering with respect to the partial sound source data 1711 including the frequency band of 0 kHz to "fs/2" kHz with the cut-off frequency of "fs/4" kHz in operation 1723 to preserve the high-frequency band of "fs/4" kHz to "fs/2" kHz, which is the first designated frequency band in the frequency band of the partial sound source data 1711 including the frequency band of 0 kHz to "fs/2" kHz in the multiplexed sound source data. The processor 520 obtains first sound source data 1713 including the frequency band of "fs/4" kHz to "fs/2" kHz by performing high-pass filtering the partial sound source data 1711 including the frequency band of 0 kHz to "fs/2" kHz in the multiplexed sound source data by using the cut-off frequency of "fs/4" kHz in operation 1722.

To apply a sound effect to the other frequency band of 0 kHz to "fs/4" kHz of the frequency band of the partial sound source data 1712 including the frequency band of 0 kHz to "fs/2" kHz in the multiplexed sound source data, except for the frequency band of "fs/4" kHz to "fs/2" kHz, the processor 520 down-samples the partial sound source data 1712 at a sampling rate of "fs/2" kHz in operation 1722.

The processor 520 generates at least partial data 1714 including the frequency band of 0 kHz to "fs/4" kHz by down-sampling the partial sound source data 1712 of the multiplexed sound source data at a sampling rate of "fs/2" kHz in operation 1722.

Figure 18A:
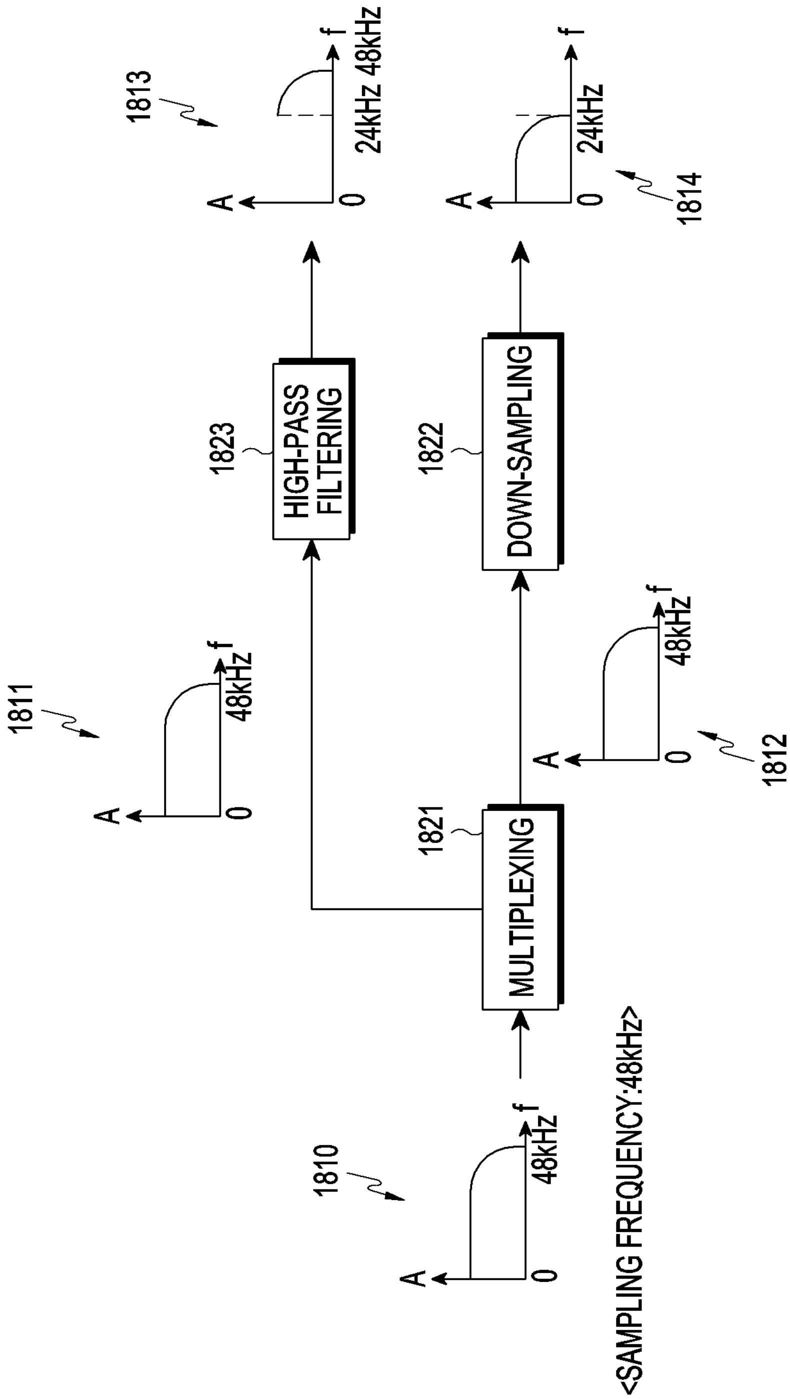
FIG. 18A shows an operation of obtaining first sound source data and generating at least partial data based on a determined first designated frequency band according to various embodiments of the present disclosure.

FIG. 18A shows an operation of obtaining first sound source data and generating at least partial data based on a determined first designated frequency band according to various embodiments of the present disclosure.

As shown in FIG. 18A, for example, a processor (e.g., the processor 520) may obtain sound source data 1810 including a frequency band of 0 kHz to "48" kHz from a memory (e.g., the memory 130).

For example, the processor 520 may receive an input for applying a sound effect to the sound source data 1810 including the frequency band of 0 kHz to "48" kHz through an input device (e.g., the input device 550).

For example, the processor 520 may determine that the sampling rate of the sound source data 1810 including the frequency band of 0 kHz to “48” kHz is “96” kHz.

The processor 520 may determine that the sampling rate of the sound source data 1810 including the frequency band of 0 kHz to “48” kHz is “96” kHz and determine based on the determined sampling rate of “96” kHz that the frequency band supportable by the sound source data, which includes the frequency band of 0 kHz to “48” kHz, is the frequency band of 0 kHz to “96/2” kHz.

For example, the processor 520 may determine the first designated frequency band that is a frequency band to be preserved as the frequency band of “96/4” kHz to “96/2” kHz on the basis of the supportable frequency band of 0 kHz to “96/2” kHz.

The processor 520 may multiplex sound source data 1810 including the frequency band of 0 kHz to “48” kHz into partial sound source data 1811 including the frequency band of 0 kHz to “48” kHz and partial sound source data 1812 including the frequency band of 0 kHz to “48” kHz in operation 1821.

For example, the processor 520 may perform high-pass filtering with respect to the partial sound source data 1811 including the frequency band of 0 kHz to “48/2” kHz with the cut-off frequency of “96/4” kHz in operation 1823 to preserve the high-frequency band of “96/4” kHz to “96/2” kHz, which is the first designated frequency band in the frequency band of the partial sound source data 1811 including the frequency band of 0 kHz to “48” kHz in the multiplexed sound source data. For example, the processor 520 may obtain the first sound source data 1813 including the frequency band of “96/4” kHz to “96/2” kHz by performing high-pass filtering with respect to the partial sound source data 1811 including the frequency band of 0 kHz to “48” kHz in the multiplexed sound source data in operation 1823.

To apply a sound effect to the other frequency band of 0 kHz to “96/4” kHz of the frequency band of the partial sound source data 1812 including the frequency band of 0 kHz to “48” kHz in the multiplexed sound source data, except for the frequency band of “96/4” kHz to “96/2” kHz, the processor 520 down-samples the partial sound source data 1812 at a sampling rate of “96/2” kHz in operation 1822.

The processor 520 generates at least partial data 1814 including the frequency band of 0 kHz to “96/4” kHz by down-sampling the partial sound source data 1812 of the multiplexed sound source data at a sampling rate of “96/2” kHz in operation 1822.

Figure 18B:
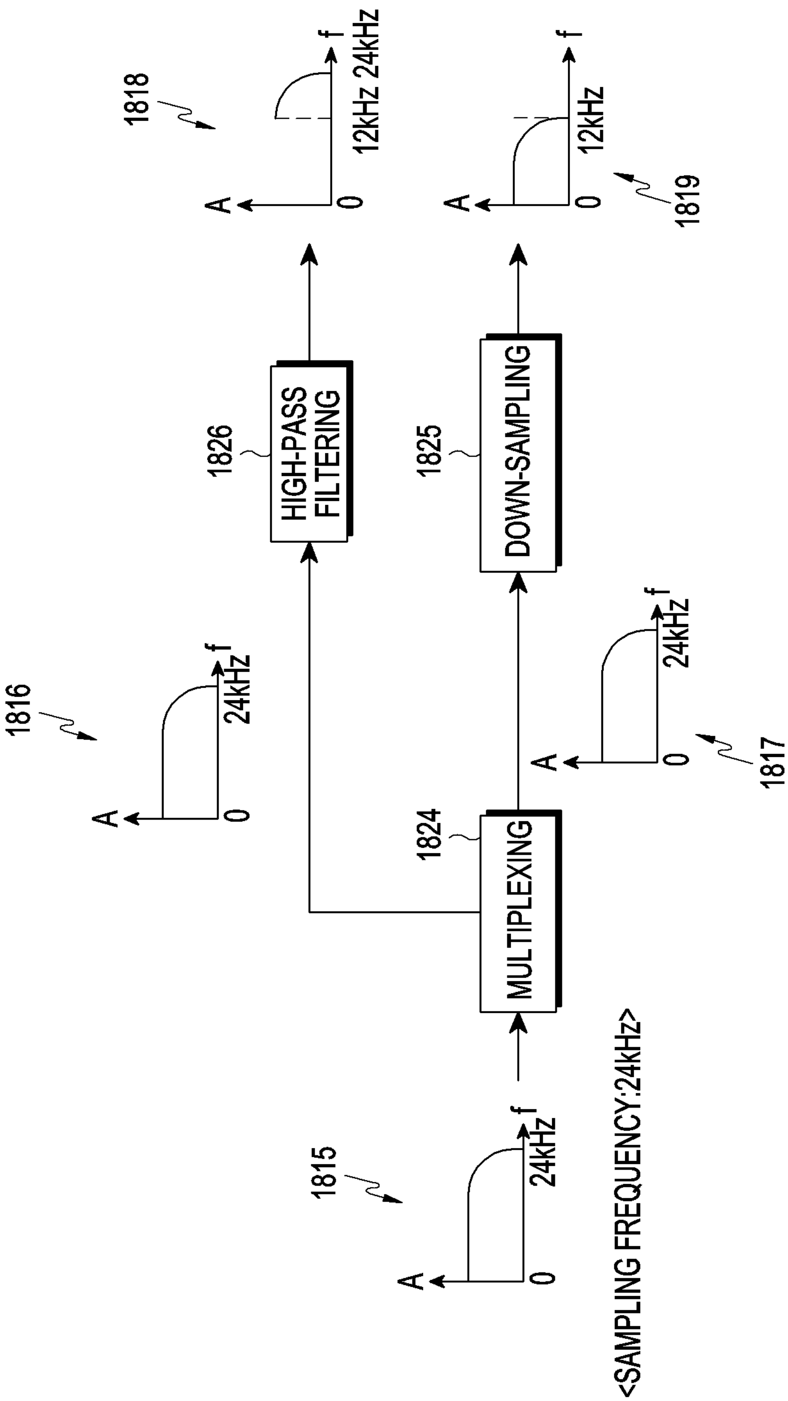

FIG. 18B shows an operation of obtaining first sound source data and generating at least partial data based on a determined first designated frequency band according to various embodiments of the present disclosure.

As shown in FIG. 18B, for example, a processor (e.g., the processor 520) may obtain sound source data 1815 including a frequency band of 0 kHz to “24” kHz from a memory (e.g., the memory 130).

For example, the processor 520 may receive an input for applying a sound effect to the sound source data 1815 including the frequency band of 0 kHz to “24” kHz through an input device (e.g., the input device 550).

For example, the processor 520 may determine that the sampling rate of the sound source data 1815 including the frequency band of 0 kHz to “24” kHz is “48” kHz.

The processor 520 may determine that the sampling rate of the sound source data 1815 including the frequency band of 0 kHz to “24” kHz is “48” kHz and determine based on the determined sampling rate of “48” kHz that the frequency band supportable by the sound source data, which includes the frequency band of 0 kHz to “24” kHz, is the frequency band of 0 kHz to “48/2” kHz.

For example, the processor 520 may determine the first designated frequency band that is a frequency band to be preserved as the frequency band of “48/4” kHz to “48/2” kHz on the basis of the supportable frequency band of 0 kHz to “48/2” kHz.

The processor 520 may multiplex sound source data 1815 including the frequency band of 0 kHz to “24” kHz into partial sound source data 1816 including the frequency band of 0 kHz to “24” kHz and partial sound source data 1817 including the frequency band of 0 kHz to “24” kHz in operation 1824.

For example, the processor 520 may perform high-pass filtering with respect to the partial sound source data 1816 including the frequency band of 0 kHz to “24/2” kHz with the cut-off frequency of “48/4” kHz in operation 1826 to preserve the high-frequency band of “48/4” kHz to “48/2” kHz, which is the first designated frequency band in the frequency band of the partial sound source data 1816 including the frequency band of 0 kHz to “24” kHz in the multiplexed sound source data. For example, the processor 520 may obtain the first sound source data 1818 including the frequency band of “48/4” kHz to “48/2” kHz by performing high-pass filtering with respect to the partial sound source data 1816 including the frequency band of 0 kHz to “24” kHz in the multiplexed sound source data by using a cut-off frequency of “48/4” kHz in operation 1826.

To apply a sound effect to the other frequency band of 0 kHz to “48/4” kHz of the frequency band of the partial sound source data 1817 including the frequency band of 0 kHz to “24” kHz in the multiplexed sound source data, except for the frequency band of “48/4” kHz to “48/2” kHz, the processor 520 down-samples the partial sound source data 1817 at a sampling rate of “48/2” kHz in operation 1825.

The processor 520 generates at least partial data 1819 including the frequency band of 0 kHz to “48/4” kHz by down-sampling the partial sound source data 1817 of the multiplexed sound source data at a sampling rate of “48/2” kHz in operation 1825.

Figure 19:
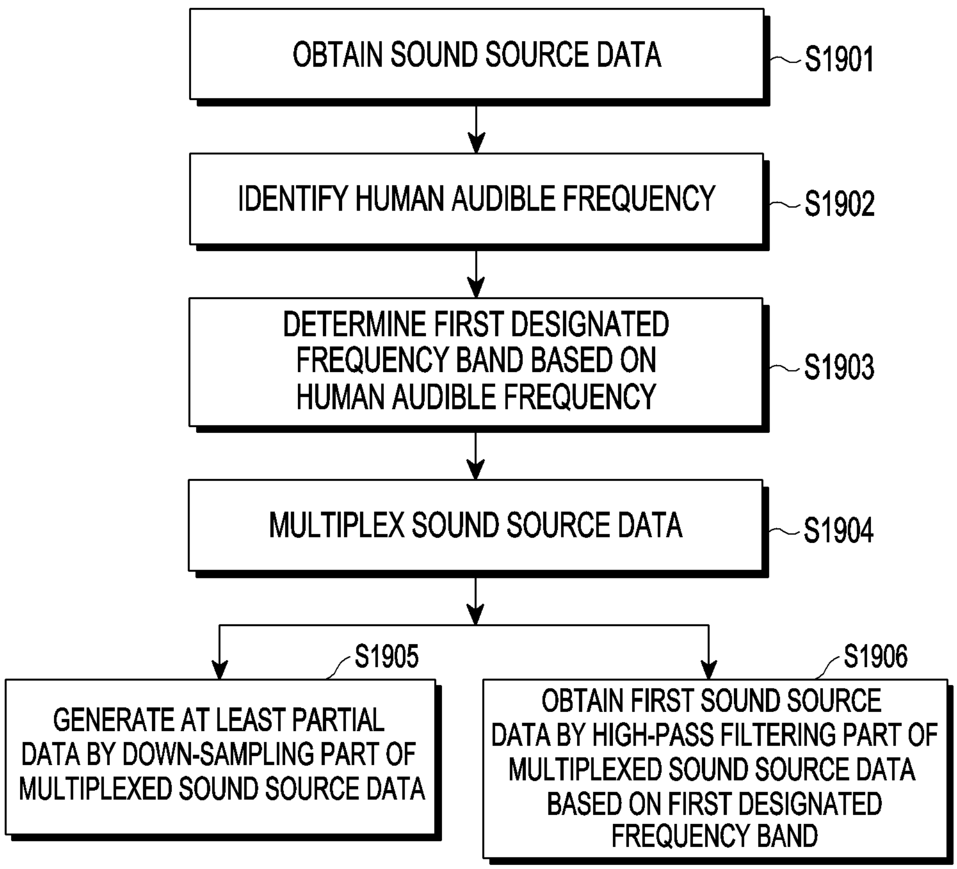
FIG. 19 is a flowchart of a method for determining a first designated frequency band according to various embodiments of the present disclosure.

FIG. 19 is a flowchart of a method for determining a first designated frequency band according to various embodiments of the present disclosure.

As shown in FIG. 19, according to various embodiments, in operation S1901, the processor (e.g., the processor 520) obtains sound source data.

According to various embodiments, in operation S1902, the processor 520 identifies a human audible frequency of a user corresponding to the sound source data.

According to various embodiments, in operation S1903, the processor 520 identifies a frequency band supportable by the sound source data on the basis of the user’s human audible frequency.

For example, the processor 520 may determine based on the user’s human audible frequency that the frequency band supportable by the sound source data ranges from 0 kHz to the “user’s human audible frequency” kHz.

According to various embodiments, in operation S1904, the processor 520 determines a first designated frequency band on the basis of the supportable frequency band.

For example, the processor 520 may determine, as the first designated frequency band, a high-frequency band that is different from a low-frequency band in the frequency band of 0 kHz to the “user’s human audible frequency” kHz.

When the low-frequency band ranges from 0 kHz to the “user’s human audible frequency” kHz, the high-frequency band may range from the "user's human audible frequency" kHz to a maximum frequency of the sound source data (e.g., ½ frequency of the sampling rate of the sound source data).

According to various embodiments, in operation S1905, the processor 520 multiplexes the sound source data.

According to various embodiments, in operation S1906, the processor 520 generates at least partial data by down-sampling a part of the multiplexed sound source data on the basis of the first designated frequency band.

For example, the processor 520 may generate at least partial data including the other frequency band of the frequency band of the sound source data except for the first designated frequency band by down-sampling the part of the multiplexed sound source data.

For example, the processor 520 may down-sample a part of the multiplexed sound source data to a sampling rate that is "2 times kHz the user's human audible frequency" kHz to include the frequency band of 0 kHz to the "user's human audible frequency" except for the high-frequency band of the "user's human audible frequency" kHz to the maximum frequency of the sound source data (e.g., ½ frequency of the sampling rate of the sound source data).

According to various embodiments, the processor 520 obtains first sound source data by high-pass filtering the part of the multiplexed sound source data on the basis of the first designated frequency band.

For example, the processor 520 may generate the first sound source data including the first designated frequency band by high-pass filtering the part of the multiplexed sound source data.

The processor 520 may high-pass filter the part of the multiplexed sound source data in which a cut-off frequency of a high-pass filter is the "user's human audible frequency" kHz to include the high-frequency band of the "user's human audible frequency" kHz to the maximum frequency of the sound source data (e.g., ½ frequency of the sampling rate of the sound source data).

Figure 20:
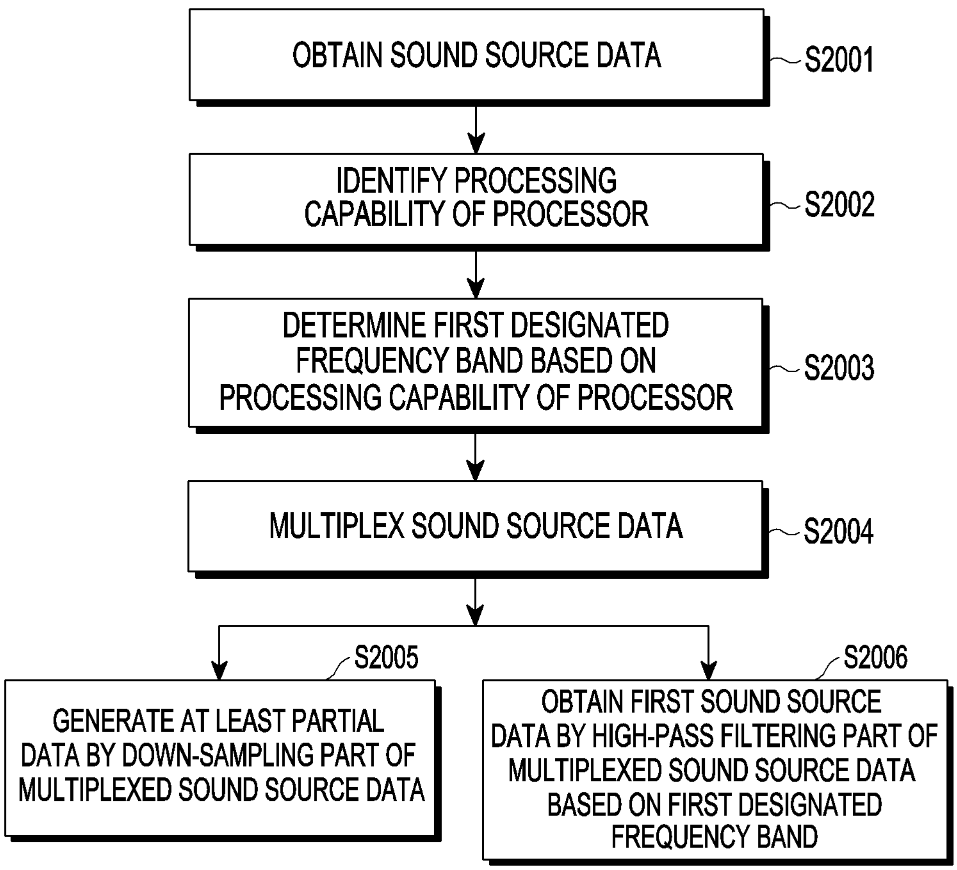
FIG. 20 is a flowchart of a method for determining a first designated frequency band according to various embodiments of the present disclosure.

FIG. 20 is a flowchart of a method for determining a first designated frequency band according to various embodiments of the present disclosure.

As shown in FIG. 20, according to various embodiments, in operation S2001, the processor (e.g., the processor 520) obtains sound source data.

According to various embodiments, in operation S2002, the processor 520 identifies a processing capability of the processor 520 for reproducing the sound source data.

For example, the processing capability of the processor 520 may include a processing speed of the processor 520 and/or a system resource use state of the processor 520.

According to various embodiments, in operation S2003, the processor 520 determines a first designated frequency band on the basis of the processing capability of the processor 520.

According to various embodiments, in operation S2004, the processor 520 multiplexes the sound source data.

According to various embodiments, in operation S2005, the processor 520 generates at least partial data by down-sampling a part of the multiplexed sound source data on the basis of the first designated frequency band.

For example, the processor 520 may generate at least partial data including the other frequency band of the frequency band of the sound source data except for the first designated frequency band by down-sampling the part of the multiplexed sound source data.

According to various embodiments, in operation S2006, the processor 520 obtains first sound source data by high-pass filtering the part of the multiplexed sound source data on the basis of the first designated frequency band.

For example, the processor 520 may generate the first sound source data including the first designated frequency band by high-pass filtering the part of the multiplexed sound source data.

Figure 21A:
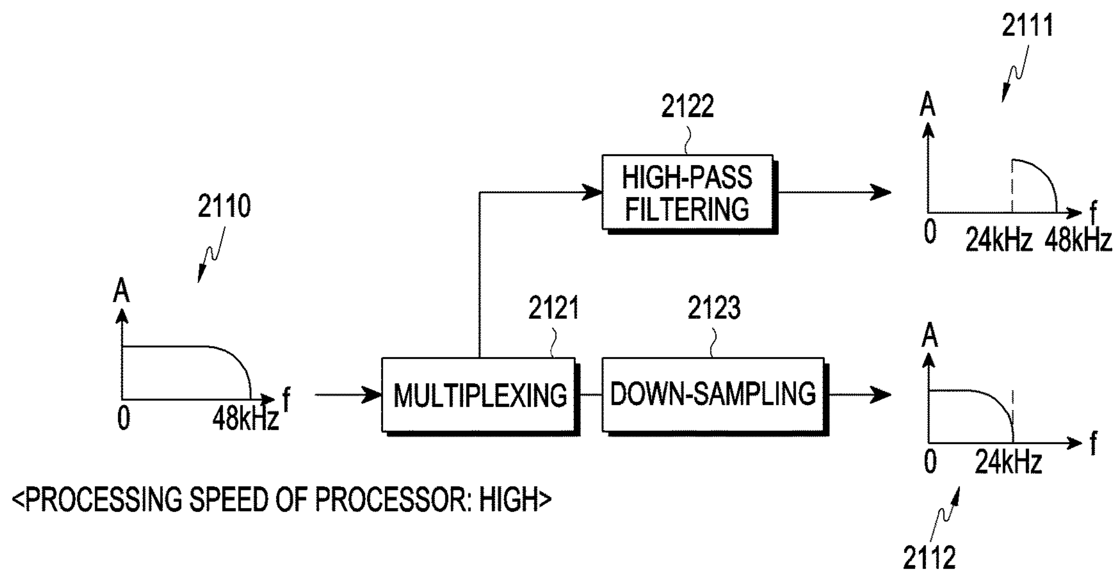
FIGS. 21A and 21B show an operation of obtaining first sound source data and generating at least partial data based on a determined first designated frequency band according to various embodiments of the present disclosure.
Figure 21B:
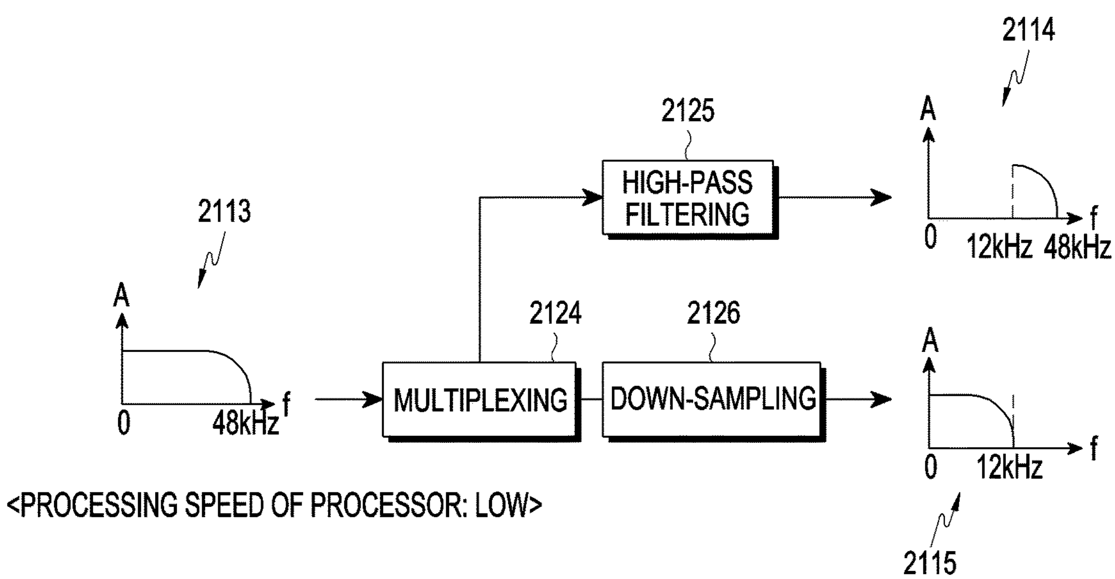

FIGS. 21A and 21B show an operation of obtaining first sound source data and generating at least partial data based on a determined first designated frequency band according to various embodiments of the present disclosure.

As shown in FIG. 21A, for example, a processor (e.g., the processor 520) may obtain sound source data 2110 including a frequency band of 0 kHz to "48" kHz from a memory (e.g., the memory 130).

For example, the processor 520 may receive an input for applying a sound effect to the sound source data 2110 including the frequency band of 0 kHz to "48" kHz through an input device (e.g., the input device 550).

The processor 520 determines that the processing speed of the processor 520 for reproducing the sound source data 2110 including the frequency band of 0 kHz to "48" kHz is "high".

The processor 520 may determine that the processing speed of the processor 520 for reproducing the sound source data 2110 including the frequency band of 0 kHz to "48" kHz is "high" and may determine the first designated frequency band that is a frequency band to be preserved as a frequency band of "24" kHz to "48" kHz based on the determination that the processing speed of the processor 520 is "high".

The processor 520 multiplexes the sound source data 2110 including the frequency band of 0 kHz to "48" kHz into partial sound source data including the frequency band of 0 kHz to "48" kHz and partial sound source data including the frequency band of 0 kHz to "48" kHz in operation 2121.

For example, the processor 520 may perform high-pass filtering with respect to the partial sound source data including the frequency band of 0 kHz to "48" kHz with the cut-off frequency of "24" kHz in operation 2122 to preserve the high-frequency band of "24" kHz to "48" kHz, which is the first designated frequency band in the frequency band of the partial sound source data including the frequency band of 0 kHz to "48" kHz in the multiplexed sound source data. The processor 520 may generate first sound source data 2111 including a frequency band of "24" kHz to "48" kHz by high-pass filtering the partial sound source data including the frequency band of 0 kHz to "48" kHz in the multiplexed sound source data by using the cut-off frequency of "24" kHz in operation 2122.

To apply a sound effect to the other frequency band of 0 kHz to "24" kHz of the frequency band of the partial sound source data including the frequency band of 0 kHz to "48" kHz in the multiplexed sound source data, except for the frequency band of "24" kHz to "48" kHz, the processor 520 down-samples the partial sound source data at a sampling rate of "48" kHz in operation 2123.

The processor 520 generates at least partial data 2112 including the frequency band of 0 kHz to "48/2" kHz by down-sampling the partial sound source data of the multiplexed sound source data at a sampling rate of "48" kHz in operation 2123.

As shown in FIG. 21B, for example, a processor (e.g., the processor 520) may obtain sound source data 2113 including the frequency band of 0 kHz to "48" kHz from a memory (e.g., the memory 130).

For example, the processor 520 may receive an input for applying a sound effect to the sound source data 2113 including the frequency band of 0 kHz to “48” kHz through an input device (e.g., the input device 550).

The processor 520 determines that the processing speed of the processor 520 for reproducing the sound source data 2110 including the frequency band of 0 kHz to “48” kHz is “low”.

The processor 520 may determine that the processing speed of the processor 520 for reproducing the sound source data 2110 is “low” and may determine the first designated frequency band that is a frequency band to be preserved as a frequency band of “12” kHz to “48” kHz based on the determination that the processing speed of the processor 520 is “low”.

When compared with FIG. 21A, for the “low” processing speed of the processor 520, less computational processing may be possible than for the “high” processing speed of the processor 520, such that the processor 520 may determine the first designated frequency band to be broader than in the “high” processing speed of the processor 520 to minimize the amount of computational processing required for application of a sound effect to the other frequency band (a second designated frequency band) except for the first designated frequency band.

The processor 520 multiplexes the sound source data 2113 including the frequency band of 0 kHz to “48” kHz into partial sound source data including the frequency band of 0 kHz to “48” kHz and partial sound source data including the frequency band of 0 kHz to “48” kHz in operation 2124.

For example, the processor 520 may perform high-pass filtering with respect to the partial sound source data including the frequency band of 0 kHz to “48” kHz with the cut-off frequency of “12” kHz in operation 2125 to preserve the high-frequency band of “12” kHz to “48” kHz, which is the first designated frequency band in the frequency band of the partial sound source data 2113 including the frequency band of 0 kHz to “48” kHz in the multiplexed sound source data. For example, the processor 520 may obtain the first sound source data 2114 including the frequency band of “48/4” kHz to “48” kHz by performing high-pass filtering with respect to the partial sound source data including the frequency band of 0 kHz to “48” kHz in the multiplexed sound source data by using the cut-off frequency of “12” kHz in operation 2125.

To apply a sound effect to the other frequency band of 0 kHz to “12” kHz of the frequency band of the partial sound source data including the frequency band of 0 kHz to “48” kHz in the multiplexed sound source data, except for the frequency band of “12” kHz to “48” kHz, the processor 520 down-samples the partial sound source data at a sampling rate of “24” kHz in operation 2126.

The processor 520 generates at least partial data 2115 including the frequency band of 0 kHz to “12” kHz by down-sampling the partial sound source data 1812 of the multiplexed sound source data at a sampling rate of “24” kHz in operation 2126.

Figure 22:
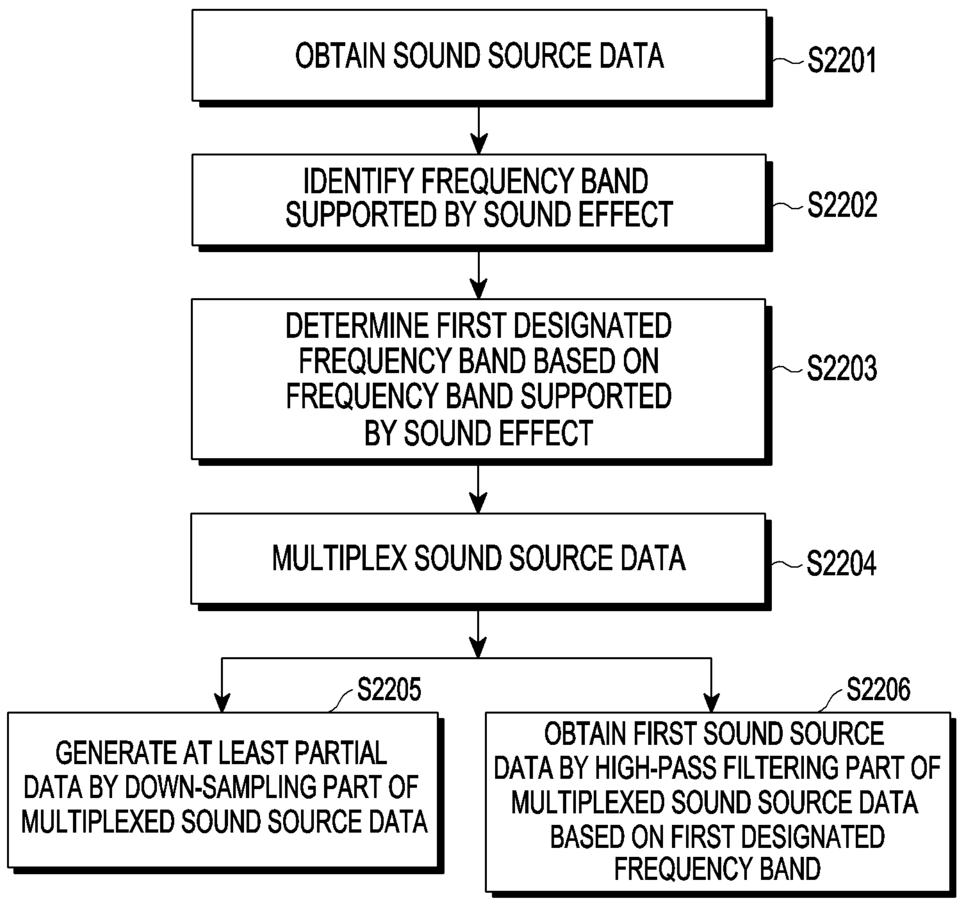
FIG. 22 is a flowchart of a method for determining a first designated frequency band according to various embodiments of the present disclosure.

FIG. 22 is a flowchart of a method for determining a first designated frequency band according to various embodiments of the present disclosure.

As shown in FIG. 22, according to various embodiments, in operation S2201, the processor (e.g., the processor 520) obtains sound source data.

According to various embodiments, in operation S2202, the processor 520 identifies a frequency band supported by a sound effect selected for the sound source data.

According to various embodiments, in operation S2203, the processor 520 determines a first designated frequency band on the basis of the frequency band supported by the sound effect.

According to various embodiments, in operation S2204, the processor 520 multiplexes the sound source data.

According to various embodiments, in operation S2205, the processor 520 generates at least partial data by down-sampling a part of the multiplexed sound source data on the basis of the first designated frequency band.

For example, the processor 520 may generate at least partial data including the other frequency band of the frequency band of the sound source data except for the first designated frequency band by down-sampling the part of the multiplexed sound source data.

According to various embodiments, in operation S2206, the processor 520 obtains first sound source data by high-pass filtering the partial sound source data of the multiplexed sound source data on the basis of the first designated frequency band.

For example, the processor 520 may generate the first sound source data including the first designated frequency band by high-pass filtering the part of the multiplexed sound source data.

Figure 23A:
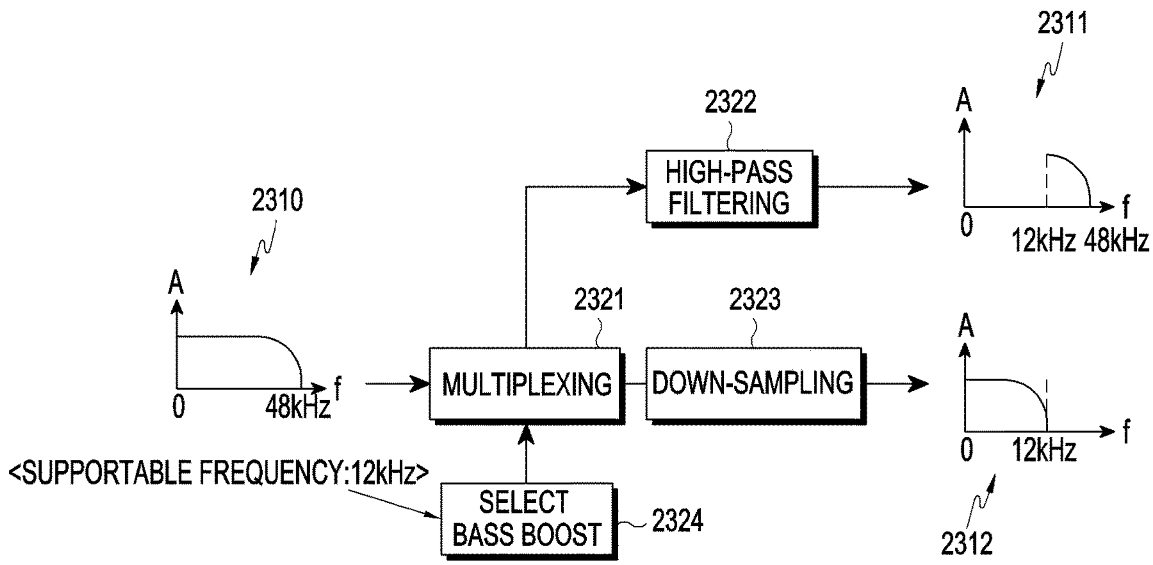
FIGS. 23A and 23B show an operation of obtaining first sound source data and generating at least partial data based on a determined first designated frequency band according to various embodiments of the present disclosure.
Figure 23B:
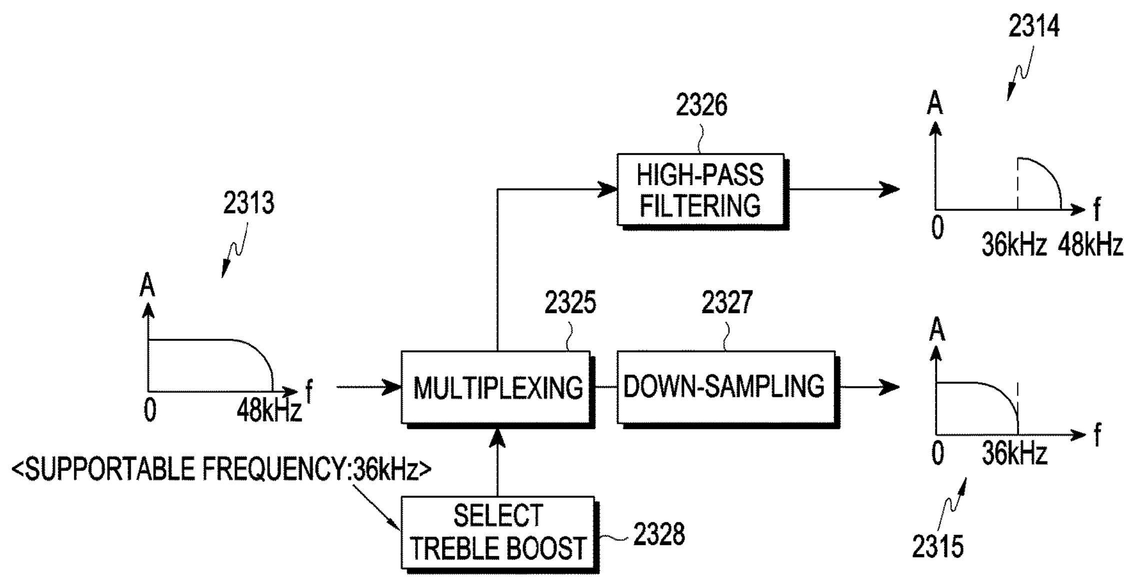

FIGS. 23A and 23B show an operation of obtaining first sound source data and generating at least partial data based on a determined first designated frequency band according to various embodiments of the present disclosure.

As shown in FIG. 23A, for example, a processor (e.g., the processor 520) may obtain sound source data 2310 including the frequency band of 0 kHz to “48” kHz from a memory (e.g., the memory 130).

For example, the processor 520 may receive an input for applying a sound effect to the sound source data 2310 including the frequency band of 0 kHz to “48” kHz through an input device (e.g., the input device 550).

The processor 520 may determine that “selection of bass boost” is received with respect to the sound source data 2310 including the frequency band of 0 kHz to “48” kHz in operation 2324.

The processor 520 may determine that “selection of bass boost” is received as a sound effect for the sound source data 2310 including the frequency band of 0 kHz to “48” kHz, and that a frequency band supported by the sound effect “bass boost” ranges from 0 kHz to “12” kHz, and may determine the first designated frequency band, which is a frequency band to be preserved, as a frequency band of “12” kHz to “48” kHz on the basis of the determination that the frequency band supported y “bass boost” ranges from 0 kHz to “12” kHz.

The processor 520 multiplexes the sound source data 2310 including the frequency band of 0 kHz to “48” kHz into partial sound source data including the frequency band of 0 kHz to “48” kHz and partial sound source data including the frequency band of 0 kHz to “48” kHz in operation 2321.

For example, the processor 520 may perform high-pass filtering with respect to the partial sound source data including the frequency band of 0 kHz to “48” kHz with the cut-off frequency of “12” kHz in operation 2322 to preserve the high-frequency band of “12” kHz to “48” kHz, which is the first designated frequency band in the frequency band of the partial sound source data including the frequency band of 0 kHz to “48” kHz in the multiplexed sound source data. The processor 520 may generate first sound source data 2311 including a frequency band of “12” kHz to “48” kHz by high-pass filtering the partial sound source data including the frequency band of 0 kHz to "48" kHz in the multiplexed sound source data by using the cut-off frequency of "12" kHz in operation 2322.

To apply a sound effect to the other frequency band of 0 kHz to "12" kHz of the frequency band of the partial sound source data including the frequency band of 0 kHz to "48" kHz in the multiplexed sound source data, except for the frequency band of "12" kHz to "48" kHz, the processor 520 down-samples the partial sound source data at a sampling rate of "24" kHz in operation 2323.

The processor 520 generates at least partial data 2312 including the frequency band of 0 kHz to "24/2" kHz by down-sampling the partial sound source data of the multiplexed sound source data at a sampling rate of "24" kHz in operation 2323.

As shown in FIG. 23B, for example, a processor (e.g., the processor 520) may obtain sound source data 2313 including the frequency band of 0 kHz to "48" kHz from a memory (e.g., the memory 130).

For example, the processor 520 may receive an input for applying a sound effect to the sound source data 2313 including the frequency band of 0 kHz to "48" kHz through an input device (e.g., the input device 550).

The processor 520 may determine that "selection of treble boost" is received for the sound source data 2310 including the frequency band of 0 kHz to "48" kHz in operation 2328.

The processor 520 may determine that "selection of treble boost" is received as a sound effect for the sound source data 2310 including the frequency band of 0 kHz to "48" kHz, and that a frequency band supported by the sound effect "treble boost" ranges from 0 kHz to "36" kHz, and may determine the first designated frequency band, which is a frequency band to be preserved, as a frequency band of "36" kHz to "48" kHz on the basis of the determination that the frequency band supported by "treble boost" ranges from 0 kHz to "36" kHz.

In comparison with FIG. 23A, for the sound effect "treble boost", a range of application of the sound effect may extend to a higher frequency band than in the sound effect "bass boost", and thus the processor 520 may determine the first designated frequency band to be narrower than in the sound effect "bass boost" to secure a higher frequency band for the sound effect "treble boost" than for the sound effect "bass boost".

The processor 520 multiplexes the sound source data 2313 including the frequency band of 0 kHz to "48" kHz into partial sound source data including the frequency band of 0 kHz to "48" kHz and partial sound source data including the frequency band of 0 kHz to "48" kHz in operation 2325.

For example, the processor 520 may perform high-pass filtering with respect to the partial sound source data 2313 including the frequency band of 0 kHz to "48" kHz with the cut-off frequency of "36" kHz in operation 2326 to preserve the high-frequency band of "36" kHz to "48" kHz, which is the first designated frequency band in the frequency band of the partial sound source data 2313 including the frequency band of 0 kHz to "48" kHz in the multiplexed sound source data. The processor 520 may generate first sound source data 2314 including a frequency band of "36" kHz to "48" kHz by high-pass filtering the partial sound source data including the frequency band of 0 kHz to "48" kHz in the multiplexed sound source data by using the cut-off frequency of "36" kHz in operation 2326.

To apply a sound effect to the other frequency band of 0 kHz to "36" kHz of the frequency band of the partial sound source data including the frequency band of 0 kHz to "48" kHz in the multiplexed sound source data, except for the frequency band of "36" kHz to "48" kHz, the processor 520 down-samples the partial sound source data at a sampling rate of "72" kHz in operation 2327.

The processor 520 generates at least partial data 2315 including the frequency band of 0 kHz to "72/2" kHz by down-sampling the partial sound source data of the multiplexed sound source data at a sampling rate of "72" kHz in operation 2327.

Figure 24:
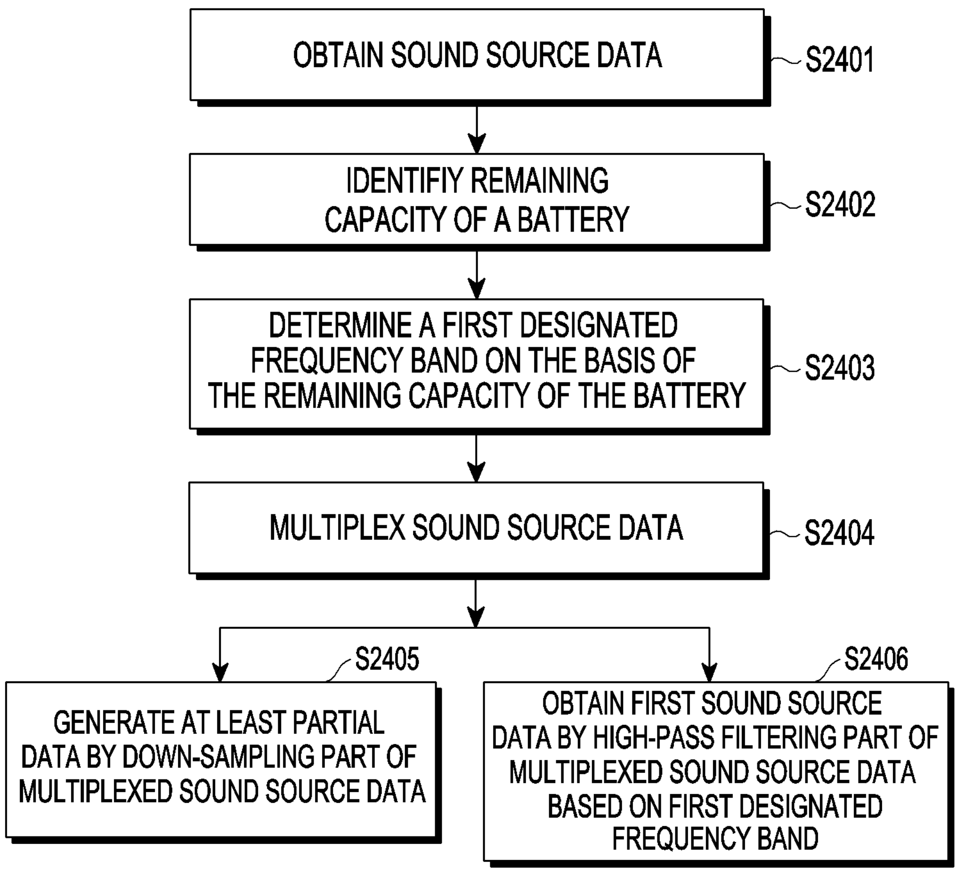
FIG. 24 is a flowchart of a method for determining a first designated frequency band according to various embodiments of the present disclosure.

FIG. 24 is a flowchart of a method for determining a first designated frequency band according to various embodiments of the present disclosure.

As shown in FIG. 24, according to various embodiments, in operation S2401, the processor (e.g., the processor 520) obtains sound source data.

According to various embodiments, in operation S2402, the processor 520 identifies the remaining capacity of a battery (e.g., the battery 296) of a power source of an electronic device (e.g., the electronic device 501).

According to various embodiments, in operation S2403, the processor 520 determines a first designated frequency band on the basis of the remaining capacity of the battery 296.

According to various embodiments, in operation S2404, the processor 520 multiplexes the sound source data.

According to various embodiments, in operation S2405, the processor 520 generates at least partial data by down-sampling partial sound source data of the multiplexed sound source data on the basis of the first designated frequency band.

For example, the processor 520 may generate at least partial data including the other frequency band of the frequency band of the sound source data except for the first designated frequency band by down-sampling the part of the multiplexed sound source data.

According to various embodiments, in operation S2406, the processor 520 obtains first sound source data by high-pass filtering the partial sound source data of the multiplexed sound source data on the basis of the first designated frequency band.

For example, the processor 520 may generate the first sound source data including the first designated frequency band by high-pass filtering the part of the multiplexed sound source data.

Figure 25A:
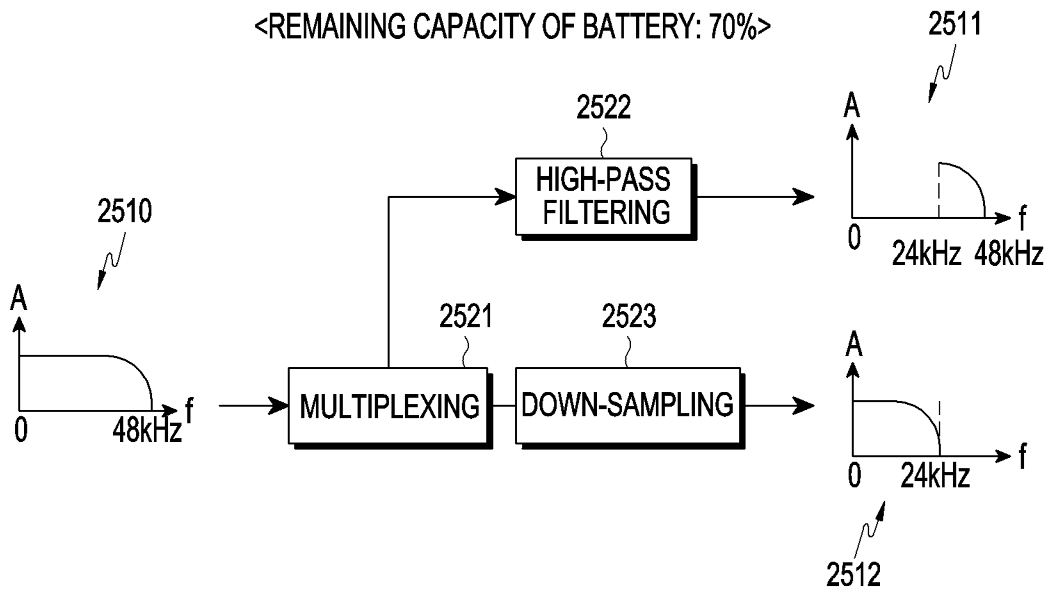
FIGS. 25A and 25B show an operation of obtaining first sound source data and generating at least partial data based on a determined first designated frequency band according to various embodiments of the present disclosure.
Figure 25B:
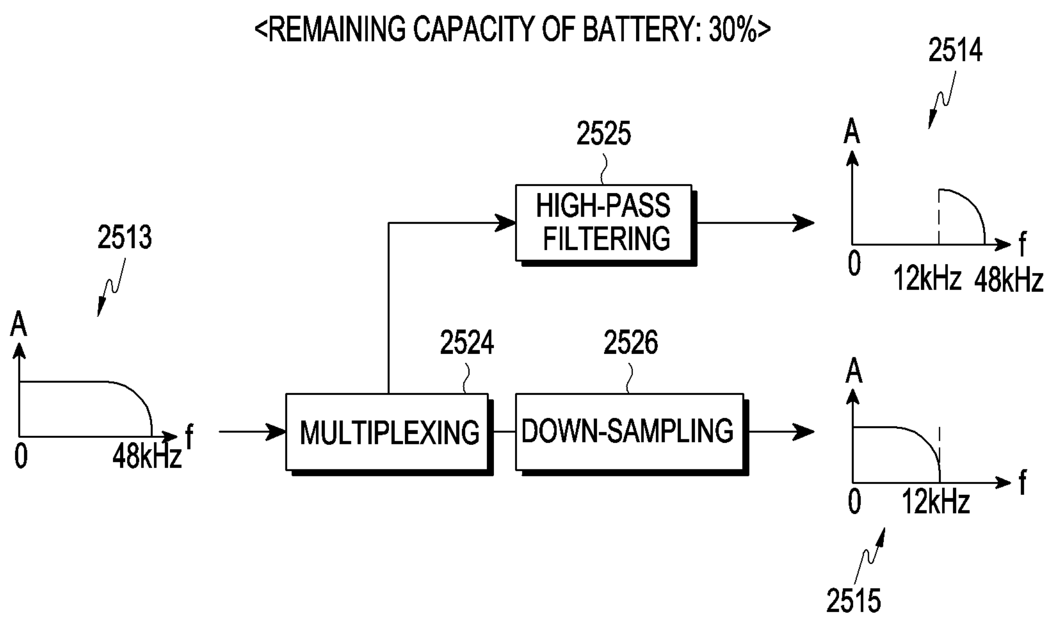

FIGS. 25A and 25B show an operation of obtaining first sound source data and generating at least partial data based on a determined first designated frequency band according to various embodiments of the present disclosure.

As shown in FIG. 25A, for example, a processor (e.g., the processor 520) may obtain sound source data 2510 including a frequency band of 0 kHz to "48" kHz from a memory (e.g., the memory 130).

For example, the processor 520 may receive an input for applying a sound effect to the sound source data 2510 including the frequency band of 0 kHz to "48" kHz through an input device (e.g., the input device 550).

The processor 520 may identify the remaining capacity of a battery (e.g., the battery 296) of a power source of an electronic device (e.g., the electronic device 501).

The processor 520 may determine that the remaining capacity of the battery 296 is 70% and may determine the first designated frequency band that is a frequency band to be preserved as a frequency band of "24" kHz to "48" kHz based on the determination that the remaining capacity of the battery 296 is 70%.

The processor 520 multiplexes the sound source data 2510 including the frequency band of 0 kHz to "48" kHz into partial sound source data including the frequency band of 0 kHz to “48” kHz and partial sound source data including the frequency band of 0 kHz to “48” kHz in operation 2521.

For example, the processor 520 may perform high-pass filtering with respect to the partial sound source data including the frequency band of 0 kHz to “48” kHz with the cut-off frequency of “24” kHz in operation 2522 to preserve the high-frequency band of “24” kHz to “48” kHz, which is the first designated frequency band in the frequency band of the partial sound source data including the frequency band of 0 kHz to “48” kHz in the multiplexed sound source data. The processor 520 may generate first sound source data 2511 including a frequency band of “24” kHz to “48” kHz by high-pass filtering the partial sound source data including the frequency band of 0 kHz to “48” kHz in the multiplexed sound source data by using the cut-off frequency of “24” kHz in operation 2522.

To apply a sound effect to the other frequency band of 0 kHz to “24” kHz of the frequency band of the partial sound source data including the frequency band of 0 kHz to “48” kHz in the multiplexed sound source data, except for the frequency band of “24” kHz to “48” kHz, the processor 520 down-samples the partial sound source data at a sampling rate of “48” kHz in operation 2523.

The processor 520 generates at least partial data 2512 including the frequency band of 0 kHz to “48/2” kHz by down-sampling the partial sound source data of the multiplexed sound source data at a sampling rate of “48” kHz in operation 2523.

As shown in FIG. 25B, for example, a processor (e.g., the processor 520) may obtain sound source data 2513 including a frequency band of 0 kHz to “48” kHz from a memory (e.g., the memory 130).

For example, the processor 520 may receive an input for applying a sound effect to the sound source data 2513 including the frequency band of 0 kHz to “48” kHz through an input device (e.g., the input device 550).

The processor 520 may identify the remaining capacity of a battery (e.g., the battery 296) of a power source of an electronic device (e.g., the electronic device 501).

The processor 520 may determine that the remaining capacity of the battery 296 is 30% (the remaining capacity is less than 70%) and may determine the first designated frequency band that is a frequency band to be preserved as a frequency band of “12” kHz to “48” kHz based on the determination that the remaining capacity of the battery 296 is 30% (the remaining capacity is less than 70%).

In comparison with FIG. 25A, when the remaining capacity of the battery 296 is 30%, the processor 520 needs to use less power than when the remaining capacity of the battery 296 is 70%, and thus the processor 520 may determine the first designated frequency band to be broader for the remaining capacity of 30% than for the remaining capacity of 70% to reduce the amount of computational processing by applying the sound effect to the narrower frequency band for the remaining capacity of 30% than for the remaining capacity of 70%.

The processor 520 multiplexes the sound source data 2513 including the frequency band of 0 kHz to “48” kHz into partial sound source data including the frequency band of 0 kHz to “48” kHz and partial sound source data including the frequency band of 0 kHz to “48” kHz in operation 2524.

For example, the processor 520 may perform high-pass filtering with respect to the partial sound source data 2513 including the frequency band of 0 kHz to “48” kHz with the cut-off frequency of “12” kHz in operation 2525 to preserve the high-frequency band of “12” kHz to “48” kHz, which is the first designated frequency band in the frequency band of the partial sound source data 2313 including the frequency band of 0 kHz to “48” kHz in the multiplexed sound source data. The processor 520 may generate first sound source data 2514 including a frequency band of “12” kHz to “48” kHz by high-pass filtering the partial sound source data including the frequency band of 0 kHz to “48” kHz in the multiplexed sound source data by using the cut-off frequency of “12” kHz in operation 2525.

To apply a sound effect to the other frequency band of 0 kHz to “12” kHz of the frequency band of the partial sound source data including the frequency band of 0 kHz to “48” kHz in the multiplexed sound source data, except for the frequency band of “12” kHz to “48” kHz, the processor 520 down-samples the partial sound source data at a sampling rate of “24” kHz in operation 2526.

The processor 520 generates at least partial data 2515 including the frequency band of 0 kHz to “24/2” kHz by down-sampling the partial sound source data of the multiplexed sound source data at a sampling rate of “24” kHz in operation 2526.

Figure 26:
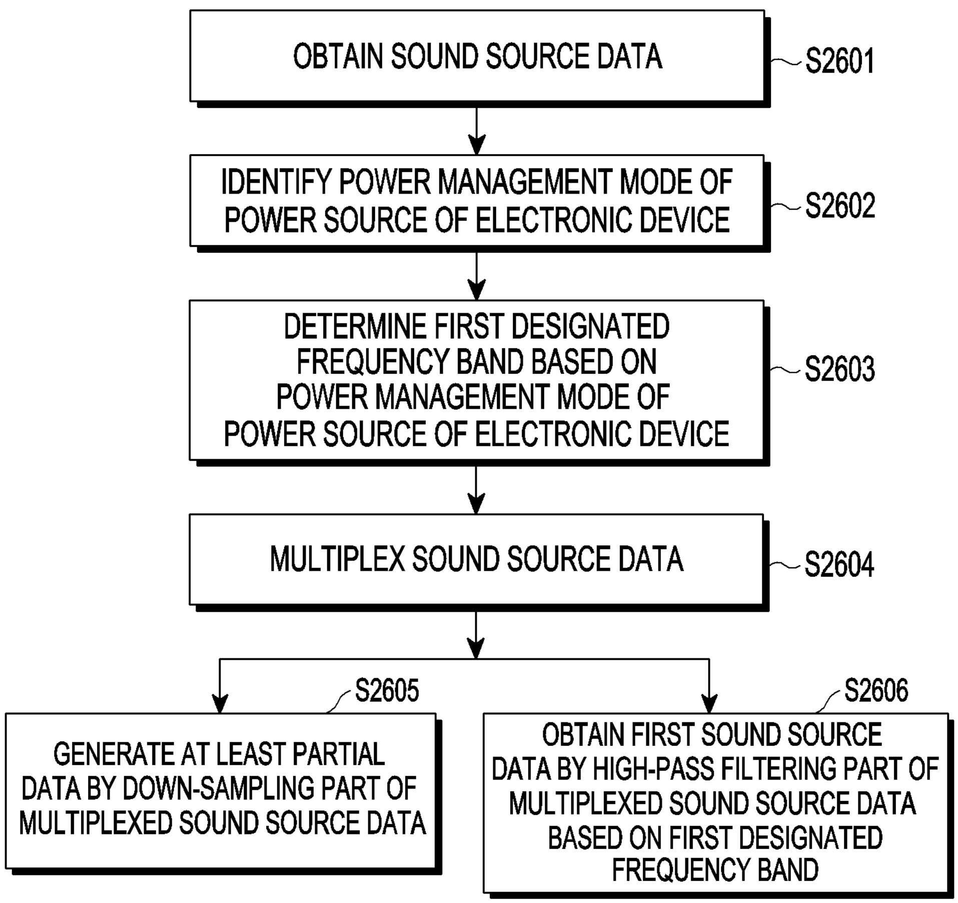
FIG. 26 is a flowchart of a method for determining a first designated frequency band according to various embodiments of the present disclosure.

FIG. 26 is a flowchart of a method for determining a first designated frequency band according to various embodiments of the present disclosure.

As shown in FIG. 26, according to various embodiments, in operation S2601, the processor (e.g., the processor 520) obtains sound source data.

According to various embodiments, in operation S2602, the processor 520 identifies a power management mode of a power source of an electronic device (e.g., the electronic device 501).

According to various embodiments, in operation S2603, the processor 520 determines a first designated frequency band on the basis of the identified power management mode.

According to various embodiments, in operation S2604, the processor 520 multiplexes the sound source data.

According to various embodiments, in operation S2605, the processor 520 generates at least partial data by down-sampling a part of the multiplexed sound source data on the basis of the first designated frequency band.

For example, the processor 520 may generate at least partial data including the other frequency band of the frequency band of the sound source data except for the first designated frequency band by down-sampling the part of the multiplexed sound source data.

According to various embodiments, in operation S2606, the processor 520 obtains first sound source data by high-pass filtering the part of the multiplexed sound source data on the basis of the first designated frequency band.

For example, the processor 520 may generate the first sound source data including the first designated frequency band by high-pass filtering the part of the multiplexed sound source data.

Figure 27A:
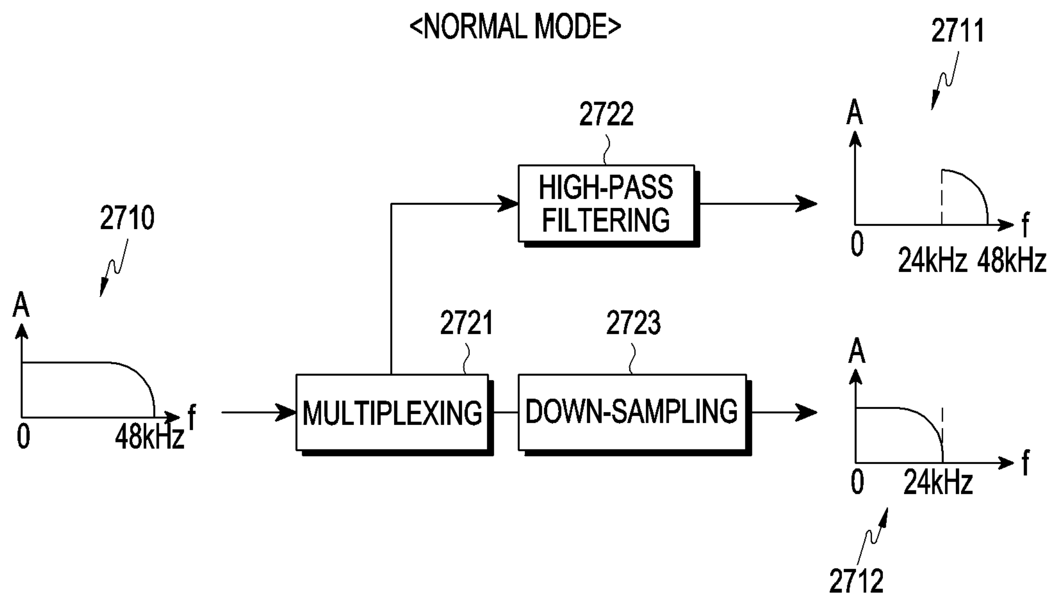
FIGS. 27A and 27B show an operation of obtaining first sound source data and generating at least partial data based on a determined first designated frequency band according to various embodiments of the present disclosure.
Figure 27B:
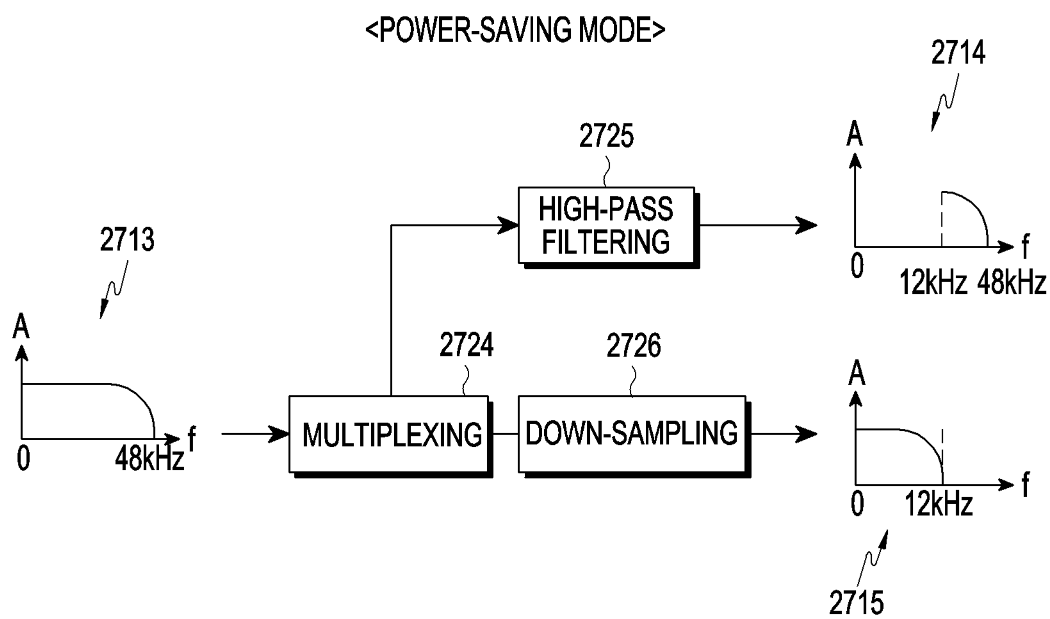

FIGS. 27A and 27B show an operation of obtaining first sound source data and generating at least partial data based on a determined first designated frequency band according to various embodiments of the present disclosure.

As shown in FIG. 27, for example, a processor (e.g., the processor 520) may obtain sound source data 2710 including a frequency band of 0 kHz to “48” kHz from a memory (e.g., the memory 130).

For example, the processor 520 may receive an input for applying a sound effect to the sound source data 2710 including the frequency band of 0 kHz to “48” kHz through an input device (e.g., the input device 550).

The processor 520 may identify a power management mode of an electronic device (e.g., the electronic device 501).

The processor 520 may determine that the power management mode of the electronic device 501 is a "normal mode" and may determine the first designated frequency band that is a frequency band to be preserved as a frequency band of "24" kHz to "48" kHz based on the determination that the power management mode of the electronic device 501 is the "normal mode".

The processor 520 multiplexes the sound source data 2710 including the frequency band of 0 kHz to "48" kHz into partial sound source data including the frequency band of 0 kHz to "48" kHz and partial sound source data including the frequency band of 0 kHz to "48" kHz in operation 2721.

For example, the processor 520 may perform high-pass filtering with respect to the partial sound source data including the frequency band of 0 kHz to "48" kHz with the cut-off frequency of "24" kHz in operation 2722 to preserve the high-frequency band of "24" kHz to "48" kHz, which is the first designated frequency band in the frequency band of the partial sound source data including the frequency band of 0 kHz to "48" kHz in the multiplexed sound source data. The processor 520 may generate first sound source data 2711 including a frequency band of "24" kHz to "48" kHz by high-pass filtering the partial sound source data including the frequency band of 0 kHz to "48" kHz in the multiplexed sound source data by using the cut-off frequency of "24" kHz in operation 2722.

To apply a sound effect to the other frequency band of 0 kHz to "24" kHz of the frequency band of the partial sound source data including the frequency band of 0 kHz to "48" kHz in the multiplexed sound source data, except for the frequency band of "24" kHz to "48" kHz, the processor 520 down-samples the partial sound source data at a sampling rate of "48" kHz in operation 2723.

The processor 520 generates at least partial data 2712 including the frequency band of 0 kHz to "48/2" kHz by down-sampling the partial sound source data of the multiplexed sound source data at a sampling rate of "48" kHz in operation 2723.

As shown in FIG. 27B, for example, a processor (e.g., the processor 520) may obtain sound source data 2713 including a frequency band of 0 kHz to "48" kHz from a memory (e.g., the memory 130).

For example, the processor 520 may receive an input for applying a sound effect to the sound source data 2713 including the frequency band of 0 kHz to "48" kHz through an input device (e.g., the input device 550).

The processor 520 may identify the power management mode of the electronic device 501.

The processor 520 may determine that the power management mode of the electronic device 501 is a "power-saving mode" (having stronger power management than in the normal mode), and may determine the first designated frequency band that is a frequency band to be preserved as a frequency band of "12" kHz to "48" kHz based on the determination that the power management mode of the electronic device 501 is the "power-saving mode" (having stronger power management than in the normal mode).

In comparison with FIG. 27A, when the power management mode of the electronic device 501 is the "power-saving mode", the processor 520 needs to use less power than when the power management mode of the electronic device 501 is the "normal mode", and thus the processor 520 may determine the first designated frequency band to be broader for the "power-saving mode" than for the "normal mode" to reduce the amount of computational processing by applying the sound effect to the narrower frequency band for the "power-saving mode" than for the "normal mode".

The processor 520 multiplexes the sound source data 2713 including the frequency band of 0 kHz to "48" kHz into partial sound source data including the frequency band of 0 kHz to "48" kHz and partial sound source data including the frequency band of 0 kHz to "48" kHz in operation 2724.

For example, the processor 520 may perform high-pass filtering with respect to the partial sound source data 2713 including the frequency band of 0 kHz to "48" kHz with the cut-off frequency of "12" kHz in operation 2725 to preserve the high-frequency band of "12" kHz to "48" kHz, which is the first designated frequency band in the frequency band of the partial sound source data 2313 including the frequency band of 0 kHz to "48" kHz in the multiplexed sound source data. The processor 520 may generate first sound source data 2714 including a frequency band of "12" kHz to "48" kHz by high-pass filtering the partial sound source data including the frequency band of 0 kHz to "48" kHz in the multiplexed sound source data by using the cut-off frequency of "12" kHz in operation 2725.

To apply a sound effect to the other frequency band of 0 kHz to "12" kHz of the frequency band of the partial sound source data including the frequency band of 0 kHz to "48" kHz in the multiplexed sound source data, except for the frequency band of "12" kHz to "48" kHz, the processor 520 down-samples the partial sound source data at a sampling rate of "24" kHz in operation 2726.

The processor 520 generates at least partial data 2715 including the frequency band of 0 kHz to "24/2" kHz by down-sampling the partial sound source data of the multiplexed sound source data at a sampling rate of "24" kHz in operation 2726.

Figure 28:
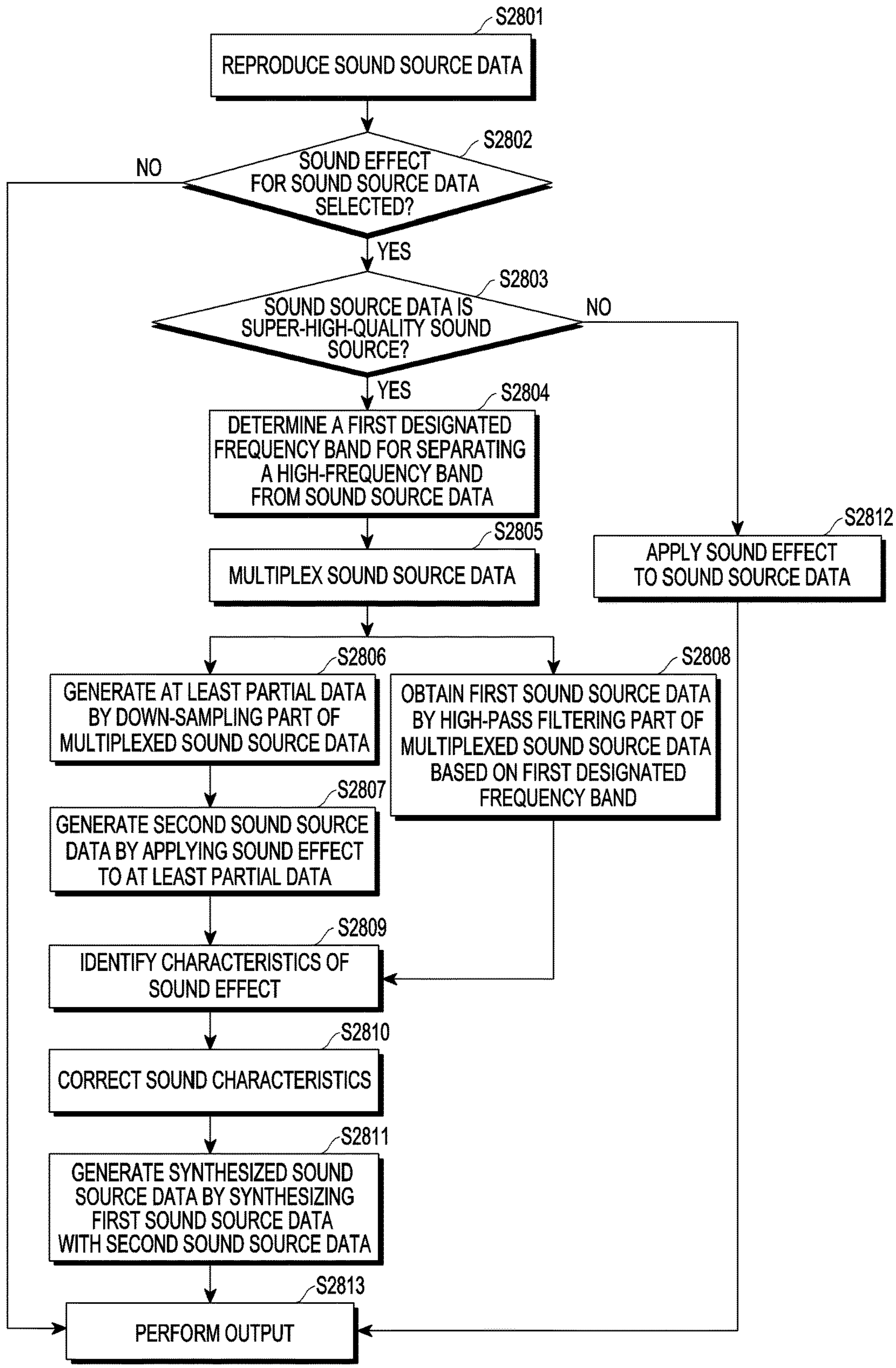
FIG. 28 is a flowchart illustrating a method for controlling an electronic device according to various embodiments of the present disclosure.

FIG. 28 is a flowchart illustrating a method for controlling an electronic device according to various embodiments of the present disclosure.

As shown in FIG. 28, according to various embodiments, in operation S2801, the processor (e.g., the processor 520) reproduces (e.g., outputs) sound source data through a speaker (e.g., the speaker 580).

According to various embodiments, in operation S2802, the processor 520 determines whether a selection of application of a sound effect to the sound source data is received through an input device (e.g., the input device 550).

According to various embodiments, when determining that the selection of application of the sound effect to the sound source data is not received, the processor 520 outputs the sound source data through a speaker (e.g., the speaker 580) in operation S2813. For example, when determining that the selection of application of the sound effect to the sound source data is not received, the processor 520 may output the sound source data without performing operations S2803 through S2812.

According to various embodiments, when determining that the selection of application of the sound effect to the sound source data is received through the input device 550, the processor 520 determines whether the sound source data is a super-high-quality sound source in operation S2803.

According to various embodiments, once determining that the sound source data is not the super-high-quality sound source, the processor 520 applies the sound effect to the sound source data in operation S2812. For example, once determining that the sound source data is not the super-high-quality sound source, the processor 520 applies the sound effect to the sound source data in operation S2812 without performing operations S2804 through S2811 with respect to a frequency band of the sound source data.

According to various embodiments, when determining that the sound source data is the super-high-quality sound source, the processor 520 determines a first designated frequency band for separating a high-frequency band from the sound source data in operation S2804.

According to various embodiments, in operation S2805, the processor 520 multiplexes the sound source data.

According to various embodiments, in operation S2806, the processor 520 generates at least partial data by down-sampling partial sound source data of the multiplexed sound source data.

According to various embodiments, in operation S2807, the processor 520 generates second sound source data by applying the sound effect to the at least partial data.

According to various embodiments, in operation S2808, the processor 520 obtains first sound source data by high-pass filtering the partial sound source data of the multiplexed sound source data on the basis of the first designated frequency band.

According to various embodiments, in operation S2809, the processor 520 identifies characteristics of the sound effect applied to the second sound source data.

The processor 520 may identify time delay characteristics and/or gain characteristics that appear in the second sound source data due to application of the sound effect to the second sound source data.

According to various embodiments, in operation S2810, the processor 520 corrects sound characteristics of the first sound source data on the basis of the identified characteristics of the sound effect.

For example, when identifying the time delay characteristics appearing in the second sound source data due to application of the sound effect to the second sound source data, the processor 520 may correct the first sound source data by reflecting the time delay characteristics identified from the second sound source data thereto.

According to various embodiments, in operation S2811, the processor 520 generates synthesized sound source data corresponding to the sound source data by synthesizing the corrected first sound source data with the generated second sound source data.

According to various embodiments, in operation S2813, the processor 520 outputs the synthesized sound source data through the speaker 580.

Figure 29:
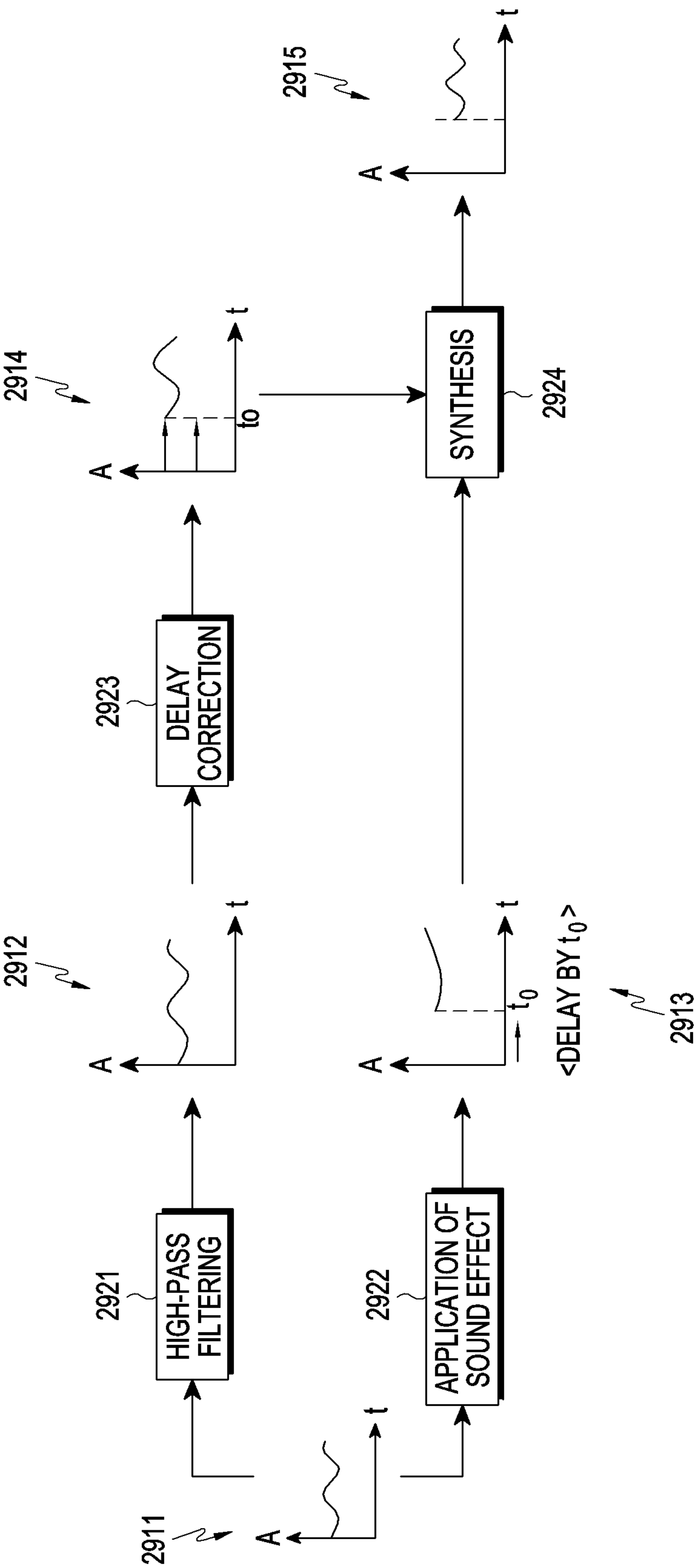
FIG. 29 shows an operation of correcting first sound source data based on sound effect characteristics according to various embodiments of the present disclosure.

FIG. 29 shows an operation of correcting first sound source data based on sound effect characteristics according to various embodiments of the present disclosure.

As shown in FIG. 29, for example, a processor (e.g., the processor 520) may obtain sound source data 2911 from a memory (e.g., the memory 130).

The processor 520 multiplexes the obtained sound source data 2911, performs high-pass filtering with respect to a part of the multiplexed sound source data in operation 2921 to obtain first sound source data 2912, and applies a sound effect to a part of the multiplexed sound source data in operation 2922 to generate second sound source data 2913 delayed by a time $t_0$.

The processor 520 may determine that the sound effect characteristics of the second sound source data is a time delay by $t_0$ and perform delay correction by applying the identified sound effect characteristics, the time delay by $t_0$, to the first sound source data 2912 in operation 2923, thereby generating corrected first sound source data 2914 that is time-delayed by $t_0$.

The processor 520 synthesizes the second sound source data 2913 with the corrected first sound source data 2914 in operation 2924 to generate synthesized sound source data 2915.

Figure 30:
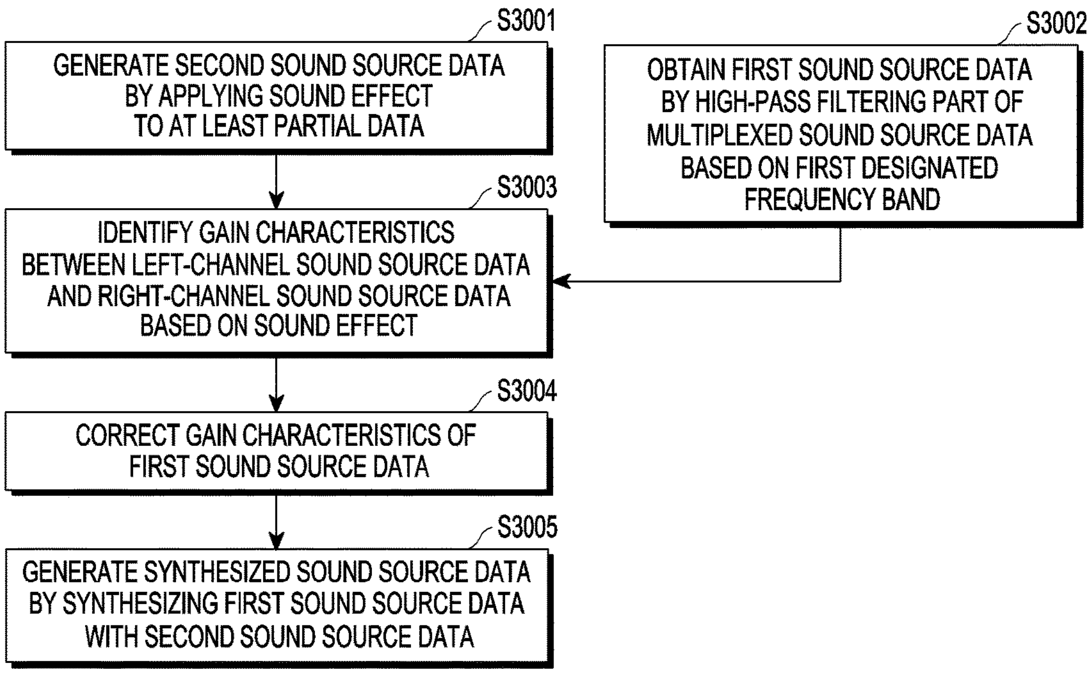
FIG. 30 is a flowchart illustrating a method for correcting first sound source data based on sound effect characteristics according to various embodiments of the present disclosure.

FIG. 30 is a flowchart illustrating a method for correcting first sound source data based on sound effect characteristics according to various embodiments of the present disclosure.

As shown in FIG. 30, according to various embodiments, in operation S3001, a processor (e.g., the processor 520) generates second sound source data by applying a sound effect to at least partial data.

According to various embodiments, in operation S3002, the processor 520 obtains first sound source data by high-pass filtering a part of multiplexed sound source data on the basis of a first designated frequency band.

According to various embodiments, in operation S3003, the processor 520 identifies gain characteristics between left-channel sound source data and right-channel sound source data based on the sound effect.

For example, the processor 520 may identify a rate (e.g., a difference) between a gain of the left-channel sound source data transmitted through a left channel and a gain of the right-channel sound source data transmitted through a right channel in the second sound source data generated based on the sound effect.

According to various embodiments, in operation S3004, the processor 520 corrects gain characteristics of the first sound source data on the basis of the identified sound effect characteristics.

For example, based on the rate between the gain of the left-channel sound source data transmitted through the left channel and the gain of the right-channel sound source data transmitted through the right channel in the second sound source data generated based on the sound effect, the processor 520 may correct a rate between a gain of left-channel sound source data transmitted through the left channel and a gain of right-channel sound source data transmitted through the right channel in the first sound source data into the rate between the gain of the left-channel sound source data transmitted through the left channel and the gain of the right-channel sound source data transmitted through the right channel in the second sound source data generated based on the sound effect.

According to various embodiments, in operation S3005, the processor 520 generates synthesized sound source data by synthesizing the first sound source data with the second sound source data.

Figure 31:
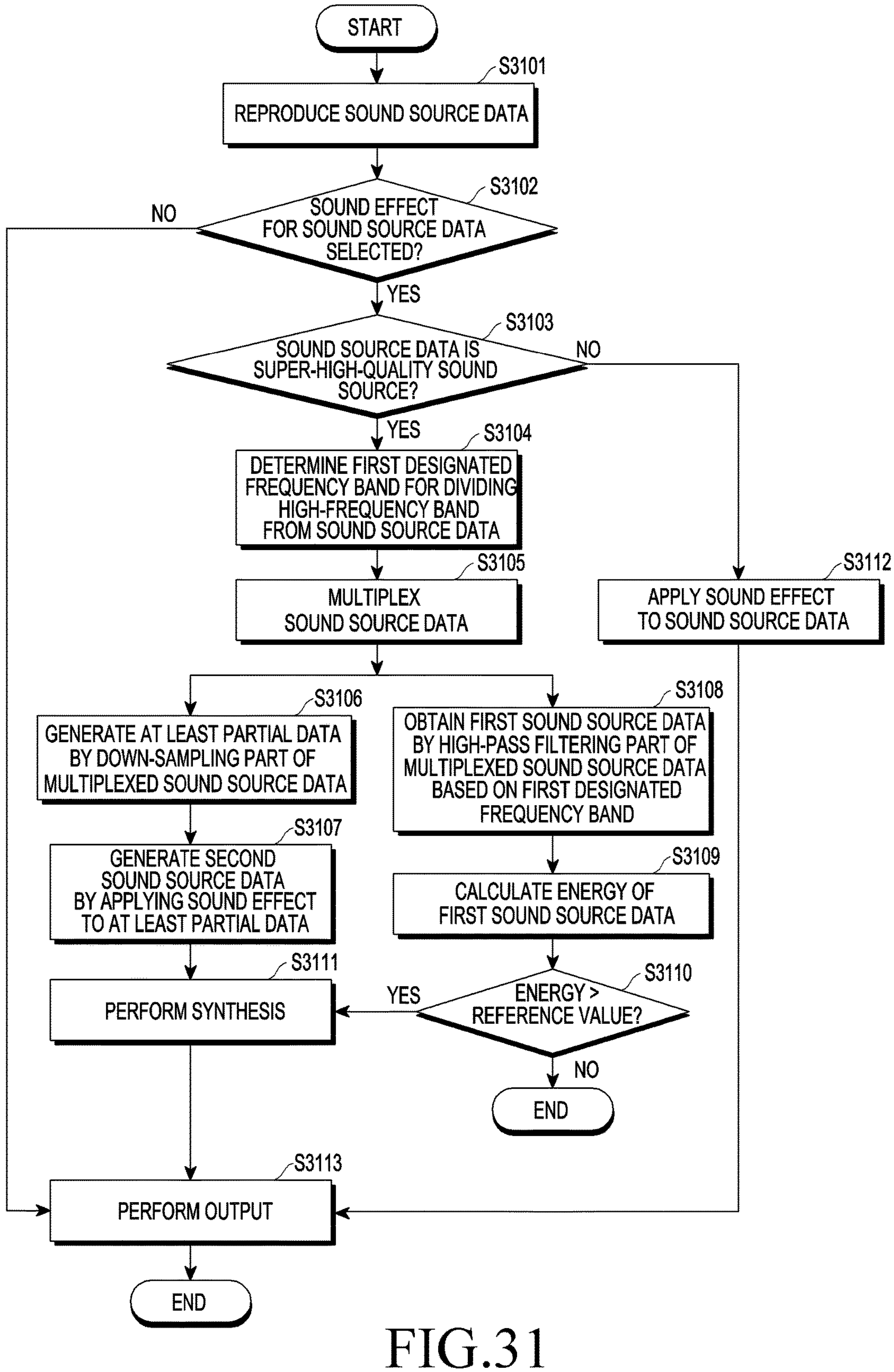
FIG. 31 is a flowchart illustrating a method for controlling an electronic device according to various embodiments of the present disclosure.

FIG. 31 is a flowchart illustrating a method for controlling an electronic device according to various embodiments of the present disclosure.

As shown in FIG. 31, according to various embodiments, in operation S3101, the processor (e.g., the processor 520) reproduces (e.g., outputs) sound source data through a speaker (e.g., the speaker 580).

According to various embodiments, in operation S3102, the processor 520 determines whether a selection of application of a sound effect to the sound source data is received through an input device (e.g., the input device 550).

According to various embodiments, when determining that the selection of application of the sound effect to the sound source data is not received, the processor 520 outputs the sound source data through a speaker (e.g., the speaker 580) in operation S3113. For example, when determining that the selection of application of the sound effect to the sound source data is not received, the processor 520 may output the sound source data without performing operations S3103 through S3112.

According to various embodiments, when determining that the selection of application of the sound effect to the sound source data is received through the input device 550, the processor 520 determines whether the sound source data is a super-high-quality sound source in operation S3103.

According to various embodiments, once determining that the sound source data is not the super-high-quality sound source, the processor 520 applies the sound effect to the sound source data in operation S3112. For example, once determining that the sound source data is not the super-high-quality sound source, the processor 520 applies the sound effect to the sound source data in operation S3111 without performing operations S3104 through S3109 with respect to a frequency band of the sound source data.

According to various embodiments, when determining that the sound source data is the super-high-quality sound source, the processor 520 determines a first designated frequency band for separating a high-frequency band from the sound source data in operation S3104.

According to various embodiments, in operation S3105, the processor 520 multiplexes the sound source data.

According to various embodiments, in operation S3106, the processor 520 generates at least partial data by down-sampling partial sound source data of the multiplexed sound source data.

According to various embodiments, in operation S3107, the processor 520 generates second sound source data by applying the sound effect to the at least partial data.

According to various embodiments, in operation S3108, the processor 520 obtains first sound source data by high-pass filtering the partial sound source data of the multiplexed sound source data on the basis of the first designated frequency band.

According to various embodiments, in operation S3109, the processor 520 calculates energy of the first sound source data.

For example, the processor 520 calculates the amount of energy included in a frequency band included in the first sound source data.

According to various embodiments, in operation S3110, the processor 520 determines whether the calculated energy is greater than a reference value.

For example, the processor 520 may determine whether the calculated energy is greater than a preset energy reference value.

According to various embodiments, when determining that the calculated energy is less than the preset energy reference value, the processor 520 terminates its operation.

This is because when the calculated energy of the first sound source data including a high-frequency band is less than a preset minimum energy value, it is not necessary to preserve the high-frequency band to apply a sound effect.

According to various embodiments, when determining that the calculated energy is greater than the preset energy reference value, in operation S3111, the processor 520 generates synthesized sound source data corresponding to the sound source data by synthesizing first sound source data with second sound source data.

According to various embodiments, in operation S3113, the processor 520 outputs the synthesized sound source data through the speaker 580.

Figure 32B:
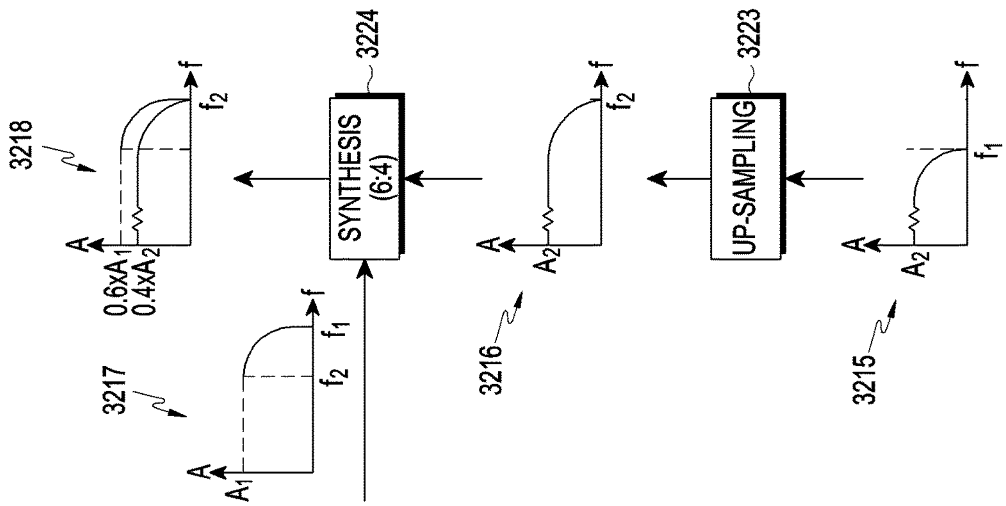
FIGS. 32A and 32B illustrate an up-sampling operation and a synthesizing operation according to various embodiments of the present disclosure.
Figure 32A:
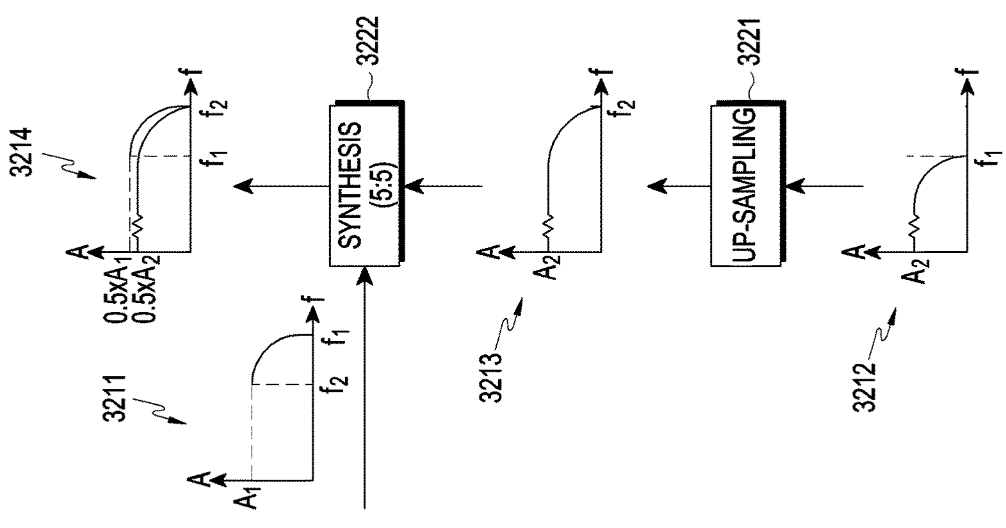

FIGS. 32A and 32B illustrate an up-sampling operation and a synthesizing operation according to various embodiments of the present disclosure.

As shown in FIG. 32A, a processor (e.g., the processor 520) may perform down-sampling and sound effect application with respect to sound source data including a frequency band of 0 kHz to "$f_2$" kHz with a sampling rate of "$f_2$*2" kHz, thereby generating third sound source data 3212 including a frequency band of 0 kHz to "$f_1$" ("$f_2$/2") kHz with a sampling rate of "$f_2$" ("$f_1$*2") kHz.

According to various embodiments, the processor 520 performs up-sampling with respect to the third sound source data 3212 including the frequency band of 0 kHz to "$f_1$" kHz with a sampling rate of "$f_1$*2" kHz in operation 3221 to generate (e.g., restore) second sound source data 3212 including the frequency band of 0 kHz to "$f_2$" kHz with a sampling rate of "$f_2$*2" kHz.

The processor 520 may generate synthesized sound source data 3214 by synthesizing the second sound source data 3213 including a frequency band of 0 kHz to "$f_1$" kHz with a sampling rate of "$f_2$*2" kHz and the first sound source data 3211 including a high-frequency band of "$f_1$" kHz to "$f_2$" kHz at a ratio of 5:5, in operation 3222.

As shown in FIG. 32B, a processor (e.g., the processor 520) may perform down-sampling and sound effect application with respect to sound source data including a frequency band of 0 kHz to "$f_2$" kHz with a sampling rate of "$f_2$*2" kHz, thereby generating third sound source data 3215 including a frequency band of 0 kHz to "$f_1$" kHz with a sampling rate of "$f_2$" ("$f_1$*2") kHz.

According to various embodiments, the processor 520 performs up-sampling with respect to the third sound source data 3215 including the frequency band of 0 kHz to "$f_1$" kHz with a sampling rate of "$f_1$*2" kHz in operation 3223 to generate (e.g., restore) second sound source data 3216 including the frequency band of 0 kHz to "$f_2$" kHz with a sampling rate of "$f_2$*2" kHz.

The processor 520 synthesizes the second sound source data 3216 with the first sound source data 3217 at a ratio of N:M (N and M are different real numbers) other than 5:5 in operation 3224.

The processor 520 may synthesize the second sound source data 3216 with the first sound source data 3217 in operation 3224 by applying a larger weight value to the first sound source data 3217 having less energy than the second sound source data 3216 having more energy.

The processor 520 generates synthesized sound source data 3218 by synthesizing the second sound source data 3216 including a frequency band of 0 kHz to "$f_2$" kHz with a sampling rate of "$f_2$*2" kHz and the first sound source data 3217 including a high-frequency band of "$f_1$" kHz to "$f_2$" kHz at a ratio of 6:4, in operation 3224.

According to various embodiments of the present disclosure, an electronic device includes at least one speaker and a processor, in which the processor is configured to obtain sound source data, to obtain first sound source data corresponding to a first designated frequency band from the sound source data by using a filter, to generate second sound source data by applying a sound effect to at least partial data corresponding to a second designated frequency band in the sound source data, to generate synthesized sound source data corresponding to the sound source data by synthesizing the first sound source data with the second sound source data, and to output the synthesized sound source data through the at least one speaker.

According to various embodiments, the filter may include a software module.

According to various embodiments, the processor may be further configured to determine the first designated frequency band at least based on a designated attribute when the sound source data corresponds to the designated attribute.

According to various embodiments, the designated attribute may include a designated sampling rate, and the processor may be further configured to identify a frequency band supportable by the sound source data based on the designated sampling rate and to determine the first designated frequency band based on the supportable frequency band.

According to various embodiments, the processor may be further configured to determine the first designated frequency band based on at least some of a user's audible frequency corresponding to the electronic device, a processing capability of the processor, a frequency band supported by the sound effect, a battery state of the electronic device, and a power management state of the electronic device.

According to various embodiments, the processor may be further configured to obtain the first sound source data by using a high-pass filter module functionally connected with the processor.

According to various embodiments, the processor may be further configured to generate the at least partial data by down-sampling the sound source data.

According to various embodiments, the processor may be further configured to identify a first sampling rate of the sound source data and to generate the at least partial data of a second sampling rate by down-sampling the sound source data.

According to various embodiments, the processor may be further configured to generate third sound source data based on the application of the sound effect to the at least partial data with the second sampling rate, as at least a part of the application of the sound effect and to generate the second sound source data by up-sampling the third sound source data at the first sampling rate.

According to various embodiments, the processor may be further configured to correct characteristics corresponding to the first sound source data based on characteristics corresponding to the sound effect applied to the second sound source data.

According to various embodiments, the processor may be further configured to correct at least some of time delay characteristics and gain characteristics corresponding to the first sound source data based on at least some of time delay characteristics and gain characteristics corresponding to the sound effect applied to the second sound source data.

According to various embodiments, the processor may be further configured to synthesize the first sound source data and the second sound source data when energy corresponding to the first sound source data is greater than a preset value.

According to various embodiments, the processor may be further configured to select a speaker capable of reproducing the sound source data as a speaker for outputting the synthesized sound source data from among the at least one speaker functionally connected with the processor.

According to various embodiments, the processor may be further configured to generate the synthesized sound source data by applying different gain characteristics to the first sound source data and the second sound source data.

According to various embodiments of the present disclosure, a method for controlling an electronic device includes obtaining sound source data, obtaining first sound source data corresponding to a first designated frequency band from the sound source data by using a filter, generating second sound source data by applying a sound effect to at least partial data corresponding to a second designated frequency band in the sound source data, generating synthesized sound source data corresponding to the sound source data by synthesizing the first sound source data with the second sound source data, and outputting the synthesized sound source data.

As used herein, the term "module" may mean, for example, a unit including one of or a combination of two or more of hardware, software, and firmware. The "module" may be interchangeably used with a unit, a logic, a logical block, a component, or a circuit. The "module" may be a minimum unit or a portion of an integrated component. The "module" may be a minimum unit or part thereof, adapted to perform one or more functions. The "module" may be implemented mechanically or electronically. For example, the "module" according to the embodiments may include at least one of an application-specific integrated circuit (ASIC) chip, field-programmable gate arrays (FPGAs), and a programmable-logic device performing certain operations already known or to be developed.

At least a part of an apparatus (e.g., modules or functions thereof) or a method (e.g., operations) according to various embodiments may be implemented with instructions stored in a computer-readable storage medium in the form of a programming module. When the instructions are executed by one or more processors (for example, the processor 120), the one or more processors may perform functions corresponding to the instructions. The computer-readable storage medium may be, for example, a memory included in the memory 130.

The computer-readable recording medium includes hard disk, floppy disk, or magnetic media (e.g., a magnetic tape, optical media (e.g., compact disc read only memory (CD-ROM) or digital versatile disc (DVD), magneto-optical media (e.g., floptical disk), a hardware device (e.g., ROM, RAM, flash memory, etc.), and so forth. Further, the program instructions include a machine language code created by a complier and a high-level language code executable by a computer using an interpreter. The foregoing hardware device may be configured to be operated as at least one software module to perform an operation of the present disclosure, or vice versa.

Modules or programming modules according to various embodiments of the present disclosure may include one or more of the foregoing elements, have some of the foregoing elements omitted, or further include additional other elements. Operations performed by the modules, the programming modules or other elements according to various embodiments may be executed in a sequential, parallel, repetitive or heuristic manner. Also, some of the operations may be executed in different order or omitted or may have additional different operations. The embodiments disclosed herein have been provided for description and understanding of disclosed technical matters and are not intended to limit the scope of the present disclosure. Therefore, it should be construed that the scope of the present disclosure includes any change or other various embodiments based on the technical spirit of the present disclosure.

What is claimed is:

1. An electronic device comprising:

at least one speaker and a processor, wherein the processor is configured to:

obtain sound source data;

obtain first sound source data corresponding to a first designated frequency band from the sound source data by using a filter;

generate second sound source data by down-sampling the sound source data, wherein the second sound source data corresponds to a second designated frequency band, and wherein a lowest frequency of the second designated frequency band is lower than a lowest frequency of the first designated frequency band;

generate third sound source data by applying a sound effect to the second sound source data generated by down-sampling the sound source data; and generate synthesized sound source data based on the first sound source data and the third sound source data.

2. The electronic device of claim 1, wherein the filter comprises a software module.

3. The electronic device of claim 1, wherein the processor is further configured to determine the first designated frequency band at least based on a designated attribute in response to the sound source data corresponding to the designated attribute.

4. The electronic device of claim 3, wherein the designated attribute comprises a designated sampling rate, and the processor is further configured to:

identify a frequency band supportable by the sound source data based on the designated sampling rate; and determine the first designated frequency band based on the supportable frequency band.

5. The electronic device of claim 1, wherein the processor is further configured to determine the first designated frequency band based on at least some of a user's audible frequency corresponding to the electronic device, a processing capability of the processor, a frequency band supported by the sound effect, a battery state of the electronic device, and a power management state of the electronic device.

6. The electronic device of claim 1, wherein the processor is further configured to obtain the first sound source data by obtaining the first sound source data based on a high-pass filter module functionally connected with the processor.

7. The electronic device of claim 1, wherein the processor is further configured to:

identify a first sampling rate of the sound source data; and generate the second sound source data with a second sampling rate by down-sampling the sound source data.

8. The electronic device of claim 1, wherein the processor is further configured to correct characteristics corresponding to the first sound source data based on characteristics corresponding to the sound effect applied to the second sound source data.

9. The electronic device of claim 8, wherein the processor is further configured to correct at least some of time delay characteristics and gain characteristics corresponding to the first sound source data based on at least some of time delay characteristics and gain characteristics corresponding to the sound effect applied to the second sound source data.

10. The electronic device of claim 1, wherein the processor is further configured to synthesize the first sound source data and the third sound source data in response to energy corresponding to the first sound source data being greater than a preset value.

11. The electronic device of claim 1, wherein the processor is further configured to select a speaker capable of reproducing the sound source data as a speaker for outputting the synthesized sound source data from among the at least one speaker functionally connected with the processor.

12. The electronic device of claim 1, wherein the processor is further configured to generate the synthesized sound source data by applying different gain characteristics to the first sound source data and the third sound source data.

13. A method for controlling an electronic device, the method comprising:

obtaining sound source data;

obtaining first sound source data corresponding to a first designated frequency band from the sound source data by using a filter;

generating second sound source data by down-sampling the sound source data, wherein the second sound source data corresponds to a second designated frequency band, and wherein a lowest frequency of the second designated frequency band is lower than a lowest frequency of the first designated frequency band;

generating third sound source data by applying a sound effect to the second sound source data generated by down-sampling the sound source data; and generating synthesized sound source data based on the first sound source data and the third sound source data.

14. The method of claim 13, wherein the filter comprises a software module.

15. The method of claim 13, the method further comprising:

determining the first designated frequency band at least based on a designated attribute in response to the sound source data corresponding to the designated attribute.

16. The method of claim 15, the method further comprising:

identifying a frequency band supportable by the sound source data based on a designated sampling rate; and determine the first designated frequency band based on the supportable frequency band;

wherein the designated attribute comprises a designated sampling rate.

17. The method of claim 13, the method further comprising:

determining the first designated frequency band based on at least some of a user's audible frequency corresponding to the electronic device, a processing capability of a processor of the electronic device, a frequency band supported by the sound effect, a battery state of the electronic device, and a power management state of the electronic device.

18. The method of claim 13, the method further comprising:

obtaining the first sound source data by using a high-pass filter module functionally connected with a processor of the electronic device.

* * * * *